United States Patent [19]

Yamasaki et al.

[11] Patent Number: 4,972,315

[45] Date of Patent: Nov. 20, 1990

[54] DATA FLOW MACHINE

[75] Inventors: Tetsuo Yamasaki; Kenji Shima; Mitsuo Meichi; Shinji Komori; Hidehiro Takata, all of Hyogo, Japan

[73] Assignee: Mitsubishi Denki Kabushiki Kaisha, Tokyo, Japan

[21] Appl. No.: 166,524

[22] Filed: Mar. 10, 1988

[30] Foreign Application Priority Data

| Mar. 10, 1987 | [JP] | Japan | 62-54406 |
| Jul. 16, 1987 | [JP] | Japan | 62-178011 |
| Jul. 16, 1987 | [JP] | Japan | 62-178012 |
| Aug. 20, 1987 | [JP] | Japan | 62-207016 |
| Oct. 20, 1987 | [JP] | Japan | 62-264856 |
| Oct. 20, 1987 | [JP] | Japan | 62-264857 |

[51] Int. Cl.[5] .................................. G06F 13/00
[52] U.S. Cl. .................. 364/200; 364/241.8; 364/232.22
[58] Field of Search .............. 364/200 MS File; 370/94.1

[56] References Cited

U.S. PATENT DOCUMENTS 4,591,979 5/1986 Iwashita .......................... 364/200
4,675,806 6/1987 Uchida ........................... 364/200

OTHER PUBLICATIONS

Iwanami Koza Microelectronics 8, VLSI Computer I by T. Motooka, Oct. 10, 1984, pp. 82-87.

Primary Examiner—Thomas M. Heckler
Attorney, Agent, or Firm—Lowe, Price, LeBlanc, Becker & Shur

[57] ABSTRACT

In a data flow machine, a program stored in advance is read out based on a tag included in a packet when the packet including first data is inputted from an external portion. Then, an instruction packet is formed by the content read out as a new tag and the first data, so that the instruction packet is outputted. Second data including the same tag as that included in the first data of the instruction packet read out from the program memory is detected. Firing processing is performed with respect to the first data and the second data as a pair and arithmetic processing is performed according to the instruction as a part of the tag included in an arithmetic packet, so that the arithmetic packet is outputted as a packet. The tag included in the packet is determined and the packet is outputted to an external portion or is inputted again to the internal portion.

56 Claims, 46 Drawing Sheets

FIG. 3 PRIOR ART

| MEMORY ADDRESS | NODE NUMBER |
|:---:|:---:|
| 0 | 0 , 4 |
| 1 | 1 , 5 |
| 2 | 2 , 6 |
| 3 | 3 , 7 |

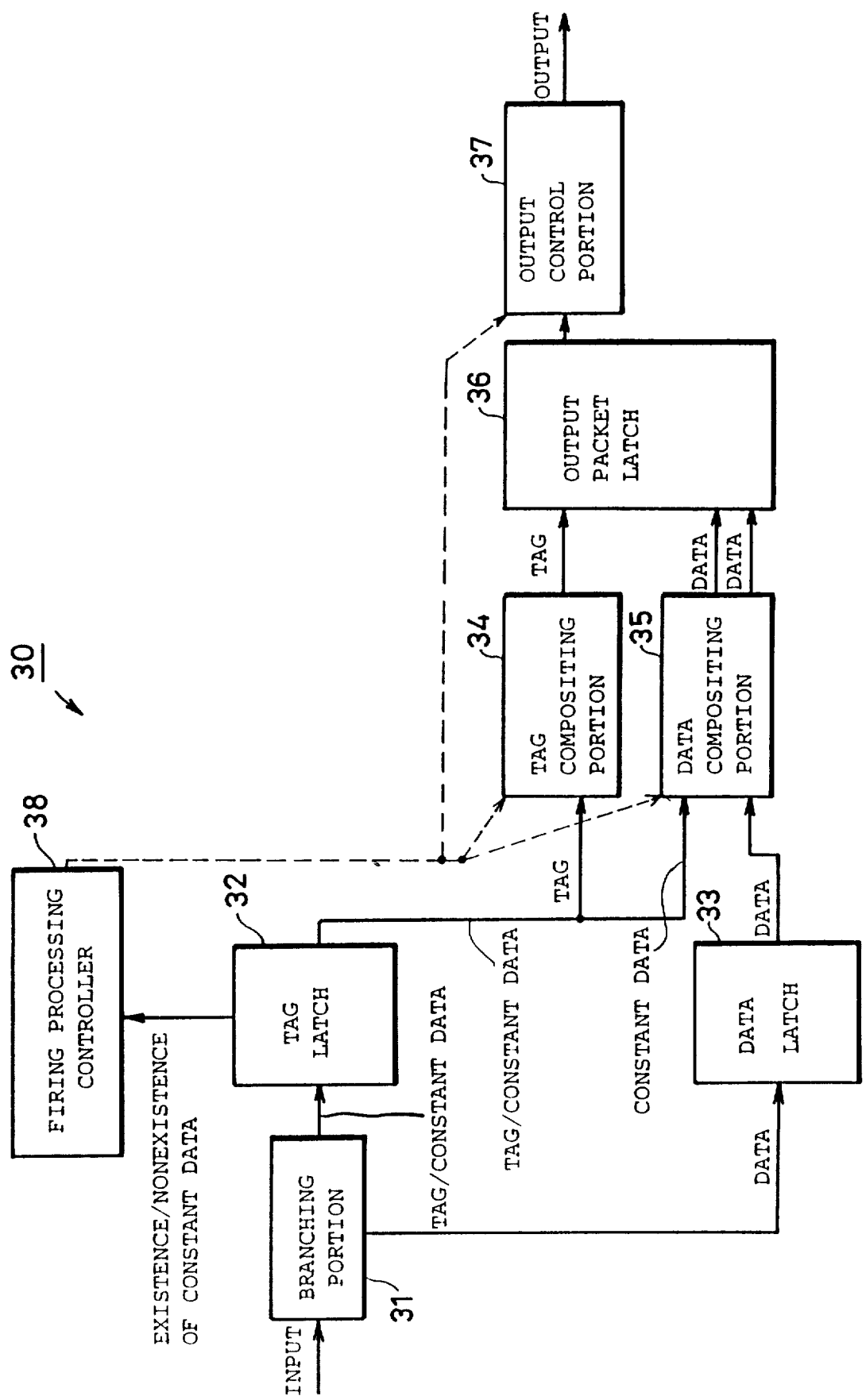

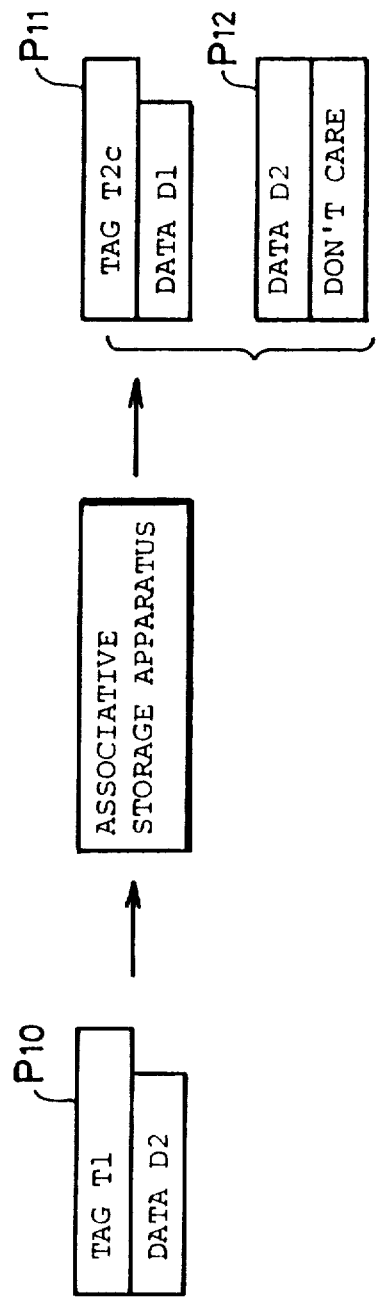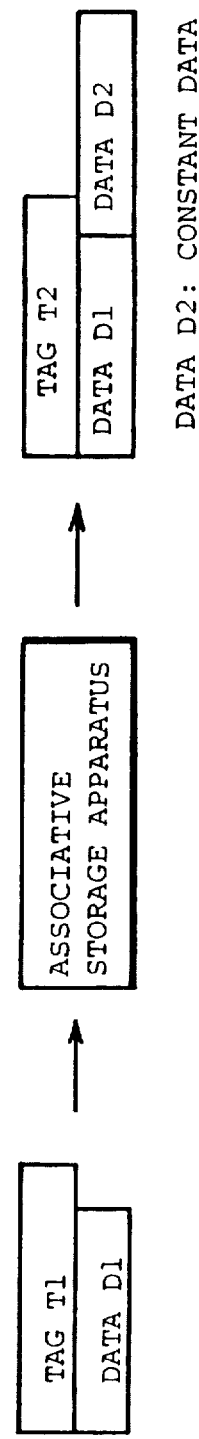

FIG. 26A

PACKET FORMAT: | MODE | GENERATION NUMBER | NODE NUMBER | OPERATION CODE | DATA 1 | DATA 2 | — P5

FIG. 26B

INPUT PACKET TO PARALLEL INTERFACE PORTION: | MODE (VALUE OUTPUT) | GENERATION NUMBER | NODE NUMBER (VALUE CHANNEL NUMBER) | OPERATION CODE |

P6: OUTPUT PACKET — | DATA |

FIG. 26C

INPUT PACKET TO PARALLEL INTERFACE PORTION: | MODE (MODE INITIALIZATION) | GENERATION NUMBER (INITIALIZATION VALUE OF GENERATION NUMBER COUNTER) | NODE NUMBER (CHANNEL NUMBER) | OPERATION CODE | DATA VALUE (INITIAL VALUE OF GENERATION NUMBER) |

P7: INITIALIZATION PACKET (INITIALIZATION OF GENERATION NUMBER COUNTER)

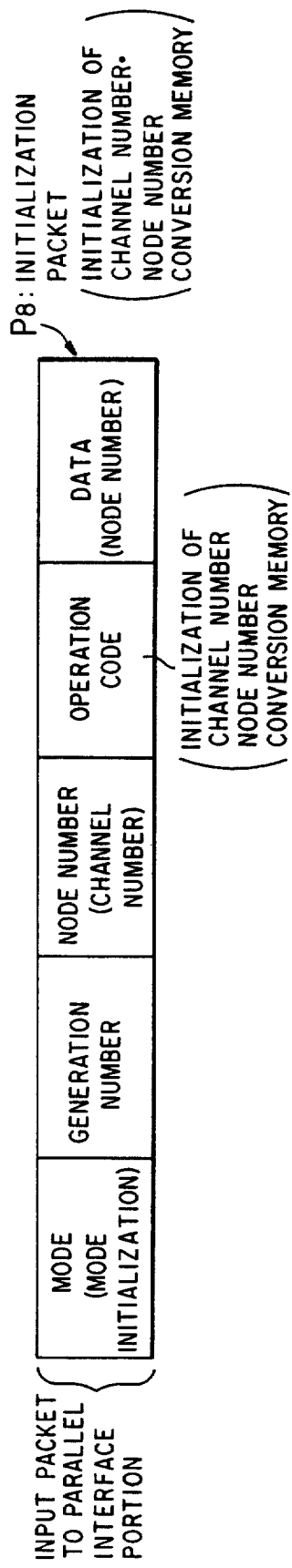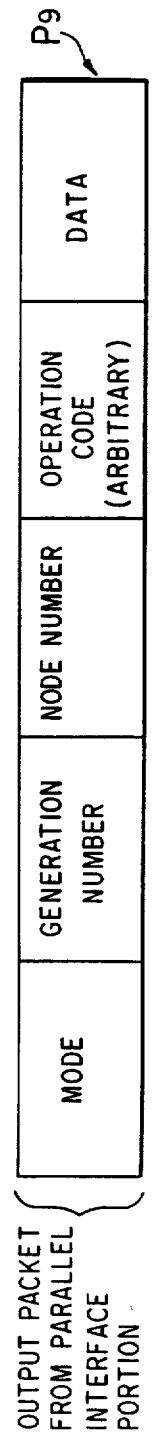
FIG. 26D
FIG. 26E

FIG. 35

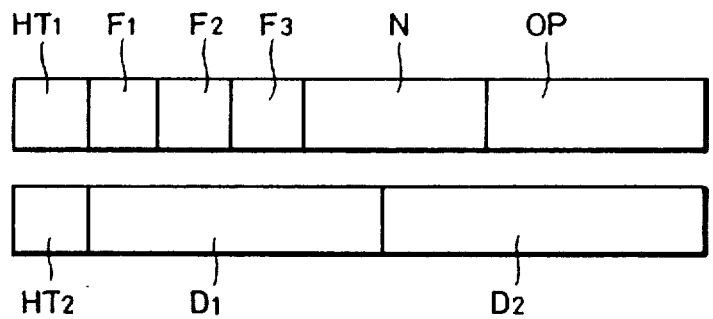

HT1,2 : HEADER-TAIL FLAG

H : HEADER

T : TAIL

F1 : DESTINATION FLAG

IN: INSIDE OF DATA FLOW MACHINE

M : EXTERNAL MEMORY INTERFACE

F2 : PROGRAM STORAGE THROUGH FLAG

1 : THROUGH

0 : NOT THROUGH

F3 : EXTERNAL MEMORY FLAG

1 : EXISTENCE OF EXTERNAL MEMORY

0 : NONEXISTENCE OF EXTERNAL MEMORY

MF1 : ARBITRARY

N : NODE NUMBER

NODE1 ~ NODE6 : ARBITRARY

OP : OPERATION CODE

OPC1 ~ OPC4 : ARBITRARY

RG : RG INSTRUCTION

PG : PG INSTRUCTION

D1, D2 : DATA

DATA1 : ARBITRARY

TAG1 : | H | IN | 1 | 0 | NODE 3 | PG |

TAG2 : | H | IN | 1 | MF1 | NODE 6 | OPC4 |

DATA READ OUT FROM MEMORY

ADD1 : PHYSICAL ADDRESS READ OUT FROM MEMORY AS RESULT OF ARITHMETIC OPERATION AT NODE 1

FIG. 37

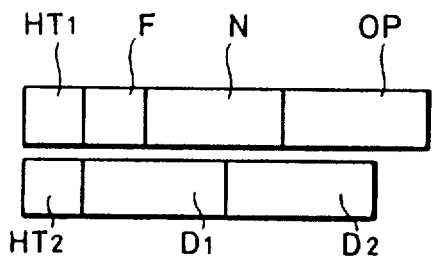

HT1,2: HEADER·TAIL FLAG

H : HEADER (FIRST WORD)

T : TAIL (SECOND WORD)

N : NODE NUMBER

NODE1 ~ NODE3 : ARBITRARY

OP : OPERATION CODE

OPC1 : DATA 1 IS RESULT OF ARITHMETIC OPERATION BY OP 1
    OPC2 : ADD 1 IS RESULT OF ARITHMETIC OPERATION BY OP 2
    WG   : OPERATION CODE WRITTEN IN EXTERNAL STORAGE APPARATUS

D1,2 : DATA

DATA1 : WRITE DATA

ADD1 : WRITE ADDRESS

F : DESTINATION FLAG

IN : INSIDE OF DATA FLOW MACHINE

M : OUTPUT CONTROL (EXTERNAL MEMORY INTERFACE)

① ~ ⑰ : PACKET 1 ~ PACKET 17
㊸ ~ ㊿ : PACKET 43 ~ PACKET 50
N1 ~ N10 : NODE 1 ~ NODE 10

⑯ – ㊷ : PACKET 16 ~ PACKET 42

N11 ~ N21 : NODE 11 ~ NODE 21

DATA FLOW MACHINE

BACKGROUND OF THE INVENTION

1. Field of the Invention

The present invention relates to a data flow machine. More particularly, the present invention relates to a data flow machine in which an associative storage apparatus reads out, from data groups, data having a pattern identical to the pattern of data whose collating field is designated, and arithmetic processing of the data is performed.

2. Description of the Prior Art

FIG. 1 is a configuration diagram of a conventional data flow machine described for example in Iwanami Koza Microelectronics 8, VLSI Computer I (pp. 82-87, edited by T. Motooka, Oct. 10, 1984, Iwanami Shoten, Publishers). Referring to FIG. 1, the data flow machine comprises: an instruction packet forming portion for receiving an instruction, a type of the instruction and a destination node number outputted from a code memory 4 as well as two operands outputted from an operand memory 7 to form an instruction packet; an arithmetic processing unit for performing arithmetic processing according to the instruction upon receipt of the instruction packet; a result queue for temporarily storing a result packet outputted from the processing unit 2; a code memory 4 for storing a program to be executed and reading an instruction to be executed next, the type of the instruction and the destination node number according to the destination node number of the result packet; a switch 5 for determining the type of the instruction read out from the code memory 4 and selecting a path to the instruction packet forming portion 1; an associative storage portion 6 of an associative storage apparatus for providing an address of an operand memory 7 based on an activity number of the result packet (in a context for repeating the instruction or calling a procedure) and the destination node number; and the operand memory 7 of the associative storage apparatus for detecting a state in which two operands are received and ready for arithmetic processing.

Operation of the above described machine will be described.

When arithmetic processing is ready to be performed according to an instruction A, the instruction packet forming portion 1 receives the instruction outputted from the code memory 4 as well as the type of the instruction and the destination node number outputted therefrom and receives the activity number and one or two operands outputted from the operand memory 7 or the result queue 3, whereby an instruction packet A is formed and outputted to the arithmetic processing unit 2. Upon receipt of the instruction packet A, the arithmetic processing unit 2 performs arithmetic processing for the operands according to the instruction of the packet and outputs a result packet. The result packet is formed with the activity number of the instruction packet A and the destination node number being maintained. The result packet outputted from the arithmetic processing unit 2 is inputted to the result queue 3. The result queue 3 temporarily stores the result packet and outputs the destination node number of the result packet to the code memory 4. Upon receipt of the destination node number, the code memory 4 reads out, from this destination node number, the stored instruction, the type of the instruction and the destination node number (i.e., an instruction B). The instruction B is outputted to the switch 5 and the instruction packet forming portion 1. Upon receipt of the instruction B, the switch 5 examines the type of the instruction indicating whether the instruction is a 1-input instruction or a 2-input instruction and then, the switch 5 outputs the result to the result queue 3. If the type of the instruction is the 1-input instruction, the switch 5 connects the result queue 3 with the instruction packet forming portion 1. If it is the 2-input instruction, the switch 5 connects the operand memory 7 with the instruction packet forming portion 1.

Upon receipt of the type of the instruction from the switch 5, the result queue 3 outputs the result packet to the switch 5 if the type of the instruction indicates the 1-input instruction. At this time, the path from the result queue 3 to the instruction packet forming portion 1 is already set by the switching of the switch 5 and accordingly the result packet outputted from the result queue 3 is transmitted to the input packet forming portion 1 as a fired packet so that an instruction packet is formed by the thus transmitted packet as well as the instruction, the type of the instruction and the destination node number already outputted from the code memory 4.

If the type of the instruction from the switch 5 indicates the 2-input instruction, the result queue 3 outputs the result packet to the associative storage portion 6. The associative storage portion 6 hashes the activity number and the destination node number from the result queue 3. It associates the hashed numbers with an address in a queuing area for firing and outputs the address, as an address of the operand memory 7, together with the result packet.

The operand memory 7 receives the address and the result packet outputted from the associative storage portion 6 and reads out a content of the operand memory 7 corresponding to the address. If the other operand out of the two operands does not arrive, the result packet is stored in the address outputted from the associative storage portion 6 in the operand memory 7, so that a state waiting for the operand is set. On the other hand, if the other operand is already stored, the result packet outputted from the associative storage portion 6 is enabled to be fired and the result packet together with the already stored operand is outputted to the switch 5. At this time, since the type of the instruction indicates the 2-input instruction, the path from the operand memory 7 to the instruction packet forming portion 1 is already set by the switching of the switch 5 and accordingly the packet outputted from the operand memory 7 is transmitted to the instruction packet forming portion 1 so as to be the instruction packet.

Let us consider a case in which procedures according to a data flow graph of FIG. 2 are executed in the data flow machine in which the associative storage apparatus including the associative storage portion 6 and the operand memory 7 is used as a firing processing portion. In the following description, it is assumed that the operand memory 7 has a capacity for storing four operands.

Memory addresses of the operand memory 7, outputted from the associative storage portion 6 are four memory addresses for storing operands. The node numbers of the data flow graph of FIG. 2 are represented as the memory addresses shown in FIG. 3 and outputted to the associative storage portion 6. Thus, referring to FIG. 2, the first packet as a left input of the node number 3 and the second packet as a left input of the node number 7 indicate the same memory address in the operand memory 7 (i.e., the memory address "3"). If the second packet is stored in the operand memory 7 earlier than the first packet, the second packet waits for the third packet as a right input of the node number 7. The third packet is formed only after the operations of the node numbers 3, 5 and 6 are executed. However, since the first packet and the second packet collide, the first packet is not stored in the operand memory 7 and accordingly the operation of the node number 3 is not executed and as a result, execution of the data flow is stopped.

Thus, in the data flow machine using the associative storage apparatus having a smaller capacity than the number of nodes of the data flow to be executed, the same memory address is used for plural nodes for firing at the time of executing the data flow for a capacity larger than that of the operand memory. Consequently, there is involved a disadvantage that a collision might occur dependent on the order of the arrival of packets, causing stop of the execution of the data flow.

SUMMARY OF THE INVENTION

Therefore, a primary object of the present invention is to provide a data flow machine in which if a packet in an operand memory collides with a packet inputted to the operand memory, the packet having the smaller destination node number at a higher level in a data dependency relation can be preferentially stored and it is made possible to continuously execute operations of a data flow graph having a capacity of a larger number of nodes than the capacity of the operand memory without stopping the execution.

Another object of the present invention is to provide a data flow machine in which a program size is not limited by restriction on an amount of hardware of a chip, causing no stop of execution of a program due to frequent hash collisions.

A further object of the present invention is to provide a data flow machine comprising an associative storage apparatus capable of processing constant data efficiently only if the amount of hardware is increased as little as possible.

A still further object of the present invention is to provide a data flow machine comprising an input/output interface device of a relatively simple construction capable of arbitrarily setting a generation number and a node number of a tag, whereby the machine can be connected directly to an external apparatus without taking any trouble of decomposing and recomposing packets.

A still further object of the present invention is to provide a data flow machine in which operation of a recursive function can be continuously executed without causing a lack of colors, i.e., without being stopped due to the lack of colors, because a color obtained at a higher level of a hierarchy is set free and a return node number is pushed to a return stack so as to be popped at the time of the return.

A still further object of the present invention is to provide a data flow machine capable of performing flexible processing using an arithmetic processing unit for data with respect to components of a tag, capable of writing or reading a tag and data into and from an external memory, and also capable of switching from a program in execution to a special program to be executed, according to information of a packet.

The present invention in a first aspect comprises an associative storage apparatus of a data flow machine, which is adapted to be operated in the following manner. A tag of a first input packet including the inputted tag and data is hashed and an address of matching storage means is determined. The first input packet stored in a write register and a first presence bit indicating validity or invalidity of the first packet are stored in the matching storage means. It is determined based on a second presence bit read out from the matching storage means whether a second packet is valid or not. The tag of the first packet stored in the write register and a tag of the second packet read out from the matching storage means are compared. If those tags match, the first packet to which data of the second packet is attached is outputted. If they do not match, either of the first and second packets is outputted.

Consequently, according to the first aspect of the invention, if the packets collide in the matching storage means, the tags of the colliding packets are compared and the tags are left in the matching storing means in the order where the tags are successively increased from a higher level to a lower level based on a dependent relation of data. Thus, the associative storage apparatus is able to continuously execute the program without stopping it due to the collision of the packets.

In a second aspect of the present invention, a packet including first data is inputted from an external portion to input means. A program stored in advance is read out according to a tag of the inputted packet. The content read out is used as a new tag and is outputted together with the first data as an instruction packet. Then, second data including a tag identical to that included in the first data of the instruction packet thus read out is detected, thereby to perform firing processing for pairing the first data with the second data and outputting the pair as an arithmetic packet. Then, arithmetic processing is performed according to an instruction as a part of the tag included in the arithmetic packet. The result of the processing is outputted as a packet, and a tag included in the packet is determined so that it is outputted to an external portion or to the input means. Firing processing means hashes a tag of the first input packet including the inputted tag and data and designates an address in the matching storage means. The firing processing means stores, in the designated address, the first packet and a first presence bit stored in a write register, and it reads out a second packet and a second presence bit from the matching storage means to determine based on the second presence bit whether the second packet is valid or not. It compares the tags of the first packet and the second packet. When they match, it outputs the first either packet with data of the second packet being attached thereto. When they do not match, it outputs the first packet or the second packet.

Thus, according to the second aspect of the invention, it is made possible to provide a data flow machine using, as a firing processing portion, an associative storage apparatus having matching storage means of only a small capacity.

In a third aspect of the invention, hash collision processing means is provided in an external portion. Information indicating that a hash collision occurs between two packets is added to one of the packets to be outputted and the information indicating that the hash collision occurs is added to the other packet to be stored in the matching storage means. The packet outputted is saved in external hash collision processing means and when the hash collision disappears, the saved packet is subjected again to firing processing.

Thus, according to the third aspect of the invention, one of the packets having caused the hash collision is saved in an external portion and accordingly a storage capacity of the matching storage means can be reduced and frequent occurrence of hash collisions can be avoided, whereby execution of operations can be prevented from being stopped.

In a fourth aspect of the invention, constant data in a program is stored in advance in program storage means. If the constant data is required, a tag of an input packet is updated and a packet including the constant data read out from the program storage means is outputted.

Thus, according to the fourth aspect of the invention, a constant flag indicating that the constant data is stored in a storage area of the program storage means is provided and it is only necessary to provide control means for controlling the program storage means to process the constant data. Accordingly, efficiency for using the matching storage means can be increased and it is not necessary to input constant data from an external portion.

In a fifth aspect of the invention, data of an output packet is outputted to an external apparatus identified by tag information and tag forming means initialized forms a tag according to the tag information inputted from the external apparatus, thereby to form an input packet by the tag and input data.

Thus, according to the fifth aspect of the invention, it is not needed to provide means for forming a packet or means for decomposing a packet in an external apparatus.

In a sixth aspect of the invention, two packets each having a tag and data as a data portion are formed in program storage means and changing of the tags of those packets and other operation are performed in arithmetic processing means.

Thus, according to the sixth aspect of the invention, a program can be treated as constant data or as data stored in an external storage apparatus. If a storage capacity of an external memory is increased, the data flow machine is able to execute a very large program. In addition, data necessary for memory access can be efficiently transmitted as one packet.

In a seventh aspect of the invention, a color used at a higher level in a hierarchy is set free according to a free-c instruction and a packet is stored in a recursion stack according to an st-des instruction, whereby the packet is taken out from the recursion stack according to a pop instruction to perform operation of a recursive function.

Thus, the data flow machine is able to perform operation of a recursive function requiring colors more than the number of colors to be represented in a generation/a color region of a packet.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a relation between addresses of an operand memory and node numbers shown in FIG. 1.

FIG. 21 is a concrete block diagram of a part of a firing processing portion shown in FIG. 19.

FIGS. 22A to 22C are diagrams showing formations of input and output packets used in the fifth embodiment of the present invention.

FIGS. 26A to 26E are diagrams showing formations of packets used in the sixth embodiment.

FIG. 35 is an illustration showing formations of packets used in the seventh embodiment.

FIG. 37 is an illustration of a formation of a packet for explaining writing operation of data into an external memory.

DESCRIPTION OF THE PREFERRED EMBODIMENTS

Figure 4:
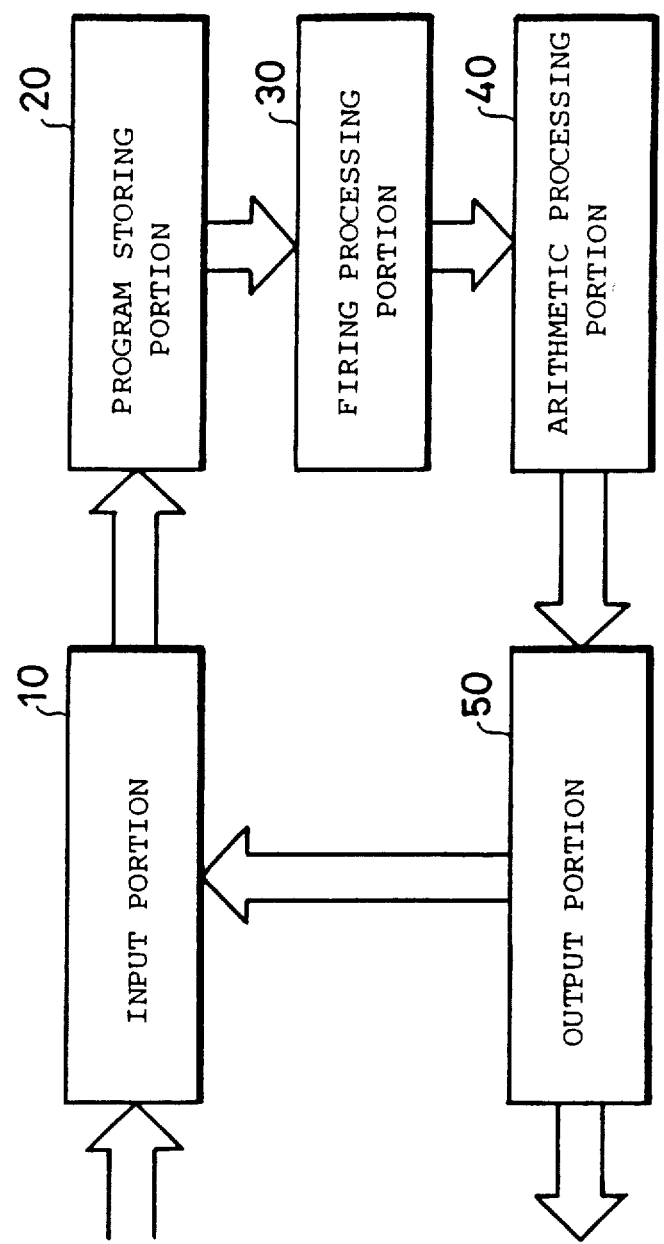
FIG. 4 is a schematic block diagram showing a configuration of a first embodiment.

FIG. 4 is a schematic block diagram of the first embodiment of the present invention.

Referring to FIG. 4, a packet is inputted from an external portion to an input portion 10. The packet includes data and a tag for identifying the data. The packet inputted to the input portion 10 is supplied to a program storing portion 20. The program storing portion 20 stores a data flow graph in advance and reads out an instruction based on the tag of the packet outputted from the input portion 10 to supply it as an instruction packet to a firing processing portion 30. The firing processing portion 30 receives the instruction packet outputted from the program storing portion 20 and detects another instruction packet already stored therein and including the same tag as that of the received instruction packet to output the instruction packet as an arithmetic packet or stores the instruction packet outputted from the program storing portion 20. The arithmetic packet outputted from the firing processing portion 30 is supplied to an arithmetic processing portion 40. The arithmetic processing portion 40 performs arithmetic operation designated by the instruction included in the arithmetic packet and outputs a result packet to an output portion 50. The output portion 50 receives the result packet outputted from the arithmetic processing portion 40 and if an external flag as a part of the tag included in the result packet indicates "external output", it outputs the result packets to an external portion. If the external flag indicates "internal output", it outputs the result packet to the input portion 10.

Figure 5:
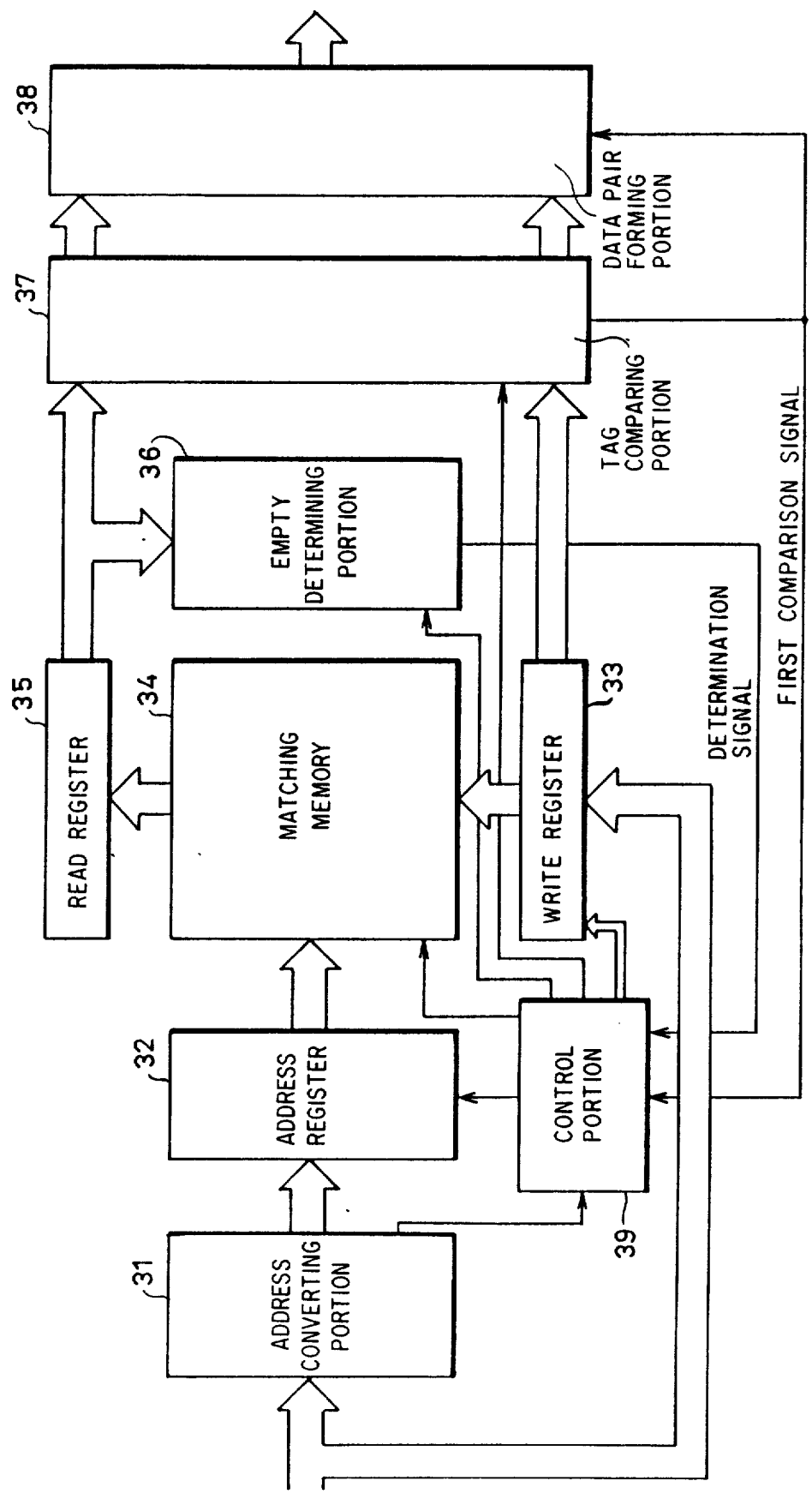
FIG. 5 is a concrete block diagram of an associative storage apparatus as a firing processing portion included in the data flow machine shown in FIG. 4.

FIG. 5 is a concrete block diagram of the firing processing portion included in the data flow machine shown in FIG. 4.

Referring to FIG. 5, an address converting portion 31 hashes a tag of a first instruction packet outputted from the program storing portion 20 and determines a memory address to output a packet input signal and a memory address signal. The memory address signal is supplied to an address register 32 and the address register 32 stores the memory address signal. The memory address signal stored in the address register 32 is supplied to a matching memory 34. The first instruction packet outputted from the program storing portion 20 is also supplied to a write register 33. The write register 33 stores the first instruction packet.

The write register 33 includes an area for storing a first presence bit indicating whether the first instruction packet is valid or invalid. The first instruction packet and the first presence bit stored in the write register 33 are supplied to the matching memory 34.

The matching memory 34 reads out a second packet and a second presence bit stored in an area corresponding to the memory address signal supplied from the address register 32 upon receipt thereof or writes the first instruction packet and the first presence bit supplied from the write register 33 into an area designated by the memory address signal. The second instruction packet and the second presence bit read out from the matching memory 34 are supplied to a read register 35 and the read register 35 stores the second instruction packet and the second presence bit therein. The second presence bit stored in the read register 35 is supplied to an empty determining portion 36.

The empty determining portion 36 determines based on the second presence bit whether the second instruction packet is valid or not, and it supplies a determination signal to a control portion 39. The second instruction packet outputted from the read register 35 and the first instruction packet outputted from the write register 33 are supplied to a tag comparing portion 37. The tag comparing portion 37 compares tags included in the first and second instruction packets and determines whether those tags match or which of them is larger. More specifically, the tag comparing portion 37 compares the tag of the first instruction packet and the tag of the second instruction packet and outputs the result of the comparison as a first comparison signal, which is supplied to the control portion 39 and a data pair forming portion 38.

If the tag of the first packet and the tag of the second packet match, the tag comparing portion 37 outputs the first and second instruction packets to the data pair forming portion 38. If the tag of the first instruction packet and the tag of the second instruction packet do not match, the tag comparing portion 37 supplies the packet including the larger tag to the data pair forming portion 38.

The data pair forming portion 38 receives the first comparison signal and both of or either of the first and second instruction packets outputted from the tag comparing portion 37 and outputs an arithmetic packet or a through packet. If the first comparison signal indicates the match, the data pair forming portion 38 outputs the arithmetic packet by adding the data of the second instruction packet to the first instruction packet. If it indicates a mismatch, the data pair forming portion 38 sets, to a through state, a through packet flag as a part of the tag for the packet having the larger tag out of the first and second instruction packets, thereby to output the through packet.

The control portion 39 receives the packet input signal, the determination signal and the first comparison signal to control reading of a packet from the matching memory 34 or writing of a packet therein and to control enabling of the empty determining portion 36 or the tag comparing portion 37. In addition, if the first comparison signal indicates the match, the control portion 39 renders invalid the first presence bit stored in the write register 33. If it indicates a mismatch, the control portion 39 renders the first presence bit valid and controls writing of the instruction packet and the first presence bit into the matching memory 34.

Figure 6:
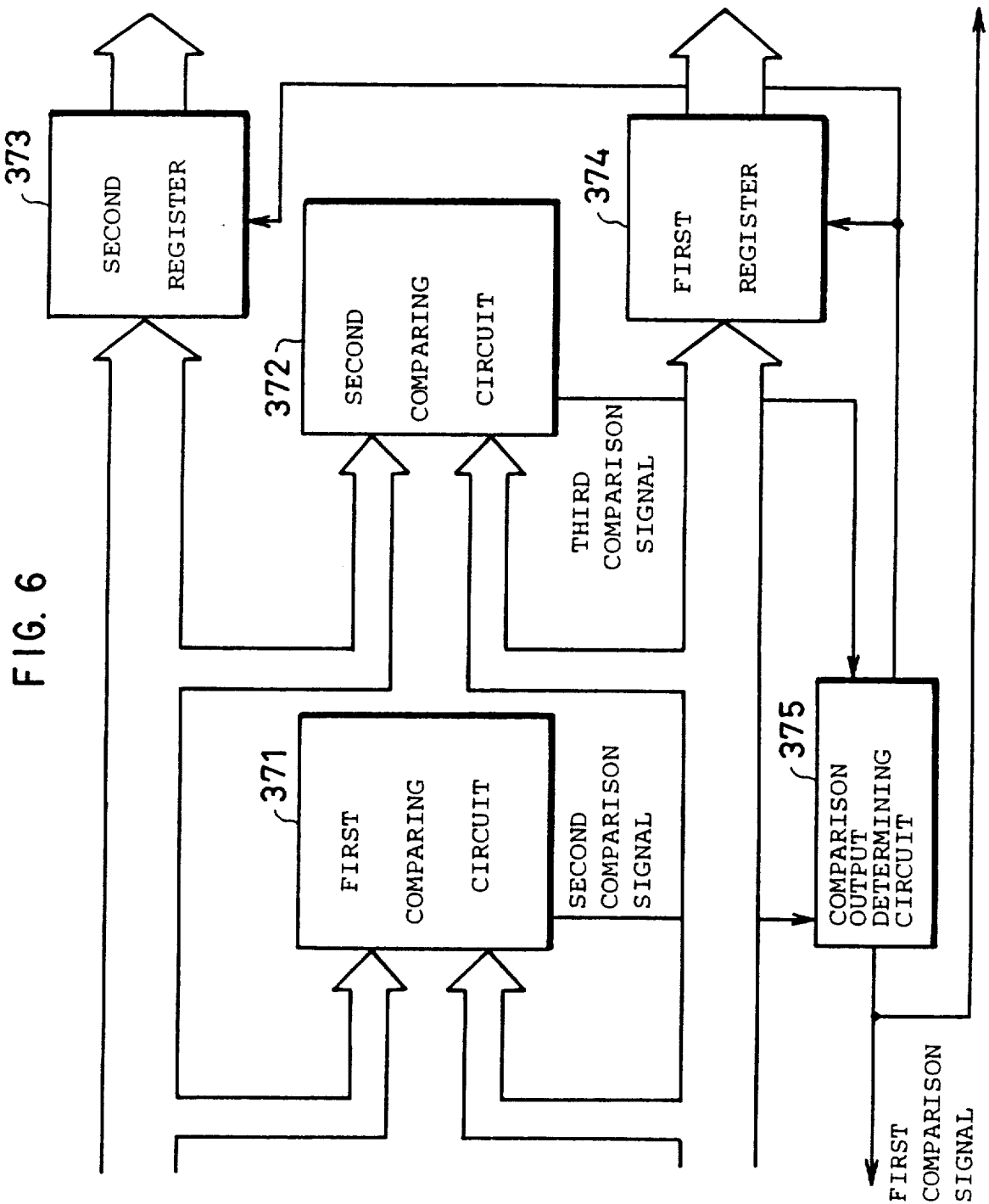
FIG. 6 is a concrete block diagram of a tag comparing portion included in the firing processing portion shown in FIG. 5.

FIG. 6 is a concrete block diagram of the tag comparing portion included in the firing processing portion shown in FIG. 5.

Referring to FIG. 6, a first comparing circuit 371 receives and compares generation numbers or color numbers as environment identifiers included in the tags of the first and second instruction packets outputted from the write register 33 and the read register 35, respectively. Then, it detects a match or a magnitude relation between them and outputs a detection signal as a second comparison signal. The generation number serves to identify data when a plurality of data are to be processed according to the same program. The color number serves to identify an environment when a part of the same program is used repeatedly.

A second comparing circuit 372 receives and compares destination node numbers included in the tags of the first and second instruction packets outputted from the write register 33 and the read register 35, respectively, and it detects a match or a magnitude relation between them and outputs a result of detection as a third comparison signal. A second register 373 stores the second instruction packet outputted from the read register 35. A first register 374 stores the first instruction packet outputted from the write register 33. The node number as mentioned above is attached to an arithmetic packet to indicate a specified entry on the program.

A comparison output determining circuit 375 receives the second and third comparison signals and outputs either of them as the first comparison signal and it controls the first and second registers 374 and 373. More specifically, the comparison output determining circuit 375 outputs the second comparison signal as the first comparison signal when the second comparison signal indicates a mismatch. It outputs the third comparison signal as the first comparison signal when the second comparison signal indicates a match. Thus, the first comparison signal is used to control output of the first and second instruction packets stored in the first and second registers 374 and 373, respectively.

Figure 7:
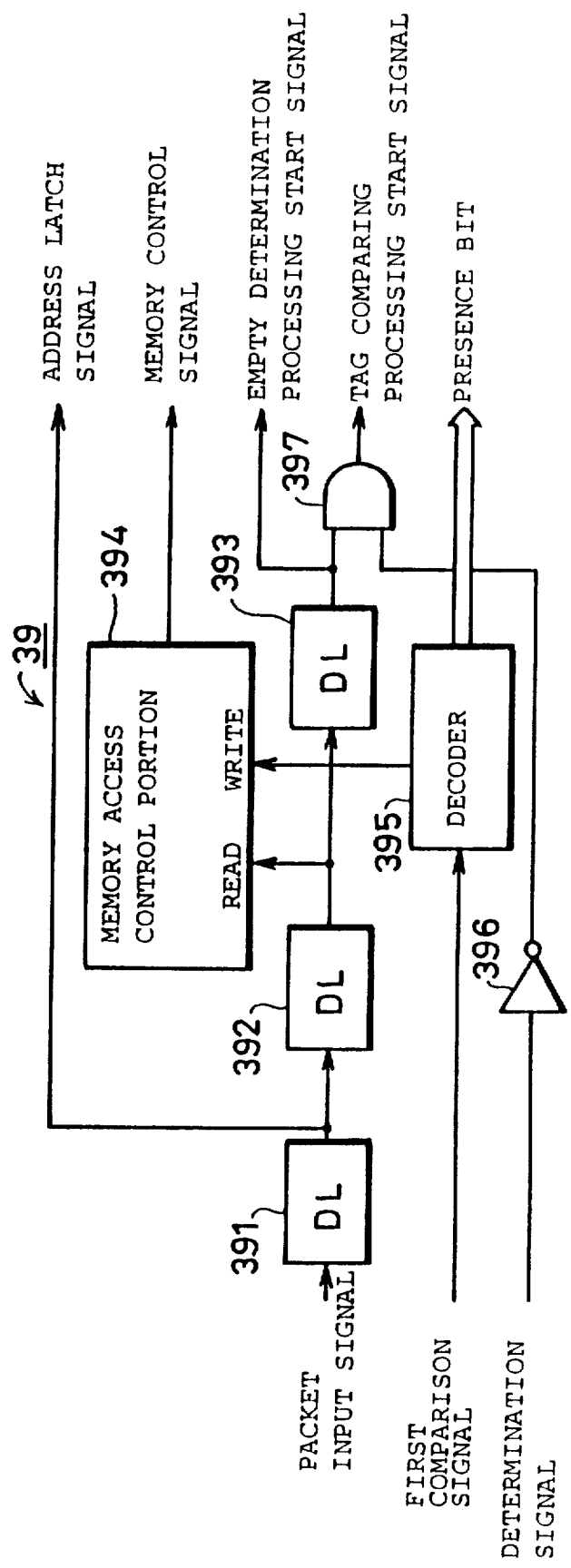
FIG. 7 is a concrete block diagram of a control portion included in the firing processing portion shown in FIG. 5.

FIG. 7 is a concrete block diagram of the control portion included in the firing processing portion shown in FIG. 5.

Referring to FIG. 7, the packet input signal is supplied to a first delay circuit 391 and it is delayed by a predetermined period so as to be supplied to a second delay circuit 392. At the same time, it is also supplied to the address register 32 as an address latch signal for latching, in the address register 32, the memory address signal outputted from the address converting portion 31 shown in FIG. 5. The second delay circuit 392 further delays the packet input input signal and supplies it as a read signal to a memory access control portion 394 and also supplies it to a third delay circuit 393. The third delay circuit 393 further delays the packet input signal and supplies it to the empty determining portion 36 as an empty determining processing start signal and also supplies it to an input and of an AND gate 397. The determination signal is inverted by an inverter 396 and supplied to another input end of the AND gate 397. An output of the AND gate 397 is supplied to the tag comparing portion 37 as a processing start signal. Further, the first comparison signal is supplied to a decoder 395. The decoder 395 decodes the first comparison signal and provides an output as a write signal to the memory access control portion 394. At the same time, it decodes the presence bit and provides an output to the write register 33. The memory access control portion 394 outputs a memory control signal for controlling the matching memory 34.

Figure 8:
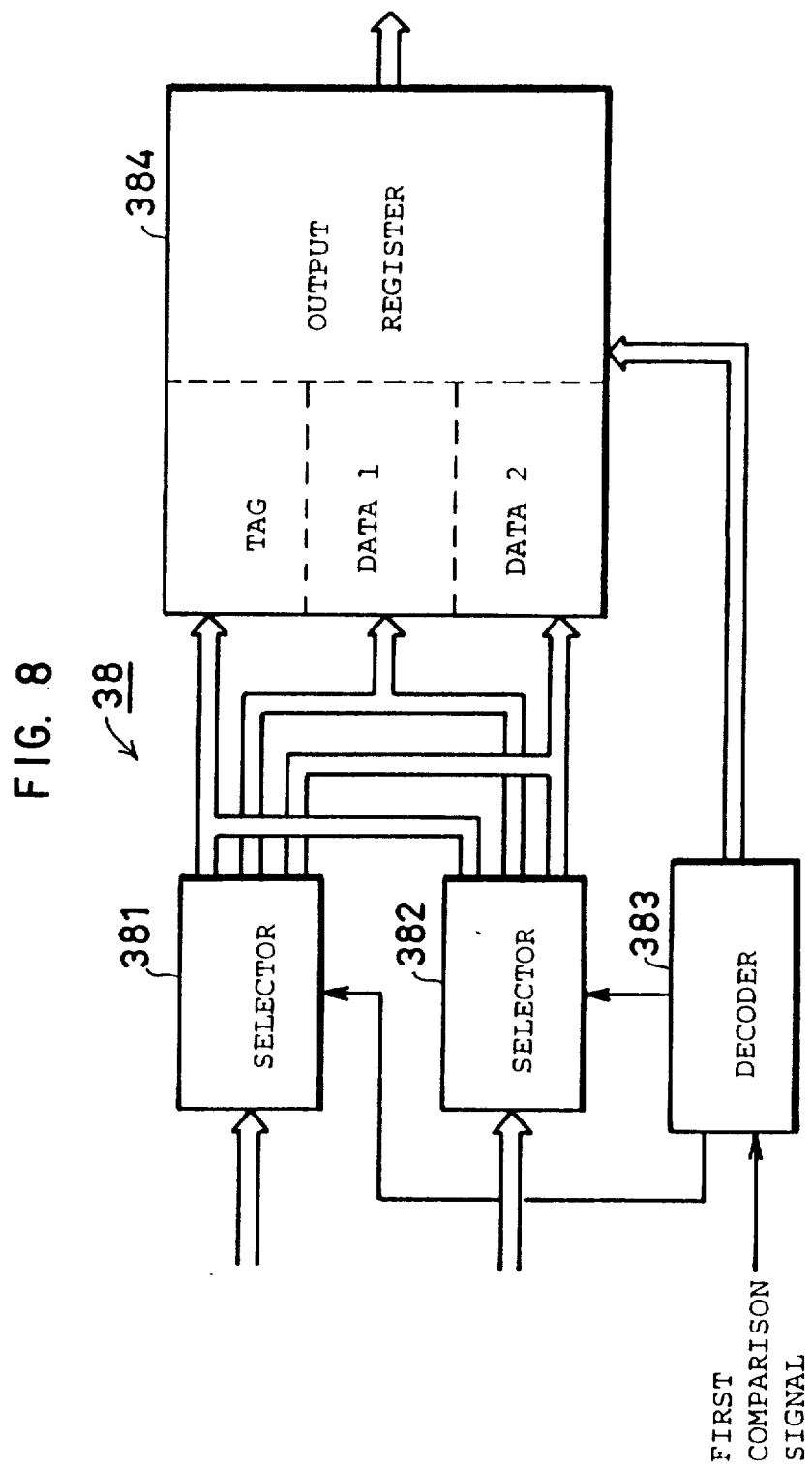
FIG. 8 is a concrete block diagram of a data pair forming portion included in the firing processing portion shown in FIG. 5.

FIG. 8 is a concrete block diagram of the data pair forming portion included in the firing processing portion shown in FIG. 5.

Referring to FIG. 8, the data pair forming portion 38 comprises selectors 381 and 382, a decoder 383 and an output register 384. The selector 381 receives the second instruction packet from the tag comparing portion 37, while the selector 382 receives the first instruction packet from the tag comparing portion 37. The selector 381 selects the tag and either data 1 or data 2 included in the second instruction packet in response to a decoding signal supplied from the decoder 383. The selector 382 selects the tag and either data 1 or data 2 included in the first instruction packet in response to the decoding signal supplied from the decoder 383. The tags and the data 1 or the data 2 selected by the selectors 318 and 382 are supplied to the output register 384. The output register 384 stores the selected tag and data 1 or data 2 and supplies the same to the arithmetic processing portion 42.

Figure 9:
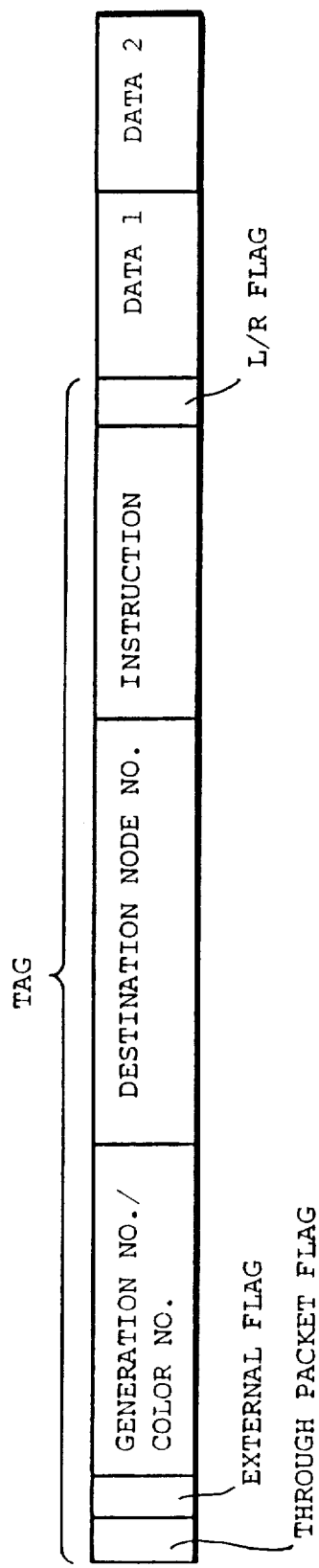
FIG. 9 is an illustration showing a formation of a packet used in the first embodiment of the present invention.
Figure 10:
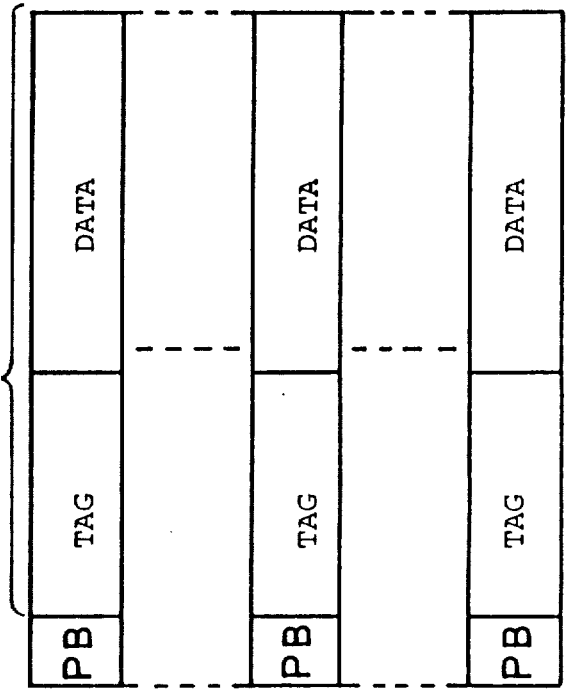
FIG. 10 is an illustration showing tags and data stored in a memory shown in FIG. 5.

FIG. 9 is an illustration showing a formation of a packet used in the first embodiment of the present invention and FIG. 10 is an illustration showing tags and data stored in the matching memory shown in FIG. 5.

As shown in FIG. 9, a packet includes a tag as an identifier of data, data 1 and data 2. The tag is composed of a through packet flag, an external flag, a generation number or a color number, a destination node number, an instruction and an L/R flag indicating a right or left input of data applied to the instruction.

The matching memory 34 stores, as a piece of information, a presence bit and an instruction packet including a tag and data, as shown in FIG. 10. The presence bit indicates whether the tag and the data are valid or not.

Referring now to FIGS. 4 to 10, operation of the first embodiment will be described. The input portion 10 receives a packet including a tag and data 1 inputted from an external portion, or a packet including a tag and data 1 outputted from the output portion 50. The input portion 10 outputs the packet thus received to the program storing portion 20. A data flow graph is stored in a program memory (not shown) of the program storing portion 20. When the packet is inputted from the input portion 10 to the program storing portion 20, the program storing portion 20 uses, as an address, the destination node number included in the tag of the input packet and reads out, from the program memory, the destination node number, the instruction and the L/R flag indicating a left input or a right input through which data included in the input packet is applied to the instruction. Further, the program storing portion 20 updates the destination node number, the instruction and the L/R flag included in the tag of the input packet and outputs the same together with the data 1 as a first instruction packet.

The first instruction packet is supplied to the firing processing portion 30 and the firing processing portion 30 outputs an arithmetic packet. The firing processing portion 30 is formed by the associative storage apparatus as shown in FIG. 5. The first instruction packet outputted from the program storing portion 20 is supplied to the address converting portion 31 and the write register 33. The address converting portion 31 outputs to the control portion 39 a packet input signal indicating that the first instruction packet is inputted. At the same time, the address converting portion 31 hashes the generation number or the color number and the destination node number included in the tag of the first instruction packet and determines a memory address of the matching memory 34 to output the memory address signal.

Upon receipt of the packet input signal, the control portion 39 outputs an address latch signal for latching, in the address register 32, the memory address signal outputted from the address converting portion 31. In response to the address latch signal, the memory address signal is latched in the address register 32. Then, the control portion 39 outputs, to the matching memory 34, a memory control signal indicating reading or writing of the instruction packet from or into the matching memory 34.

In response to the memory control signal and the memory address signal outputted from the address register 32, the matching memory 34 outputs a presence bit stored in the designated address as the second presence bit and an instruction packet stored therein as the second instruction packet. The outputted second presence bit is outputted from the read register 35 to the empty determining portion 36 by control of the control portion 39.

The empty determining portion 36 determines, based on the second presence bit outputted from the read register 35, whether the second instruction packet is valid or not, and supplies a determination signal to the control circuit 39. If the determination signal indicates invalidity, the control portion 39 writes the second presence bit indicating validity in the write register 33 and outputs the memory control signal set in a writing state to the matching memory 34. Further, the control portion 39 controls the address register 32 to output the memory address signal stored in the address register 32 to the matching memory 34 and controls the write register 33 to output the first instruction packet and the first presence bit held therein to the matching memory 34.

When the control portion 39 outputs the memory control signal indicating a writing mode to the matching memory 34, the matching memory 34 stores the first packet and the first presence bit outputted from the write register 33 based on the memory address signal outputted from the address register 32. Consequently, if the determination signal indicates invalidity of the second instruction packet, an area of the matching memory 34 designated by the memory address signal stored in the address register 32 is empty and accordingly the first instruction packet and the first presence bit stored in the write register 33 are stored in the matching memory 34, which means that the instruction packet having the same tag is stored.

If the determination signal indicates validity of the second instruction packet, the control portion 39 controls the write register 33 and the read register 35 to output the first and second instruction packets stored in the write register 33 and the read register 35, respectively, to the tag comparing portion 37.

Now, operation of the tag comparing portion 37 will be described referring to the block diagram of FIG. 6. The first instruction packet outputted from the write register 33 is stored in the first register 374. The second instruction packet outputted from the read register 35 is stored in the second register 373. The generation numbers or the color numbers of the tags included in the first and second instruction packets outputted from the write register 33 and the read register 35, respectively, are supplied to the first comparing circuit 371, and the respective destination node numbers included therein are supplied to the second comparing circuit 372.

The first comparing circuit 371 compares the generation numbers or the color numbers included in the first and second instruction packets and detects a match or a magnitude relation between them to supply the result of the comparison as the second comparison signal to the comparison output determining circuit 375. On the other hand, the second comparing circuit 372 compares the destination node numbers of the first and second instruction packets and detects a match or a magnitude relation between them to output the result of the comparison as the third comparison signal to the comparison output determining circuit 375. If the second comparison signal indicates a mismatch, that is, it indicates that a collision of the packets occurs, the comparison output determining circuit 375 outputs the second comparison signal as the first comparison signal and controls the first and second registers 374 and 373 to output the packet having the larger generation number or color number out of the first and second instruction packets.

If the second comparison signal indicates the match, the comparison output determining circuit 375 outputs the third comparison signal as the first comparison signal. It controls the first and second registers 374 and 373 to output the first and second instruction packets if the third comparison signal indicates the match or to output the packet having the larger destination node number out of the first and second instruction packets if the third comparison signal indicates the mismatch.

Both of or either of the first and second instruction packets outputted from the tag comparing portion 37 is inputted to the selectors 381 and 382 of the data pair forming portion 38. The first comparison signal is supplied to the decoder 382. If the first comparison signal indicates the match, the decoder 383 supplies a selection signal for selecting the tag and the data 2 of the second instruction packet and the data 1 of the first instruction packet to the selectors 381 and 382. Thus, the tag and the data 2 of the second instruction packet and the data 1 of the first instruction packet are stored in the output register 384 and outputted. If the first comparison signal indicates the mismatch, the decoder 383 sets the through packets flag of the first or second instruction packet to the through state, thereby to output this instruction packet as the through packet.

If the first comparison signal indicates the match, the control portion 39 renders invalid the first presence bit stored in the write register 33. If the first comparison signal indicates that the tag of the first instruction packet is smaller than the tag of the second instruction packet, the control portion 39 renders the first presence bit of the write register 33 valid. The control portion 39 supplies the memory control signal indicating writing to the matching memory 34 and exerts control to output the memory address signal stored in the address register 32 and to output the first instruction packet and the first presence bit stored in the write register 33. Thus, the first instruction packet and the first presence bit are stored in the matching memory 34.

If the respective tags of the first and second instruction packets match in the above described operation, the first instruction packet and the second instruction packet are fired and the arithmetic packet is outputted. Further, the area of the matching memory 34 where the second instruction packet has been stored is caused to be invalid and the first presence bit of the write register 33 is caused to be invalid and stored in the matching memory 34.

If the tags of the first and second instruction packets do not match, that is, if a collision of the packets occurs, the second instruction packet stored in the matching memory 34 is changed with the instruction packet inputted to the firing processing portion 30 if the tag of the first instruction packet is smaller than that of the second instruction packet. If the tag of the first instruction packet is larger than that of the second instruction packet, the second instruction packet stored in the matching memory 34 is maintained stored and the first instruction packet is outputted.

Figure 1:
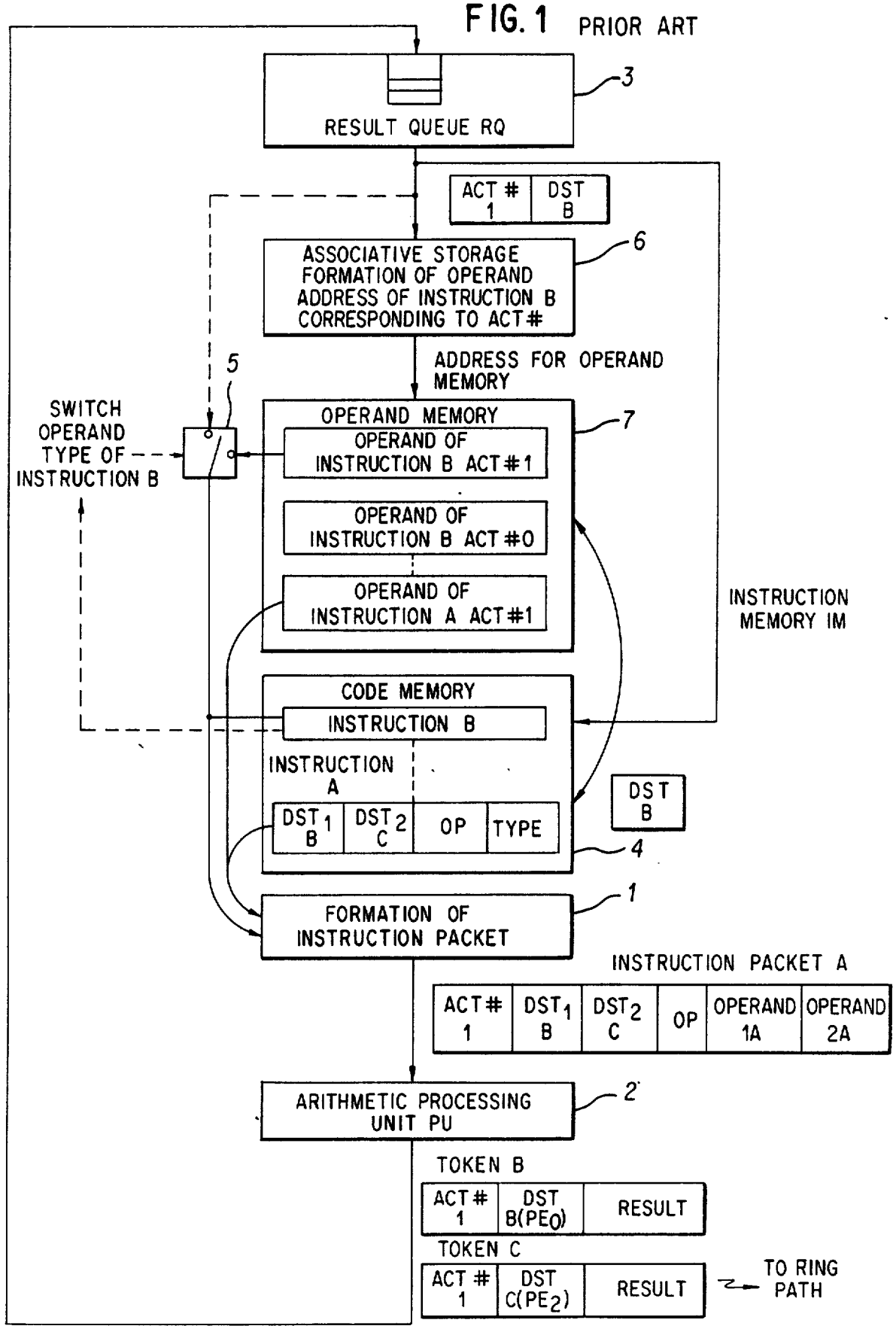
FIG. 1 is a schematic block diagram of a conventional data flow machine.
Figure 2:
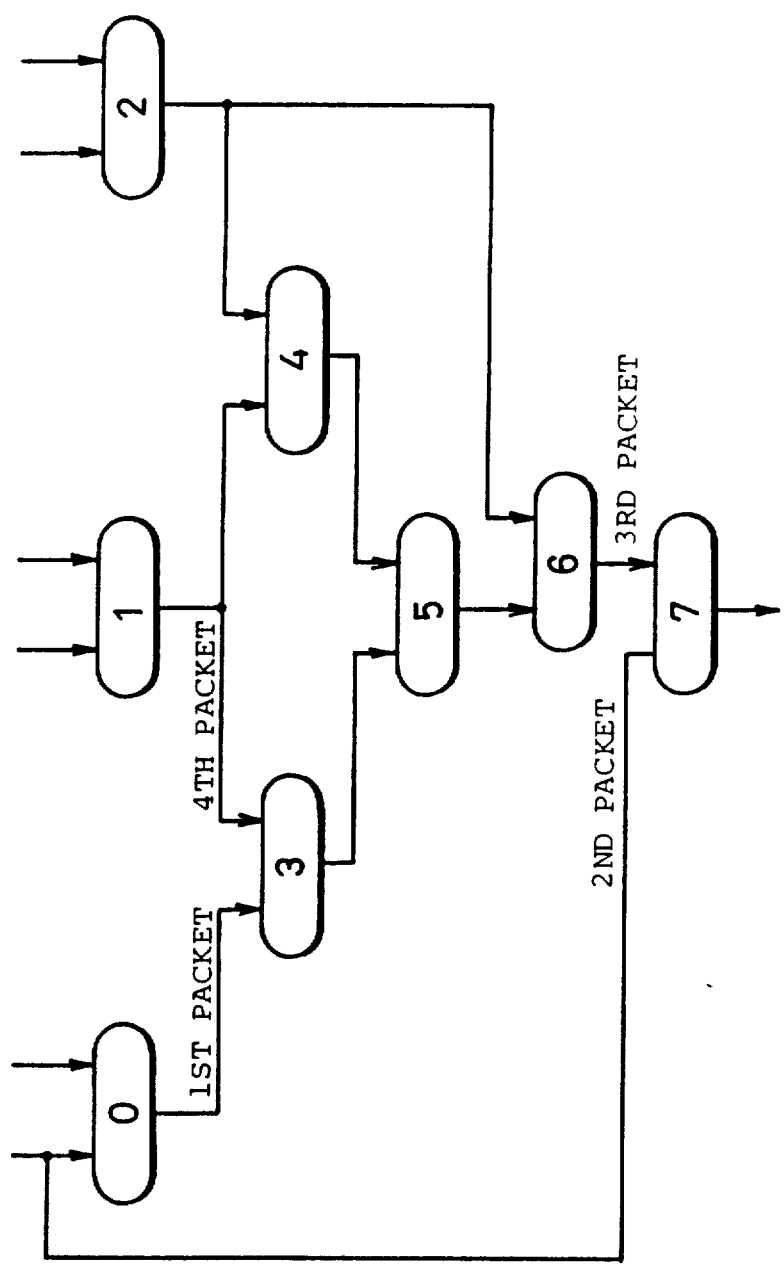
FIG. 2 is a data flow graph showing processing performed by the data flow machine of FIG. 1.

Referring to FIGS. 2 and 3 mentioned previously in connection with the prior art, operation of the associative storage apparatus will be described. For simplification of the following description, it is assumed that the same generation numbers or color numbers of the packets are used and that a memory used as a matching area is permitted to store four packets. The first and fourth packets including the destination node number "3" and the second and third packets including the destination node number "7" use the same memory address "3" as the matching area. Therefore, if the first packet is inputted and then the fourth packet is inputted, the first and fourth packets fire since they both include the destination node number "3", and the arithmetic packet is outputted.

Let us consider a case in which the first packet is inputted and subsequently the second packet is inputted. When the first packet is inputted, it is stored in the memory address "3" since it includes the destination node number "3". The second packet also indicates the memory address "3" since it includes the destination node number "7". Consequently, the destination node numbers of the first and second packets are compared and if the destination node number of the second packet is larger, that is, if the second packet collides with the first packet, the second packet is outputted as the through packet with its through packet flag being set to the through state and the first packet is held maintained in the memory address "3", whereby it waits for the fourth packet.

Next, let us consider a case in which the second packet is inputted and subsequently the first packet is inputted. Since the second packet has the destination node number "7", it is stored in the memory address "3". If the first packet is inputted in this state, it also indicates the memory address "3" since it has the destination node number "3". Accordingly, the destination node numbers of the first and second packets are compared and if the destination node number of the first packet is smaller, that is, if the first packet collides with the second packet, the second packet stored in the memory address "3" is outputted as the through packet with its through packet flag being set to the through state and the first packet is stored instead in the memory address "3".

The arithmetic packet outputted from the firing processing portion 30 using the associative storage apparatus is supplied to the arithmetic processing portion 40 whereby arithmetic processing of the data is performed according to the instruction included in the tag of the arithmetic packet and the result packet is outputted to the output portion 50. The output portion 50 determines the external flag included in the tag of the result packet. If the external flag indicates the external output, the output portion 50 outputs the result packet to an external portion. If the external flag indicates the internal output, it outputs the result packet to the input portion 10. The through packet outputted from the firing processing portion 30 is not processed in the arithmetic processing portion 40 and the program storing portion 20 and it returns to the firing processing portion 30 so as to be subjected again to firing processing as the instruction packet.

Figure 11:
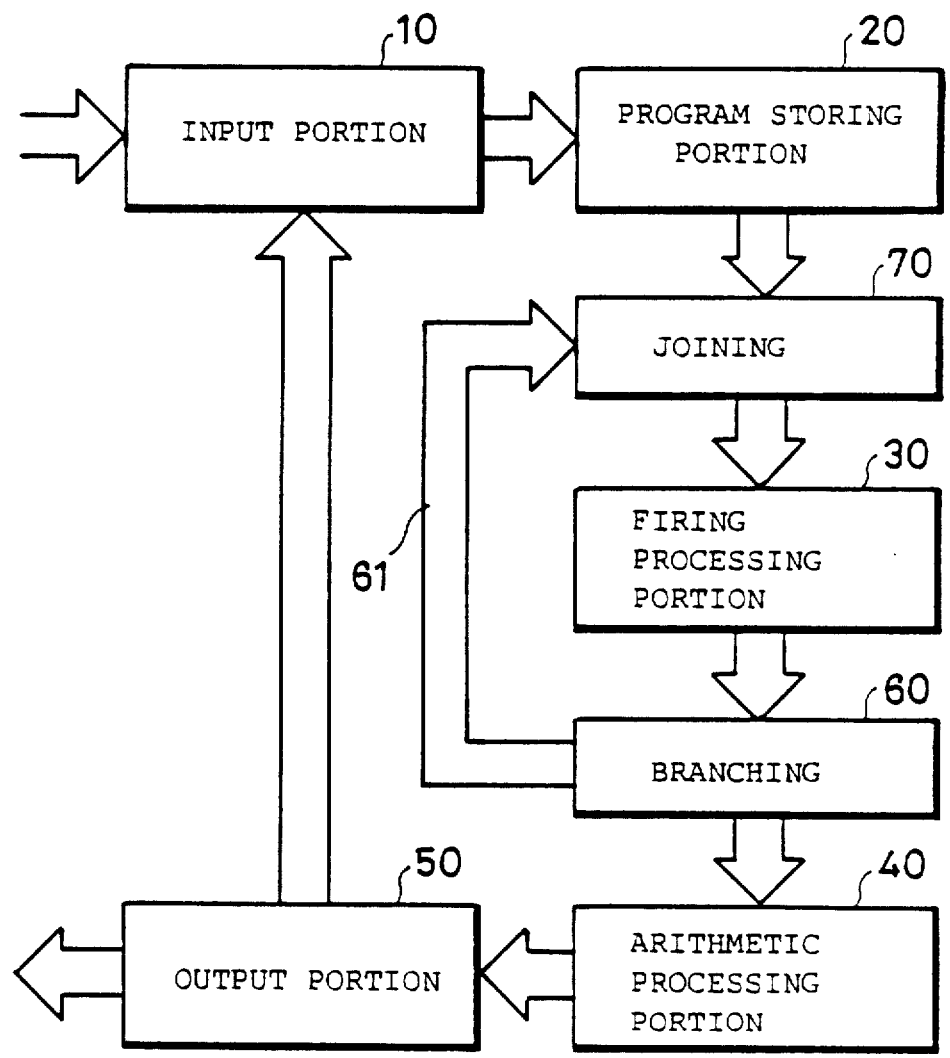
FIG. 11 is a schematic block diagram showing a configuration of a second embodiment of the present invention.

FIG. 11 is a schematic block diagram of the second embodiment of the present invention.

In the above described first embodiment, the through packet outputted from the firing processing portion 30 passes through the same path as that of the result packet. On the other hand, the second embodiment shown in FIG. 11 comprises a branching device 60 for branching the through packet, provided between the firing processing portion 30 and the arithmetic processing portion 40, a joining device 70 for joining the through packet, provided between the program storing portion 20 and the firing processing portion 30, and a local path 61 through which the through packet flows, provided between the branching device 60 and the joining device 70.

The second embodiment thus constructed does not require the means for determining whether the packet is the through packet or not, between the arithmetic processing portion 40 and the program storing portion 20 and thus, the processing is simplified. In addition, it becomes possible to supply the through packet to the firing processing portion 30 through the shortest path.

Figure 12:
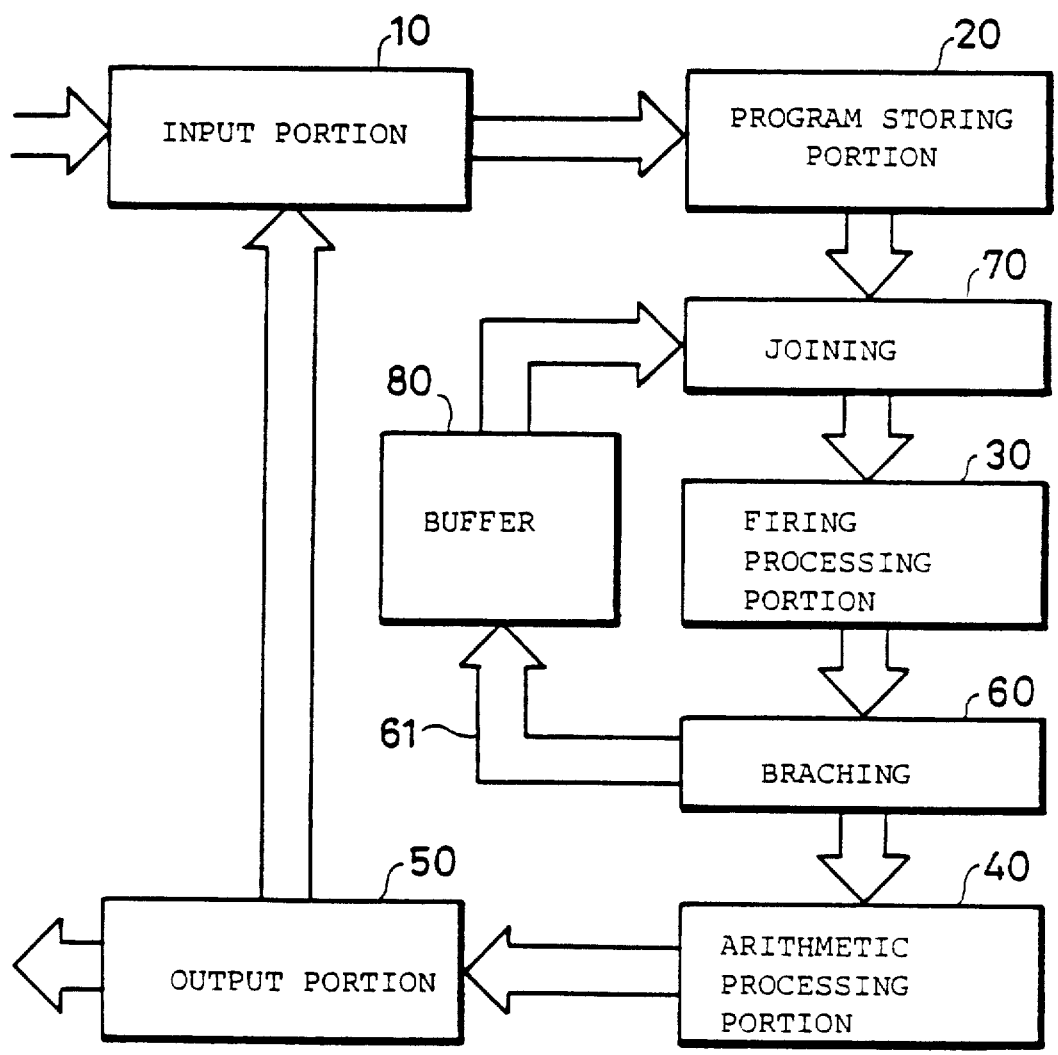
FIG. 12 is a schematic block diagram showing a configuration of a third embodiment of the present invention.

FIG. 12 is a schematic block diagram showing the third embodiment of the present invention. In the second embodiment shown in FIG. 11, the local path 61 through which the through packet flows is provided. In the third embodiment shown in FIG. 12, a buffer 80 is provided between the branching mechanism 60 and the joining mechanism 70, whereby a plurality of through packets can be made to flow through the path.

Figure 13:
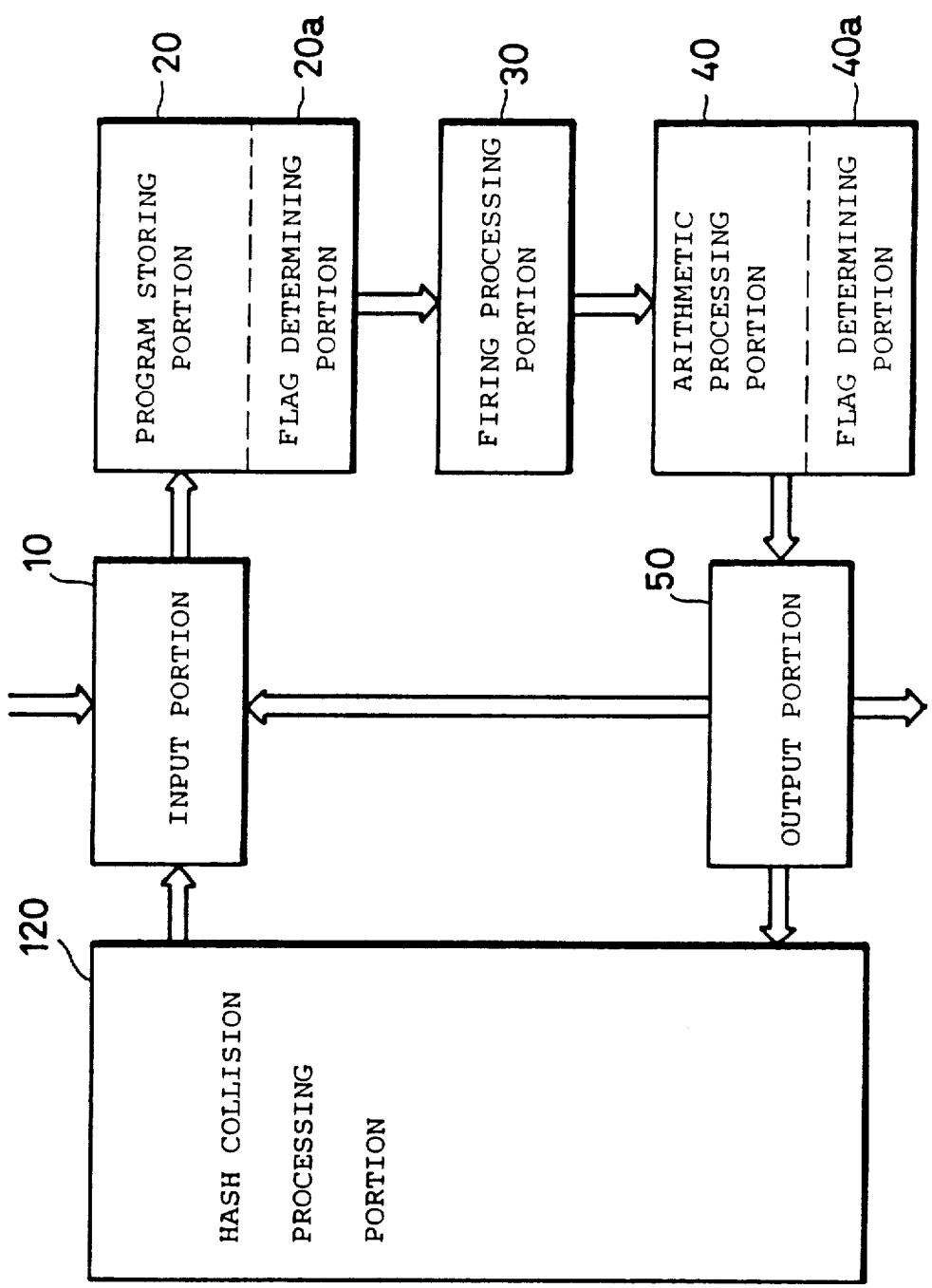
FIG. 13 is a schematic block diagram showing a configuration of a fourth embodiment of the present invention.

FIG. 13 is a schematic block diagram showing a configuration of the fourth embodiment of the present invention.

The fourth embodiment comprises a hash collision processing portion 120 outside the data flow machine. A packet having caused a hash collision is pushed to the hash collision processing portion and when the hash collision disappears, a pop packet is outputted from the firing processing portion 30 to pop the packet having caused the hash collision from the hash collision processing portion 120. The input portion 10, the program storing portion 20, the firing processing portion 30, the arithmetic processing portion 40 and the output portion 50 in this fourth embodiment are the same as in the embodiment shown in FIG. 4, except for the below described points. In the fourth embodiment, the program storing portion 20 includes a flag determining portion 20a for determining a through flag as described below and the arithmetic processing portion 40 includes a flag determining portion 40a for determining a collision flag and a pop flag.

Figure 14:
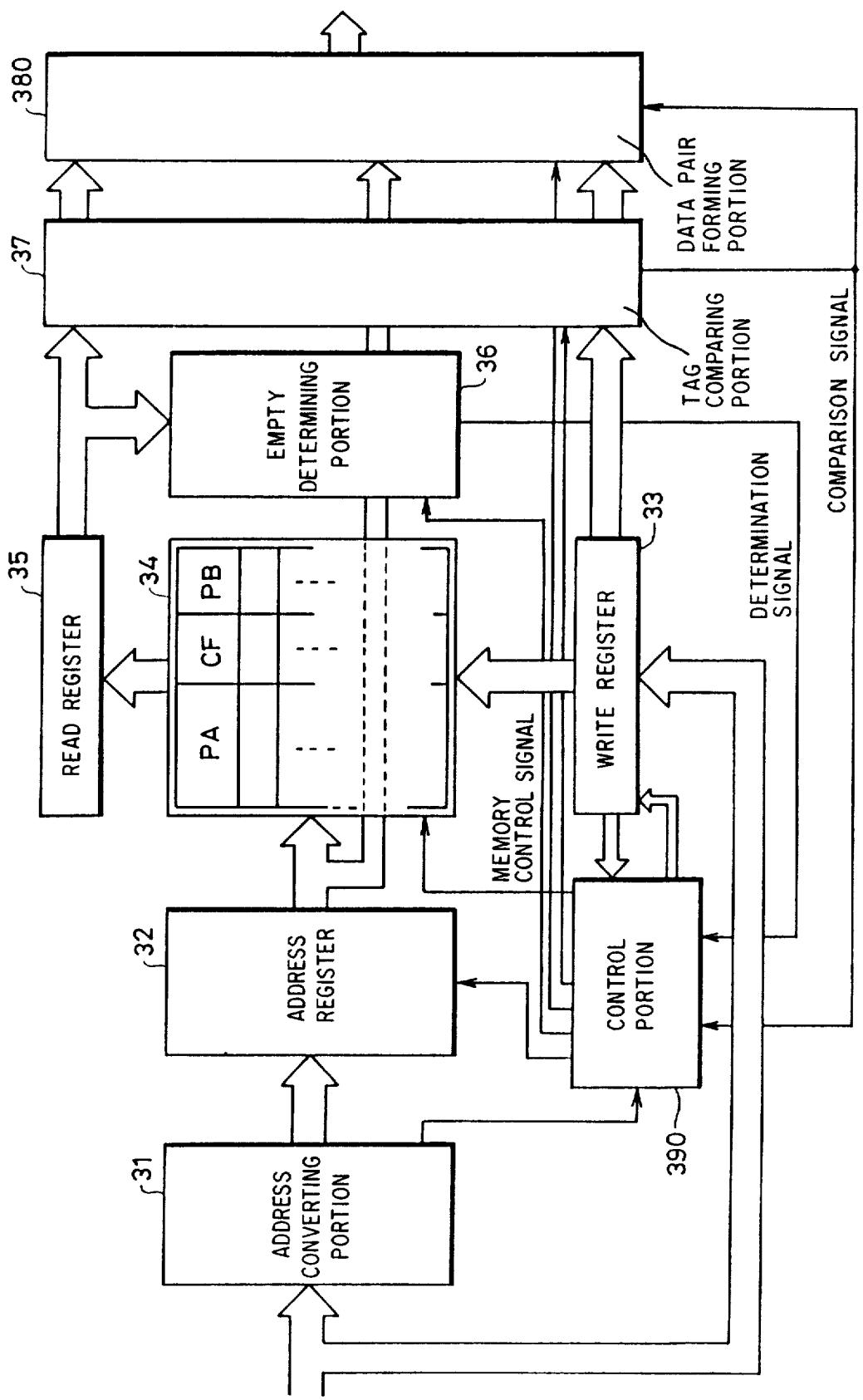
FIG. 14 is a concrete block diagram of a firing processing portion shown in FIG. 13.
Figure 15:
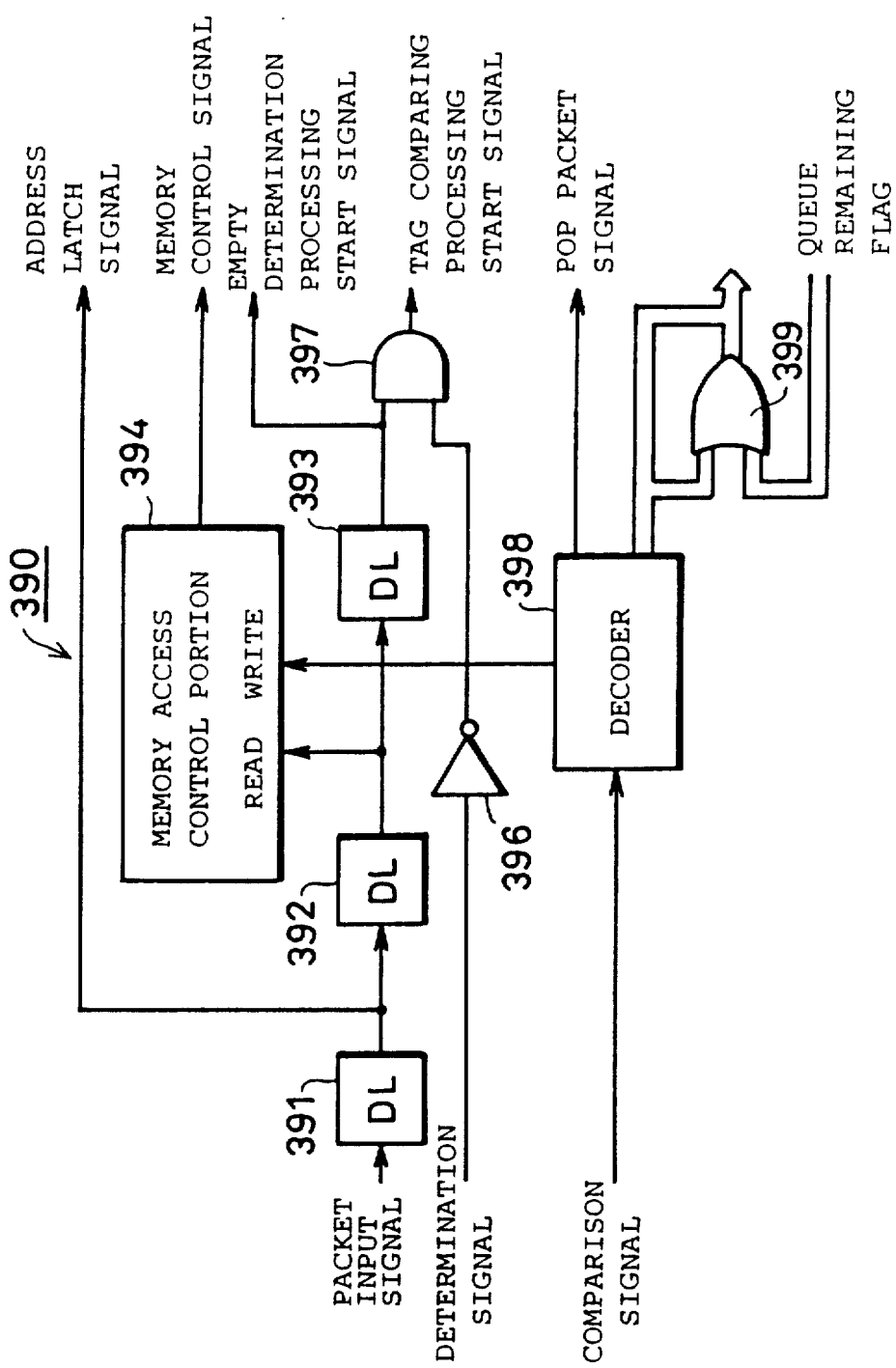
FIG. 15 is a concrete block diagram of a control portion included in the firing processing portion shown in FIG. 14.
Figure 16:
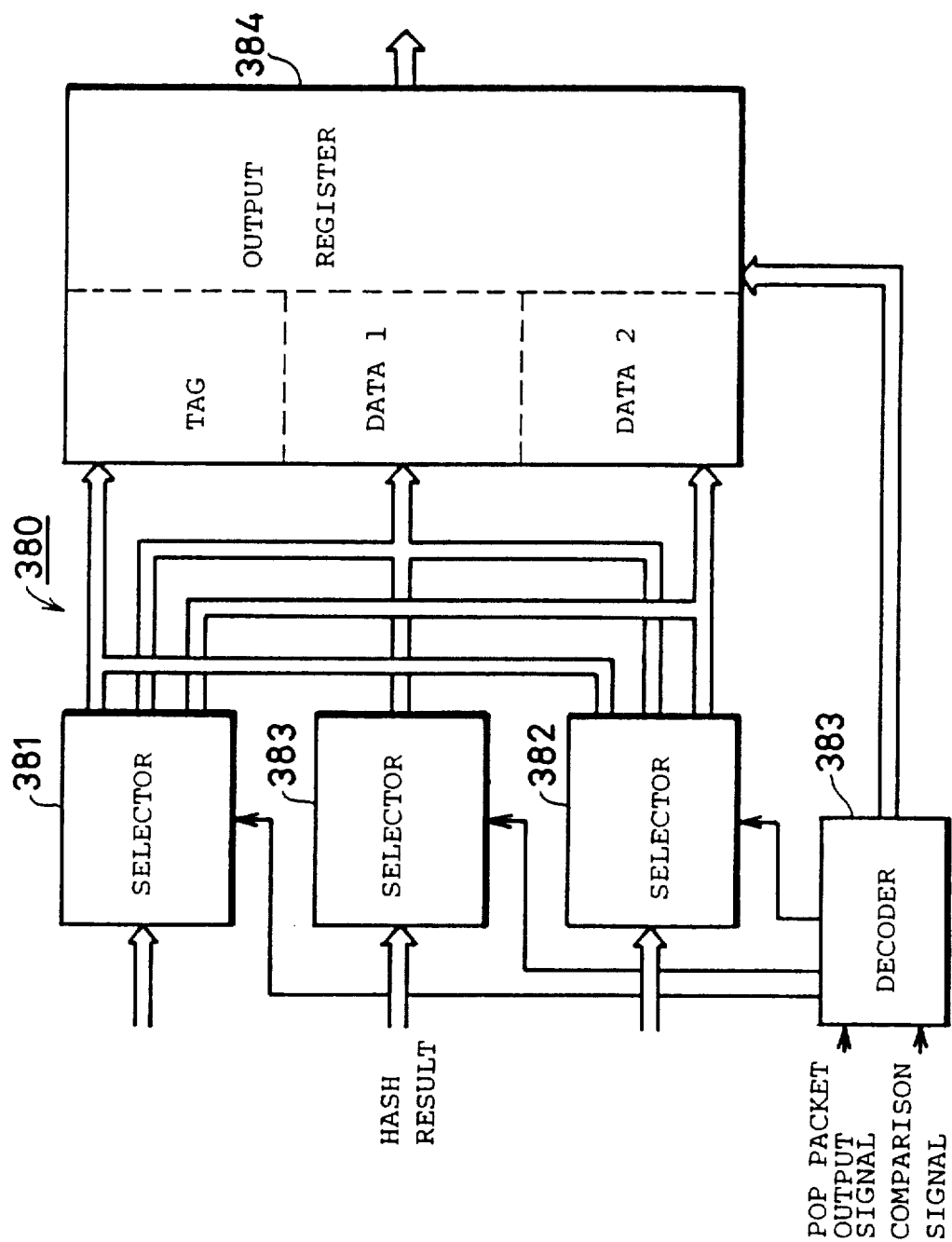
FIG. 16 is a concrete block diagram showing a data pair forming portion shown in FIG. 14.

FIG. 14 is a concrete block diagram of the firing processing portion shown in FIG. 13. FIG. 15 is a concrete block diagram of the control portion included in the firing processing portion shown in FIG. 14. FIG. 16 is a concrete block diagram of the data pair forming portion shown in FIG. 14.

Referring to FIG. 14, construction of the firing processing portion 30 is the same as in the above described case of FIG. 5 except for the below described points. The matching memory 34 shown in FIG. 14 includes a storing portion PA for storing a packet, a storing portion CF for storing a collision generating flag, and a storing portion PB for storing a presence bit. In addition, hash result data of tag information is supplied from the address register 32 to a data pair forming portion 380.

A queue remaining flag is supplied from the write register 33 to the control portion 390, as shown in FIG. 15, and it is supplied to the write register 33 through an OR gate 399. The queue remaining flag indicates that a packet corresponding to the address of the matching memory 34 having caused a hash collision is stored in a queue memory 126 included in a hash collision processing portion 120 shown in FIG. 17 to be described later. A presence bit is supplied from the decoder 398 to the OR gate 399. A pop packet signal is outputted from the decoder 398 to the data pair forming portion 380. Other portions of the control portion 390 are constructed in the same manner as described above with reference to FIG. 7.

The data pair forming portion 380 further comprises a selector 383, as is different from the data pair forming portion 38 shown in FIG. 8. The selector 383 receives the hash result data from the address register 32 as described above.

Figure 17:
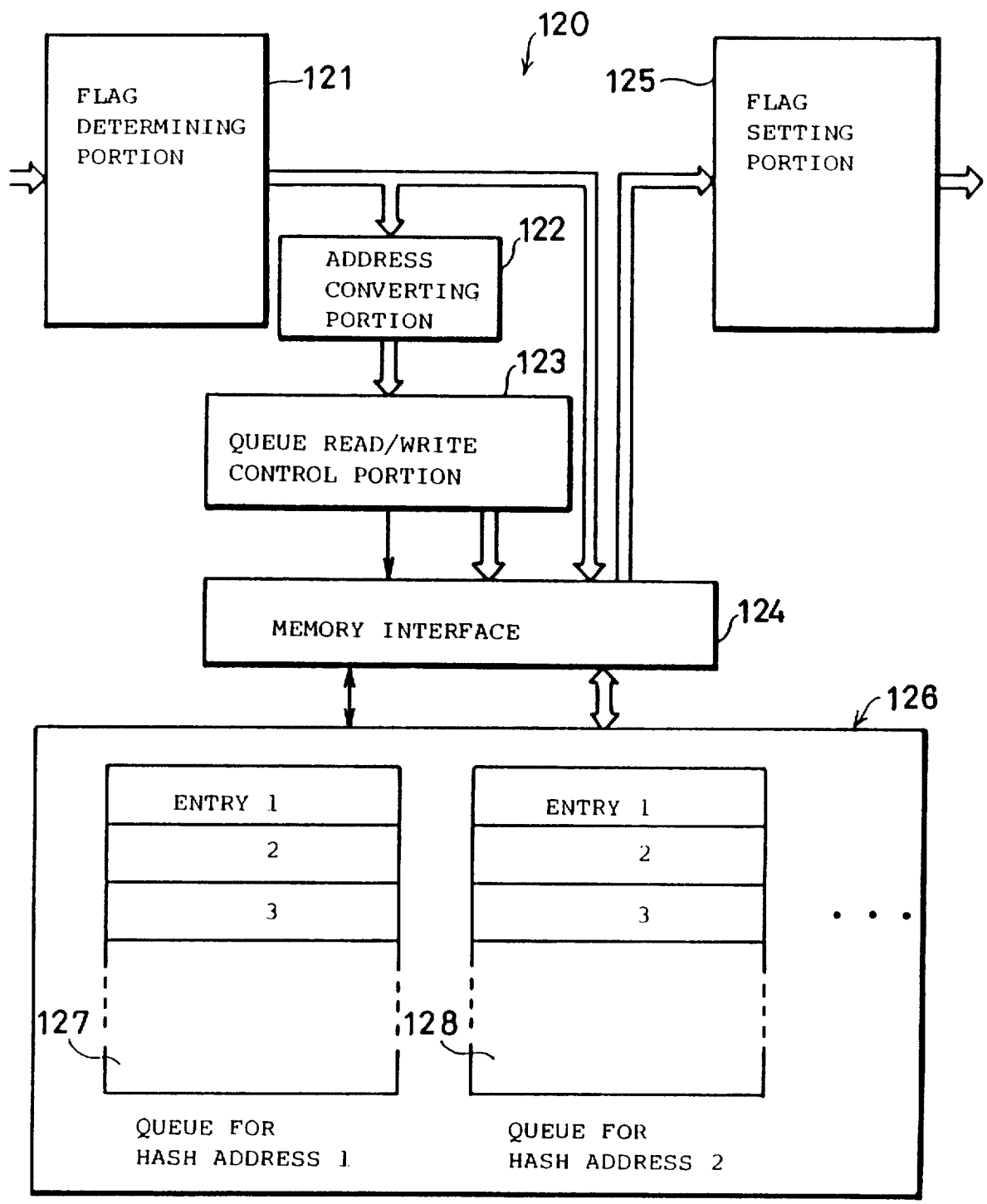
FIG. 17 is a concrete block diagram of a hash collision processing portion shown in FIG. 13.
Figure 18:
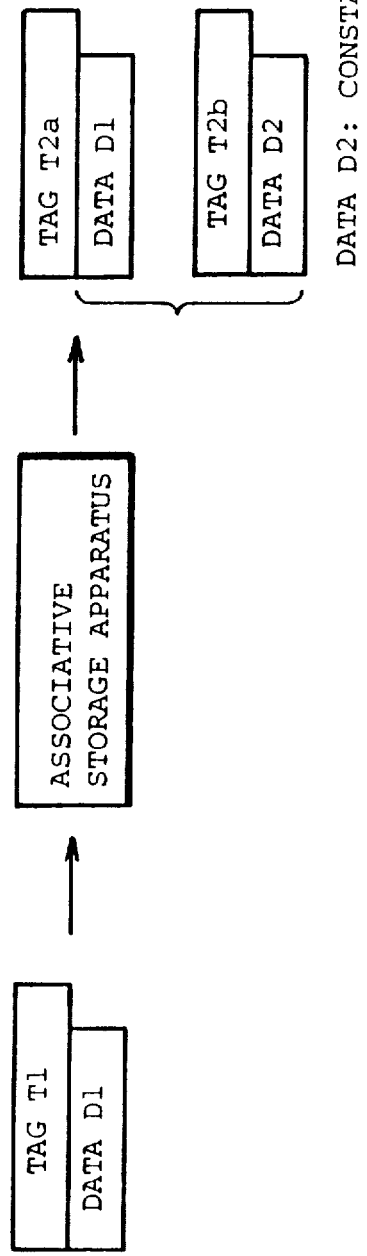
FIG. 18 is a diagram showing a formation of a packet used in the fourth embodiment of the present invention.

FIG. 17 is a concrete block diagram of the hash collision processing portion shown in FIG. 13 and FIG. 18 is an illustration showing a formation of a packet used in the fourth embodiment.

As shown in FIG. 18, the fourth embodiment uses packets each including a collision flag f1, a pop flag f2, a through flag f3 and a queue remaining flag f4. The respective flags need not be included in each individual packet. They may be used commonly. For example, since all the flags are not required in the respective portions of the data flow machine, a flag may be set to be interpreted as meaning A in a specified portion of a field and to be interpreted as meaning B in other portions not overlapping with that portion. The collision flag f1 indicates that the packet concerned has caused a hash collision. The pop flag f2 indicates that the packet having caused the hash collision fires in the firing processing portion. The through flag f3 indicates that the packet flows through the program storing portion 20. The queue remaining flag f4 indicates that the packet remains in the queue memory 126.

The hash collision processing portion 120 comprises, as shown in FIG. 17, a flag determining portion 121, an address converting portion 122, a queue read/write control portion 123, a memory interface 124, a flag setting portion 125 and a queue memory 126. The queue memory 126 includes areas 127, 128 etc. provided with entries for storing a plurality of packets corresponding to the addresses of the matching memory 34 where a hash collision has been caused. The flag determining portion 121 determines the collision flag f1 or the pop flag f2 included in the packet.

The packet having the flag determined by the flag determining portion 121 is supplied to the address converting portion 122 and the memory interface 124. The address converting portion 122 generates an address signal for designating an address of the queue memory 126 based on the node number included in the packet and supplies the address signal to the queue read/write control portion 123. The queue read/write control portion 123 controls writing of the packet in an area through any entry or reading of the packet from an area through any entry, out of the areas addressed by the queue memory 126. The packet and the address signal for the queue memory 126 outputted from the queue read/write control portion 123 are supplied to the queue memory 126 through the memory interface 124. The packet read out from the queue memory 126 is supplied to the flag setting portion 125 through the memory interface 124. The flag setting portion 125 sets a through flag or resets a hash collision flag.

Referring now to FIGS. 13 to 18, operation of the fourth embodiment of the present invention will be described. When the control portion 390 of the firing processing portion 30 determines based on the comparison signal from the tag comparing portion 37 that a hash collision occurs, the control portion 390 generates a collision generating flag from the decoder 398. The collision generating flag is stored in the write register 33 through the OR gate 399. Then, the collision generating flag, together with the packet stored in the write register 33, is supplied to the matching memory 34 and stored therein. At the same time, the control portion 390 sets the collision flag f1 in the other packet having caused the hash collision and outputs the packet to the data pair forming portion 380. The packet with the collision flag being set outputted from the firing processing portion 30 is supplied to the arithmetic processing portion 40. The flag determining portion 40a of the arithmetic processing portion 40 determines the collision flag and causes the packet to pass therethrough to the output portion 50 without performing arithmetic processing based on the packet. The packet having passed through the output portion 50 is supplied to the hash collision processing portion 120.

In the hash collision processing portion 120, the flag determining portion 121 determines the collision packet and the address converting portion 122 designates an address of the queue memory 126 based on the node number included in the packet and, then, the queue read/write control portion 123 designates a specified entry of an area in the queue memory 126, the address of which has been designated, where the packet is to be stored. Thus, the packet is stored in the designated area.

Thus, one of the packets having caused the hash collision, together with the collision generating flag, is stored in the matching memory 34 and the other packet with the collision flag f1 being set is stored in the queue memory 126 successively. During this time, the queue read/write control portion 123 performs storing in the queue memory 126 to enable the packets to pop in ascending order of generation numbers beginning with the smallest one and to enable the packets to pop in ascending order of node numbers beginning with the smallest one if the generation numbers are identical.

On the other hand, if the packet with the collision generating flag being set fires in the firing processing portion 30, the control portion 390 resets the collision generating flag and outputs the packet and, at the same time, it outputs a pop packet with the pop flag f2 being set. The fired packet is supplied to the arithmetic processing portion 40, where predetermined arithmetic processing is applied thereto. The pop packet with the pop flag being set is determined by the flag determining portion 40a of the arithmetic processing portion 40, so that it passes through the arithmetic processing portion 40 and the output portion 50 and is supplied to the hash collision processing portion 120. The flag determining portion 121 of the hash collision processing portion 120 determines the pop flag and the address converting portion 122 designates an address in the queue memory 126 based on the node number included in the pop packet. Then, the queue read/write control portion 123 reads out a packet from the queue memory 126 corresponding to the pop packet. The packet thus read out is supplied to the flag setting portion 125 through the memory interface 124. The flag setting portion 125 resets the hash collision flag f1 included in the thus read out packet and sets the through flag f3 to supply it to the program storing portion 20 through the input portion 10. In the program storing portion 20, the flag determining portion 20a determines the through flag f3 and then, the through flag f3 is cleared to supply the packet to the firing processing portion 30.

It sometimes happens that two packets as a pair to be fired are both stored in the queue memory 126. In such a case, the queue read/write control portion 123 reads out and pops the two packets at a time and if a packet remains in the queue for the same address, the queue remaining flag f4 is set in either of the popped two packets, more preferably, the later popped packet.

When a popped packet is supplied to the firing processing portion 30, firing processing is performed and if the queue remaining flag f4 is set, the collision generating flag is set and stored in the matching memory 34.

As described above, according to the fourth embodiment of the present invention, the hash collision processing portion 120 is provided outside the data flow machine. Thus, if a packet causes a hash collision in the firing processing portion 30, the packet having caused the hash collision is pushed to the hash collision processing portion 120 and when the hash collision disappears, the pushed packet is popped from the hash collision processing portion 120 by a pop packet, whereby the packet having caused the hash collision is processed. Consequently, there is no limitation of a memory size of the matching memory 34 and overflow never occurs in the matching memory 34 due to a hash collision. Accordingly, stop of execution of the machine never occurs.

For example, in the case of performing calculation of "A=B+1", "+1" is required as constant data. A conventional machine adopts the following method. A packet having constant data is inputted from an external portion and the matching memory 34 of the firing processing portion 30 is initialized in advance, whereby the inputted packet is caused to fire with a packet requiring the constant data. However, such a conventional method involves disadvantages that since it is necessary to input a packet having constant data from an external portion, it is necessary to provide addresses the number of which is equal to the number of nodes of a program in the matching memory 34 of the firing processing portion 30, causing deterioration in an operation efficiency of the memory. Under the circumstances, the fifth embodiment of the present invention is adapted to process constant data efficiently by increasing the amount of hardware as little as possible. In the following, the fifth embodiment will be described.

Figure 19:
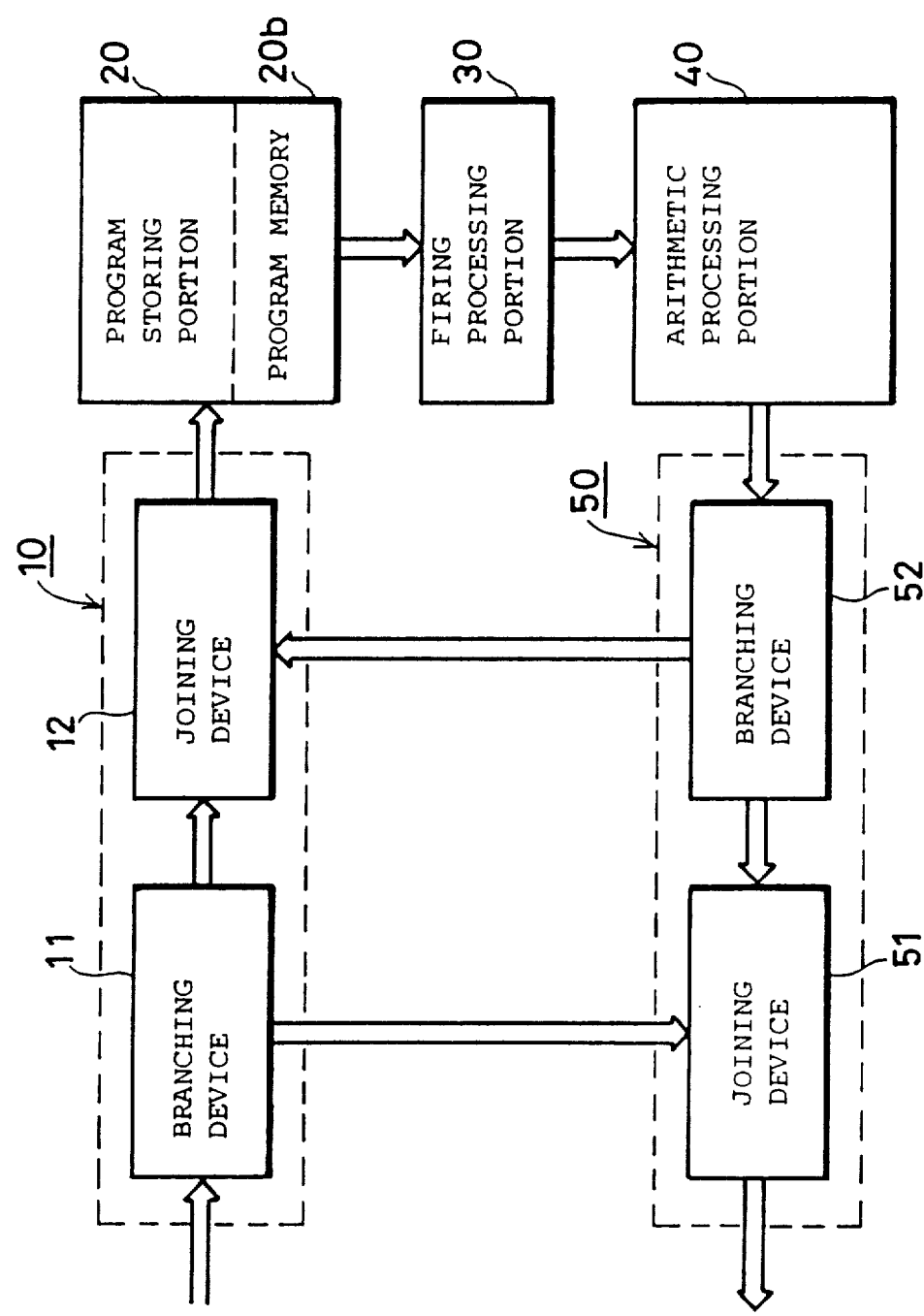
FIG. 19 is a schematic block diagram showing a configuration of a fifth embodiment of the present invention.
Figure 20:
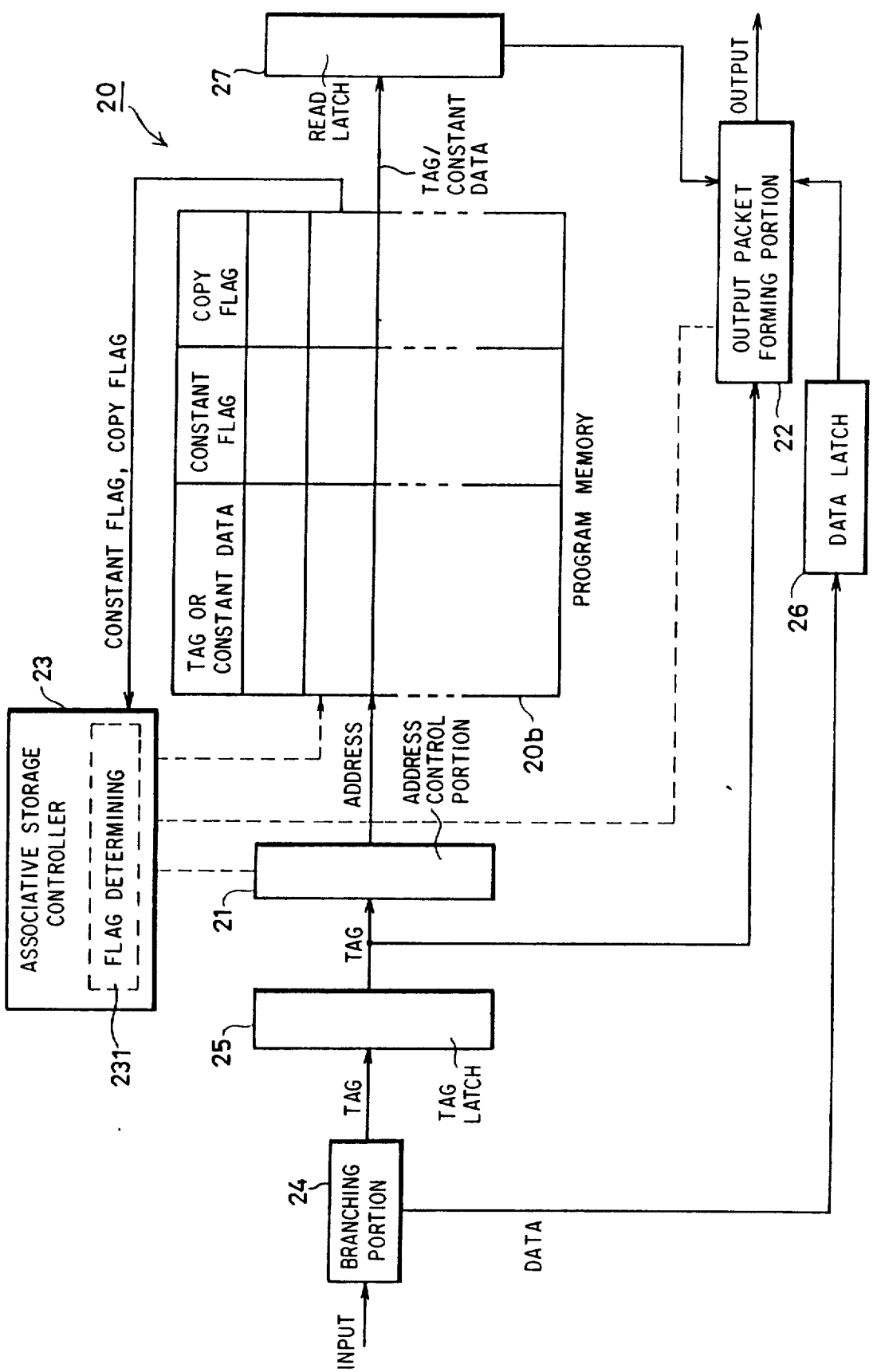
FIG. 20 is a concrete block diagram of a program storing portion shown in FIG. 19.

FIG. 19 is a schematic block diagram showing a construction of the fifth embodiment. FIG. 20 is a concrete block diagram of the program storing portion shown in FIG. 19. FIG. 21 is a concrete block diagram of the firing processing portion.

Referring to FIG. 19, the input portion 10 comprises a branching device 11 and a joining device 12. The output portion 50 comprises a joining device 51 and a branching device 52. The branching device 11 of the input portion 10 branches packets inputted from an external portion to the joining device of the input portion 10 or the the joining device 51 of the output portion 50. The joining device of the input portion 10 supplies either the packet branched by the branching device 11 or the packet branched by the branching device 52 of the output portion 50, to the program storing portion 20. The branching device 52 of the output portion 50 branches the packet arithmetically processed by the arithmetic processing portion 40 to the joining device 51 of the output portion 50 or to the joining device 12 of the input portion 10. The joining device 51 of the output portion 50 outputs the packet branched by the branching device 52 of the output portion 50 or the packet branched by the branching device 11 of the input portion 10, to an external portion.

The program storing portion 20 comprises a branching portion 24 for branching a tag portion and a data portion from an input packet, as shown in FIG. 20. The tag branched by the branching portion 24 is latched by a tag latch 25 and the branched data is latched by a data latch 26. The tag latched by the tag latch 25 is supplied to the address control portion 21. The address control portion 21 outputs an address signal according to information of the tag and supplies the address signal to the program memory 20b. The program memory 20b stores the tag, constant data, a constant flag and a copy flag. The tag/constant data read out from the program memory 20b is latched by a read latch 27.

The constant flag and the copy flag read out from the program memory 20b are supplied to an associative storage controller 23. The associative storage controller 23 includes a flag determining portion 231 for determining the constant flag and the copy flag and controls the address control portion 21, the output packet forming portion 22 and the program memory 20b based on an output of the determination. A packet is formed and outputted to the output packet forming portion 22 based on the tag portion latched in the tag latch 25, the data latched in the data latch 26 and the tag/constant data latched in the read latched 27.

Referring now to FIG. 21, a construction of the firing processing portion 30 will be described. The firing processing portion 30 is only partially shown in FIG. 21 and the part shown is provided in addition to the firing processing portion shown in FIG. 5. The packet outputted from the program storing portion 20 is supplied to a branching portion 31, through which tag/constant data and data are branched. The tag/constant data is latched in a tag latch 32, while the data is latched in a data latch 33. The tag latched in the tag latch 32 is supplied to a tag compositing portion 34. The constant data is supplied to a data compositing portion 35. The data latched in the data latch 33 is also supplied to the data compositing portion 35.

The tag compositing portion 34 composites a tag by control of a firing processing controller 38 and supplies the tag to an output packet latch 36. Similarly, the data compositing portion 35 composites the constant data and the data by control of the firing processing controller 38 and supplies the composited data to the output packet latch 36. The output packet latch 36 latches an output of the tag compositing portion 34 and that of the data compositing portion 35 and supplies those outputs to an output control portion 37. The output control portion 37 controls output timing of output packets and the like by control of the firing processing controller 38. The firing processing controller 38 controls the tag compositing portion 34, the data compositing portion 35, the output packet latch 36 and the output control portion 37 according to information indicating existence or nonexistence of constant data included in the tag latched in the tag latch 32.

FIGS. 22A, 22B and 22C are illustrations showing formations of an input packet and an output packet used in the fifth embodiment. In the example shown in FIG. 22A as packets including constant data, an input packet includes a tag T1 and data D1 and an output packet includes a tag T2a and the data D1 as well as a tag T2b and data D2, whereby the output packet is outputted with respect to the input packet. In the example shown in FIG. 22B, a packet P11 including a tag T2c and the data D1 and a packet P12 including the data D2 are outputted in connection with the input packet including the tag T1 and the data D1. In the example shown in FIG. 22C, an output packet including the tag T2 and the data D1 as well as the data D2 as constant data is outputted in connection with the input packet including the tag T1 and the data D1. In the following, description will be made of operation in the case of outputting the output packets P11 and P12 with respect to the input packet P10 as shown in FIG. 22B in the fifth embodiment.

First, a packet including a tag and data is supplied from an external portion to the program storing portion 20 through the branching device 11 and the joining device 12. The program storing portion 20 reads out a new tag from the program memory 20b based on the tag of the input packet, whereby the tag of the input packet is updated and supplied to the firing processing portion 30. At this time, a constant flag may be read out from the program memory 20b together with the new tag, and constant data may be read out based on the content of this flag.

In the firing processing portion 30, based on packets to be subjected to binomial operation, for example, based on two packets having the same tag, a new packet is formed by the data included in the respective packets and the tag included therein. Then, the new packet is supplied to the arithmetic processing portion 40. The arithmetic processing portion 40 performs arithmetic processing according to the tag of the input packet, so that the processed packet is supplied to the branching device 52. If the packet is to be continuously processed inside the machine, it is branched to the joining device 12 of the input portion 10 by means of the branching device 52. If the packet is to be outputted, it is outputted through the joining device 51 of the output portion 50.

Referring to FIG. 20, operation of the program storing portion 20 will be described in more detail. The input packet P10 shown in FIG. 22B is branched by the branching portion 24 to a tag T1 as a first word and data D1 as a second word. This branching is made based on a header tail flag (not shown) included in the packet. The tag T1 is latched by the tag latch 25. The data D1 is latched by the data latch 26. The tag T1 latched by the tag latch 25 is supplied to the address control portion 21 and the address control portion 21 generates an address signal according to the tag T1 and supplies it to the program memory 20b. Thus, a new tag, a constant flag and a copy flag are read out from the program memory 20a and the new tag is supplied to the output packet forming portion 22 through the read latch 27. The constant flag and the copy flag are supplied to the associative storage controller 23.

The flag determining portion 231 included in the associative storage controller 23 determines the constant flag. When the flag determining portion 231 determines the constant flag, the associative storage controller 23 determines that the constant data is stored in the program memory 20b and outputs the information to the output packet forming portion 22. In consequence, the output packet forming portion 22 forms a tag T2c by adding information that the subsequent packet has constant data to the new tag read out from the program memory 20b, thereby to form and output a packet P11 including the tag T2c and the data D1 supplied from the data latch 26. More specifically, the tag T2c includes information on "existence/nonexistence of constant data", i.e., indicating whether the subsequent packet has constant data or not.

On the other hand, since the associative storage controller 23 determines that the constant data is stored in the program memory 20b, it supplies a control signal to the address control portion 21, the program memory 20b and the output packet forming portion 22. As a result, the constant data is read out from the program memory 20b. The constant data corresponds to the data D2 shown in FIG. 22B. The constant data is supplied to the output packet forming portion 22 through the read latch 27. In response to the control signal from the associative storage controller 23, the output packet forming portion 22 forms a packet P12 having the constant data (i.e., the data D2) as the tag portion and outputs the packet P12. The data portion of the packet P12 shown in FIG. 22B is meaningless data.

The copy flag has been stored in the program memory 20b. When the copy flag is read out therefrom, the flag determining portion 231 included in the associative storage controller 23 determines the copy flag. Upon determination of the copy flag by the flag determining portion 231, the associative storage controller 23 outputs a subsequent address signal from the address control portion 21. In response to the address signal, a tag is read out from the subsequent address of the program memory 20b and a new packet is formed by the data of the input packet and the read out tag, so that it is outputted. Thus, if the copy flag is set, data is copied and outputted.

If the constant data flag is not set, only updating of the tag is effected.

Referring now to FIG. 21, description is made of operation of attached portions of the firing processing portion 30 for processing the packets shown in FIGS.

22A to 22B. Generally, when a packet is inputted to the firing processing portion 30, it is written in the matching memory 34 and firing processing is performed as described above in connection with FIG. 5. However, when the two packets P11 and P12 formed as shown in FIG. 22B are inputted to the firing processing portion 30, they are not written in the matching memory 34.

More specifically, when the packet P11 is inputted to the firing processing portion 30, the branching portion 31 branches it to the tag T2c and the data D1 included in the packet P11, so that the tag T2c and the data D1 are latched in the tag latch 32 and the data 33, respectively. The information as to "existence/nonexistence of constant data" included in the tag T2c is supplied to the firing processing controller 38. The firing processing controller 38 outputs a control signal to the respective portions in response to the information of existence of constant data. As a result, the tag T2c is latched in the output packet latch 36 through the tag compositing portion 34. The data D1 is similarly outputted and latched in the output packet latch 36 through the data compositing portion 36. Then, the firing processing portion 30 waits for another constant data transmitted by the subsequent packet.

The subsequent packet P12 is branched by the branching portion 31 to the tag and the data, in the same manner as described above. The constant data is latched in the tag latch 32 and then it is supplied to the data compositing portion 35. The data compositing portion 35 outputs the constant data to the output packet latch 36. Thus, the output packet latch 36 outputs a packet including the tag of the packet P11 as the tag portion and including the data D1 of the packet P11 and the constant data (i.e., the data D2) of the packet 12 as the data portion, so that the packet is outputted to the arithmetic processing portion 40 through the output control portion 37.

As described above, in the fifth embodiment of the present invention, a data width of the program memory 20b included in the program storing portion 20 is increased by one bit so that a constant flag is provided. Consequently, constant data can be utilized only by changing the program storage controller 23 and thus the constant data can be processed easily by the almost same control as in the case of copy processing. In addition, in this fifth embodiment, firing processing can be effected without causing any influence to the matching memory 34 of the firing processing portion 30 and the efficiency of utilization of the matching memory 34 can be improved.

In the above described fifth embodiment, the packet inputted to the input portion 10 needs to have the form of a packet including a tag and data and the packet outputted from the output portion 50 also needs to have the form including a tag and data. Accordingly, it is necessary for an external apparatus to have means for forming a packet by adding a tag to data and outputting the packet or means for extracting data from an input packet inside or outside the external apparatus. However, provision of such means in the external apparatus causes the external apparatus to have an additional load. Therefore, another embodiment of a data flow machine is proposed. This embodiment has a relatively simple construction and is capable of arbitrarily setting a generation number and a node number of a tag and it can be connected directly to an external apparatus without causing any trouble of decomposition or recomposition of a packet to the external apparatus. This sixth embodiment will be described in the following.

Figure 23:
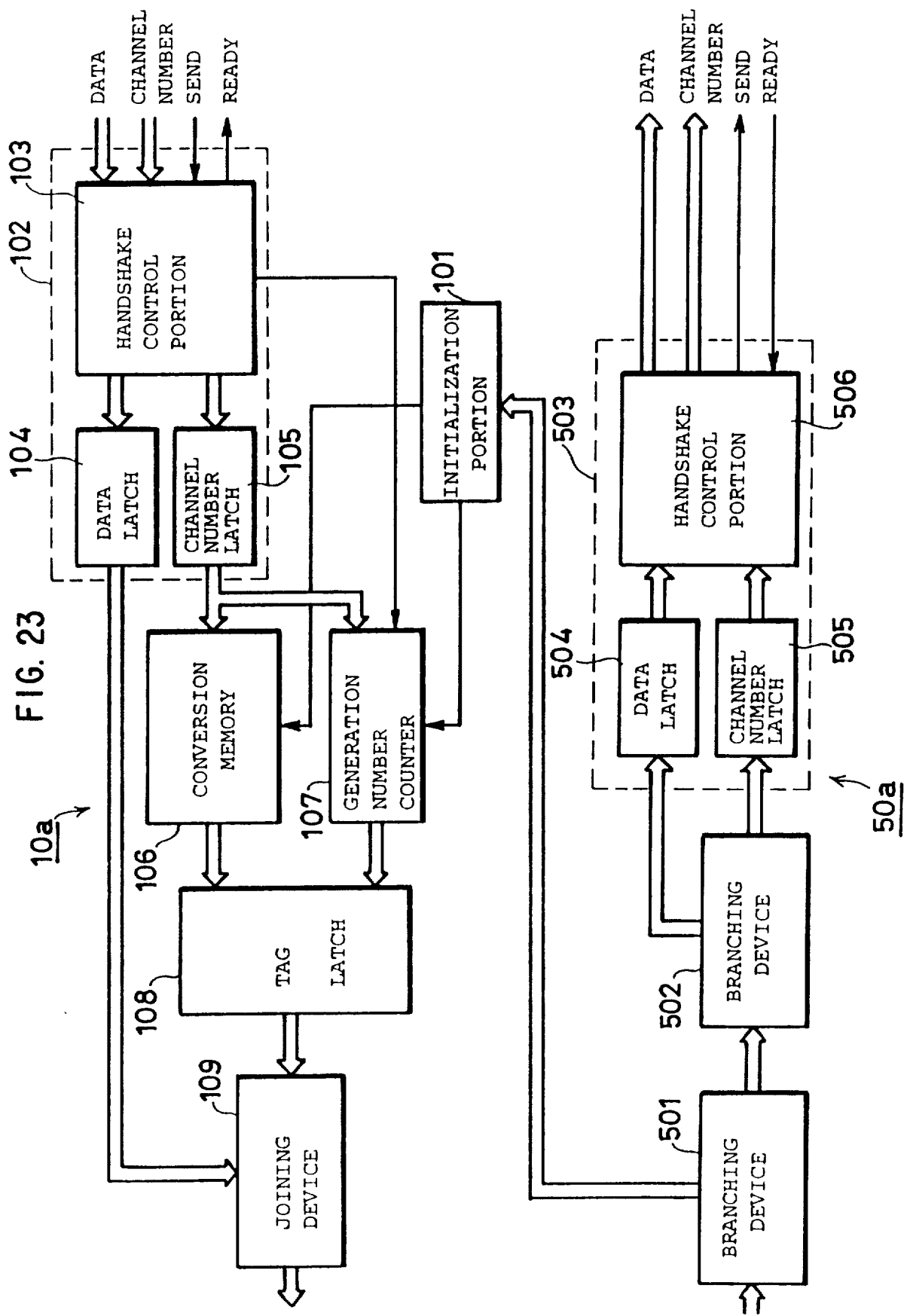
FIG. 23 is a block diagram showing a concrete construction of an input portion and an output portion in a sixth embodiment of the present invention.

FIG. 23 is a block diagram showing a concrete construction of an input portion and an output portion in the sixth embodiment of the present invention. The input portion 10a and the output portion 50a shown in FIG. 23 are provided for example in place of the input portion 10 and the output portion 50 of the first embodiment shown in FIG. 4. The input portion 10a includes an input interface controller 102. The input interface controller 102 includes a handshake control portion 103 and data latches 104 and 105. The handshake control portion 103 receives data, a channel number and a sending signal from an external apparatus and the handshake control portion 103 applies a ready signal to the external apparatus. The handshake control portion 103 performs handshake control with the external apparatus based on the sending signal and the read signal.

More specifically, if the handshake control portion 103 is in a state enabled to receive data, it outputs a ready signal of "1" to the external apparatus. Upon receipt of the ready signal of "1", the external apparatus sets the sending signal to "1" and supplies data and the channel number to the handshake control portion 103. The handshake control portion 103 latches the data received from the external apparatus in a data latch 104 and the channel number received therefrom in a channel number latch 105. The data latched in the data latch 104 is supplied to a joining device 109 and the channel number latched in the channel number latch 104 is supplied to a conversion memory 106 and a generation number counter 107.

The conversion memory 106 converts the channel number supplied thereto to a node number and the node number read out from the conversion memory 106 is latched in a tag latch 108. The generation number counter 107 counts an input for each channel number and outputs a generation number. The outputted generation number is latched in the tag latch 108. The generation number and the node number latched in the tag latch 108 are supplied to the joining device 109. The joining device 109 forms a packet including the data and the tag supplied from the data latch 104 as well as the generation number and the node number supplied from the tag latch 108 and outputs the packet.

A branching device 501 of the output portion 50a receives the packet from the arithmetic processing unit 40 shown in FIG. 4. The branching device 501 determines whether the received packet is an output packet or an initialization packet. If it is the initialization packet, the branching device 501 supplies the initialization packet to an initializing portion 101. If it is the output packet, the branching device 501 supplies the output packet to a branching device 502. The branching device 502 branches the output packet, based on a header tail flag included therein, to a first word including a channel number of the output as a node number and a second word including data. The channel number as the first word is latched in a channel number latch 505 included in an output interface 503 and the data as the second word is latched in a data latch 504. The data latched in the data latch 504 and the channel number latched in the channel number latch 505 are supplied to a handshake control portion 506. The handshake control portion 506 performs handshake control to output the data and the channel number to an external apparatus.

The initializing portion 501 initializes the conversion memory 106 and the generation number counter 107 upon receipt of the initialization packet.

Figure 24:
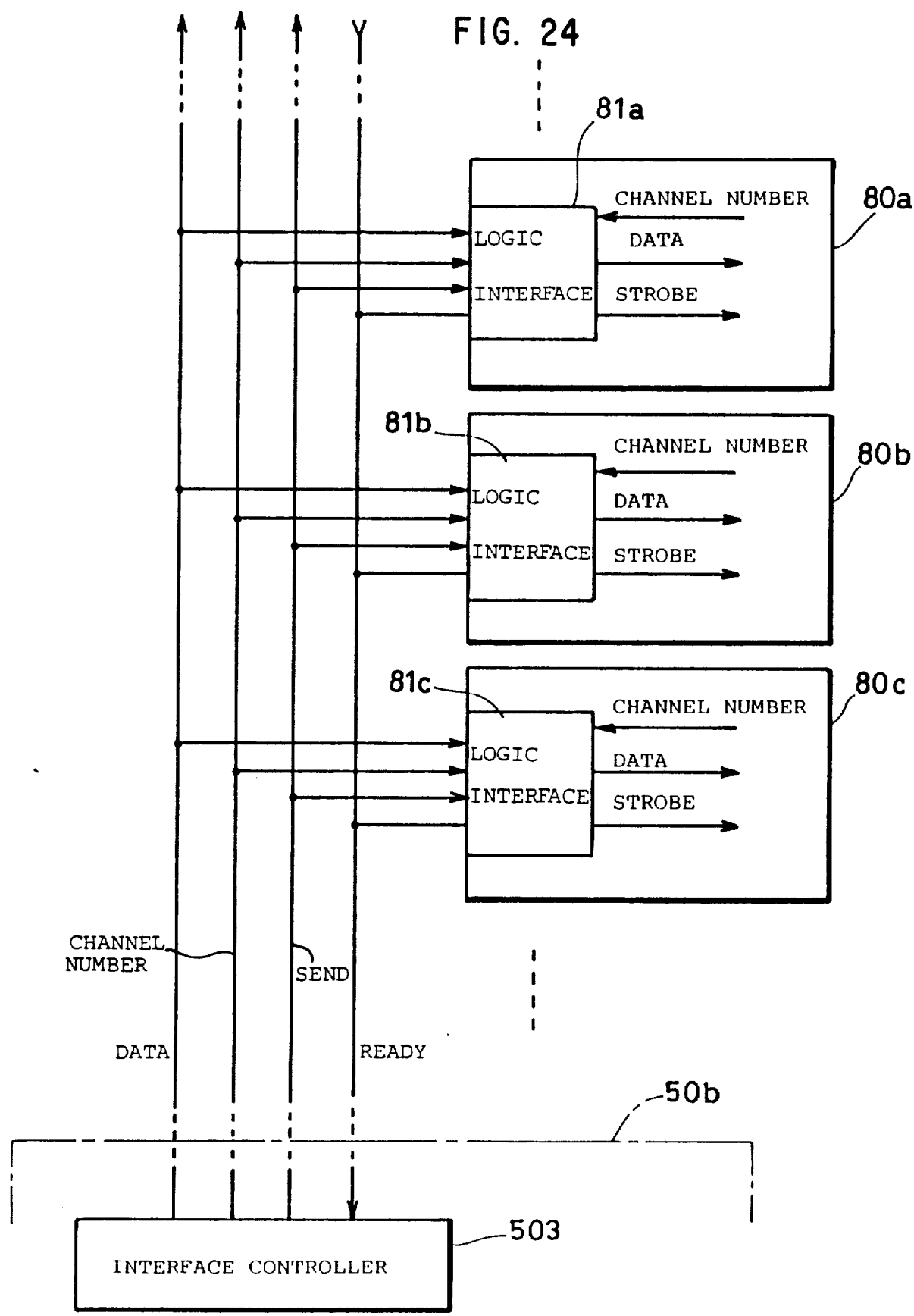
FIG. 24 is a diagram showing connections between the output portion and external apparatus.

FIG. 24 is a diagram showing connections between the output portion and external apparatus, in the sixth embodiment.

Referring to FIG. 24, the interface controller 503 included in the output portion 50b is connected to external apparatuses 80a, 80b and 80c. The external apparatuses 80a, 80b and 80c include logic interfaces 81a, 81b and 81c, respectively. The external apparatuses 80a, 80b and 80c generate channel numbers for identifying the respective apparatuses and supply them to the logic interfaces 81a, 81b and 81c, respectively. The logic interfaces 81a, 81b and 81c compare channel numbers generated therein and the channel numbers supplied from the interface controller 503 and if they match, the logic interfaces set the corresponding ready signals to "0".

Ready signal lines for the respective external apparatuses 80a, 80b and 80c are wired-AND connected. After having reset the respective ready signals to "0", the logic interfaces 81a, 81b and 81c perform handshake control operation with the interface controller 503, thereby to input data outputted from the interface controller 503 and to accept the data together with a strobe signal.

Figure 25:
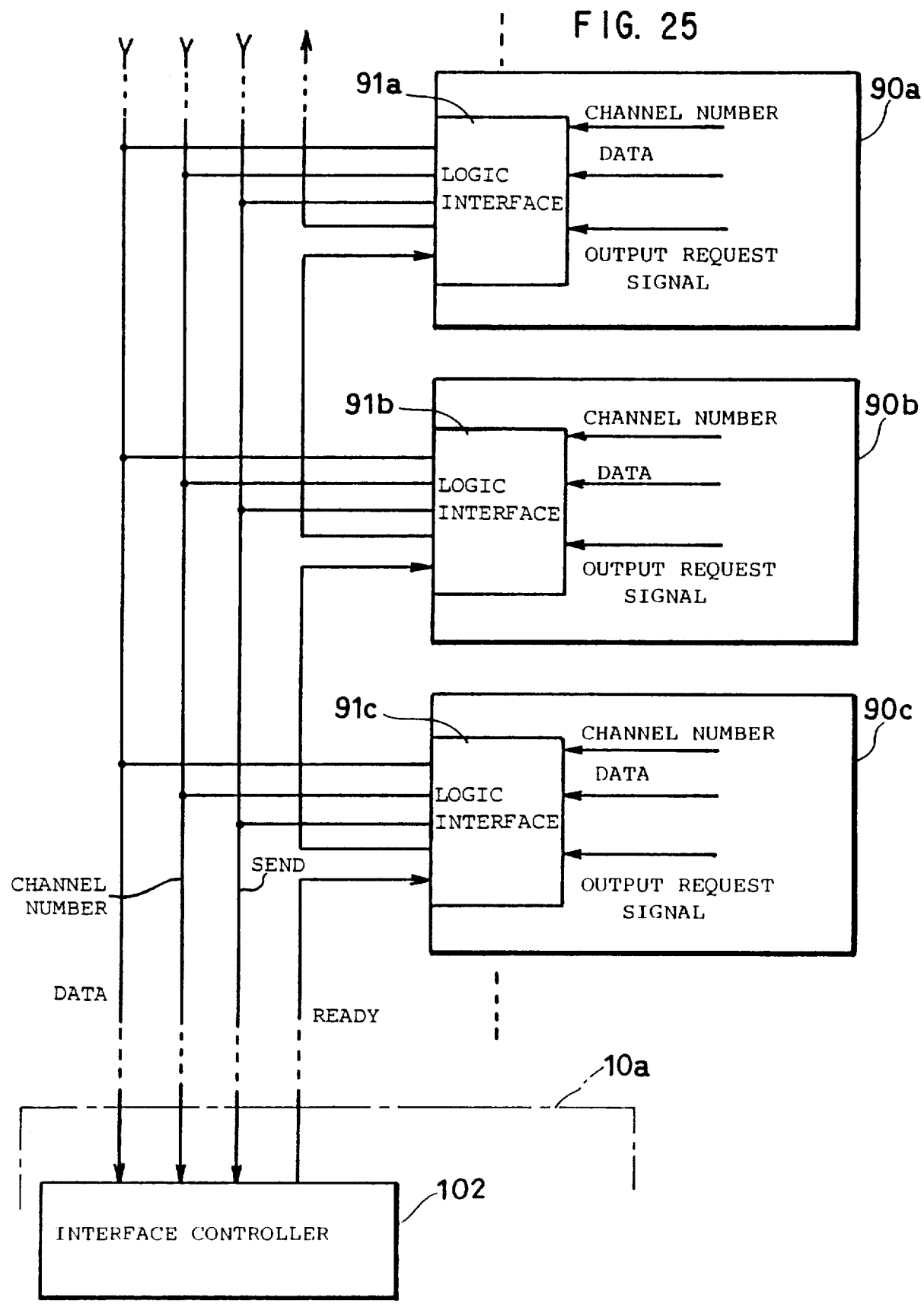
FIG. 25 is a diagram showing connections between the input portion and external apparatus.

FIG. 25 is a diagram showing connections between the input portion and external apparatus. Referring to FIG. 25, the interface controller 102 included in the input portion 10a is connected to external apparatuses 90a, 90b and 90c through connection lines, while ready signal lines are connected in a daisy chain. The external apparatuses 90a, 90b and 90c are provided separately from the external apparatuses 80a, 80b and 80c shown in FIG. 24. The external apparatuses 90a, 90b and 90c include logic interfaces 91a, 91b and 91c, respectively. The external apparatuses 90a, 90b and 90c provide channel numbers for identifying the corresponding external apparatuses, and data and output request signals to the logic interfaces 91a, 91b and 91c, respectively. When the output request signals are provided, the logic interfaces 90a, 90b and 90c set the corresponding ready signal lines to "0" and output the channel numbers and the data to the interface controller 102. If the output request signals are not provided, the logic interfaces 91a, 91b and 91c set the corresponding ready signal lines to "1". Although the above mentioned ready signal lines are connected in a daisy chain, this connection is applied only by way of example and means for determining states of the ready signal lines may be provided separately.

FIGS. 26A to 26E are illustrations showing formations of packets used in the sixth embodiment.

FIG. 26A shows a format of a typical packet P5. FIG. 26B shows an output packet P6 to be outputted to an external portion, out of packets supplied to the input portion 10. FIG. 26C shows an initialization packet P7 out of the packets supplied to the input portion 10. The initialization packet P7 initializes the generation number counter 107 shown in FIG. 23 and it includes an initialization value for the generation number counter 107 as an operation code as well as an initial value for the generation number as the data. FIG. 26D shows an initialization packet P8 for initializing the conversion memory 106 shown in FIG. 23. The initialization packet P8 includes an initialization value for the conversion memory as an operation code and a node number as the data. FIG. 26E shows an output packet P9 outputted from the input portion 10a to the program storing portion 20.

Figure 27A:
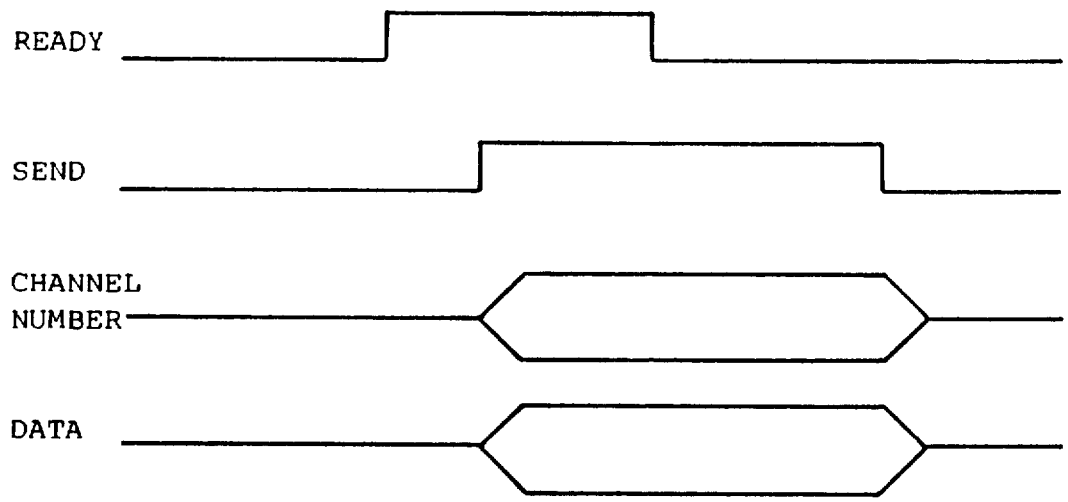
FIG. 27A is a timing charts of handshake control performed between the output portion and the external apparatus.
Figure 27B:
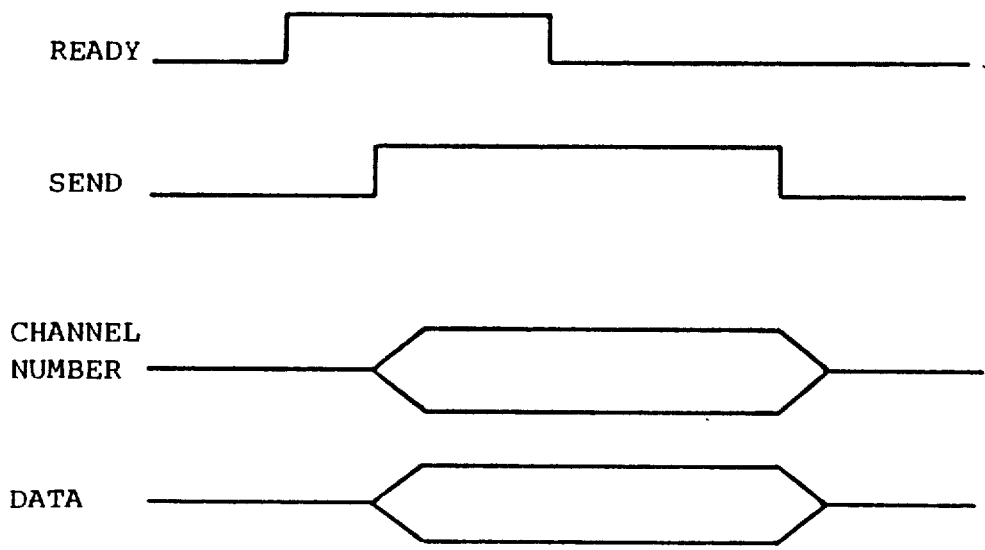
FIG. 27B is a timing chart of handshake control performed between the input portion and the external apparatus.

FIG. 27A is a timing chart of handshake control between the output portion and the external apparatus and FIG. 27B is a timing chart of handshake control between the input portion and the external apparatus.

Referring to FIGS. 23 to 27A and 27B, concrete operation of the sixth embodiment will be described. First, description will be made of operation for outputting data and a channel number from the output portion 50a shown in FIG. 23 to the external apparatuses 80a to 80c shown in FIG. 24. The branching device 508 included in the output portion 50a receives the output packet P6 as shown in FIG. 26B. The branching device 501 identifies a node included in the output packet P6 and determines that it is the outpu packet, and then the output packet P6 is branched to the branching device 502. The branching device 502 branches the output packet P6 to a first word including a channel number of the output as a node number and a second word including data, so that the data and the channel number are latched in the data latch 504 and the channel number latch 505, respectively. The handshake control portion 506 performs handshake control with the timing shown in FIG. 27A, so as to output the channel number and the data to the external apparatuses 80a to 80c.

On the other hand, if any of the logic interfaces 81a to 81c of the external apparatuses 80a to 80c shown in FIG. 24 is enabled to receive the data and the channel number transmitted from the interface controller 503, the ready signal is set to "1". Since the ready signal lines of the logic interfaces 81a to 81c are wired-AND connected, the ready signal supplied to the interface controller 503 is "1" if the ready signals of all the logic interfaces 81a to 81c are "1". When it is determined that the ready signal supplied to the interface controller 503 is "1", the interface controller 503 outputs the channel number and the data with the timing shown in FIG. 27A and sets the sending signal to "1".

The logic interfaces 81a to 81c compare the channel numbers generated therein and the channel numbers transmitted from the interface controller 503 and, for example, when the logic interface 81a determines a match of the channel numbers, the ready signal is rest to "0". Then, the logic interface 81a accepts the data transmitted from the interface controller 503.

Now, operation for inputting data from the external apparatuses 90a to 90c to the interface controller 102 will be described. The handshake control portion 103 included in the interface controller 103 performs handshake control with the timing shown in FIG. 27B and accepts a channel number and data transmitted from any of the output apparatuses 90a to 90c. More specifically, if the handshake control portion 103 is enabled to accept the data, it sets the ready signal to "1".

On the other hand, when the logic interface 91a for example out of the logic interfaces 91a to 91c of the output apparatuses 91a to 90c determines that the ready signal supplied from the interface controller 102 is "1", the logic interface 91a sets the sending signal to "1" and then outputs the data and the channel number to the interface controller 102. When the handshake control portion 103 determines that the sending signal to "1", it accepts the channel number and the data transmitted from the logic interface 91a. Then, the handshake control portion 103 latches the accepted data in the data latch 104 and latches the channel number in the channel number latch 105. After that, the handshake control portion 103 resets the ready signal to "0" and supplies a control signal for updating the generation number to the generation number counter 107.

The generation number counter 107 counts a generation number for each channel number latched in the channel number latch 105 and updates the generation number based on the control signal supplied from the handshake control portion 103, so that the generation number is latched in the tag latch 108. The conversion memory 106 receives, as the address signal, the channel number supplied from the channel number latch 105 and reads out a node number from an area corresponding to the address signal. The node number is latched in the tag latch 108. The data latched in the data latch 104 is supplied to the joining device 109 and the node number and the generation number latched in the tag latch 108 are also supplied to the joining device 109. The joining device 109 composes the node number and the generation number supplied from the tag latch 108 as the first word and the data supplied from the data latch 104 as the second word, so as to form an output packet P9 as shown in FIG. 26E.

Description is now made of operation for initializing the conversion memory 106 and the generation number counter 107 by means of the initializing portion 101 shown in FIG. 23. When the generation number counter 107 is to be initialized, the initialization packet P7 shown in FIG. 26C is supplied to the branching device 501. When the conversion memory 106 is to be initialized, the initialization packet P8 shown in FIG. 26D is supplied to the branching device 501. The branching device 501 determines the initialization packet P7 or P8 dependent on a mode of the initialization packet P7 or P8 and branches the initialization packet P7 or P8 to the initializing portion 101. The initializing portion 101 determines an operation code of the initialization packet P7 or P8. When it is determined that the generation number counter 107 is to be initialized, the initializing portion 101 sets a channel number as the node number in the generation number counter 107. On the other hand, when the initializing portion 101 determines the initialization packet P7, it designates an address of the conversion memory 17 using, as the address, the channel number for the node number, and the node number is written in the conversion memory 106, whereby initialization is effected.

As described above, according to the sixth embodiment, handshake control is exerted on the external apparatuses 80a to 80c by the interface controller 503 included in the output portion 50b, while handshake control is exerted on the external apparatuses 90a to 90c by the interface controller 102 included in the input portion 10a. Thus, the external apparatuses 80a to 80c are identified by tag information of an output packet, so that data is outputted to the external apparatuses 80a to 80c or data supplied from the external apparatuses 90a to 90c is received. Consequently, there is no need to provide means for decomposing packets in the external apparatuses 80a to 80c or to provide means for composing packets in the external apparatuses 90a to 90c. Thus, it becomes possible not only to decrease sizes of the external apparatuses 80a to 80c and 90a to 90c but also to perform high-speed operation.

If a machine of a large capacity is to be constructed, a method may be employed in which an external memory is provided to store a program and processing such as arithmetic operation is performed by using the program. In this case, it is necessary to arithmetically process a tag in a packet. However, in a conventional data flow machine, only data in a packet can be arithmetically processed and if an external memory is provided and elements of a tag are to be processed, it is necessary to provide an arithmetic processing unit specially for that purpose.

Therefore, another embodiment is proposed in which elements of a tag can be processed in a flexible manner by using an arithmetic processing unit for data and a tag and data can be written or read out into or from an external memory. Further, according to this embodiment, switching can be made from execution of a program based on information in a packet, i.e., an external memory flag to execution of a special program.

Figure 28:
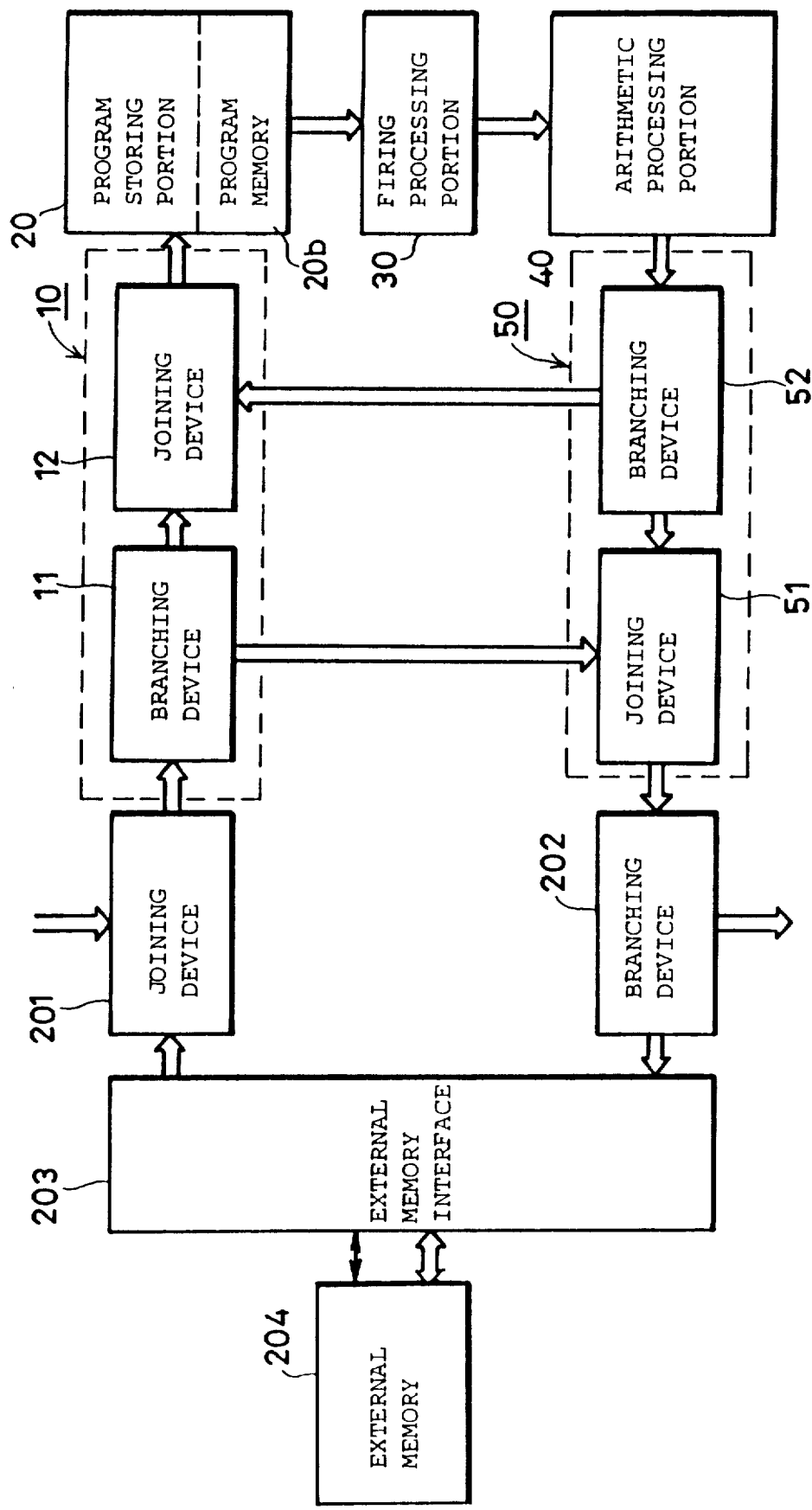
FIG. 28 is a schematic block diagram showing a configuration of a seventh embodiment of the present invention.

FIG. 28 is a schematic block diagram showing a construction of the seventh embodiment of the present invention.

Referring to FIG. 28, an external memory interface 203 is connected to the input portion 10 through the joining device 201 and the external memory interface 203 is connected to the output portion 50 through the branching device 202. An external memory 204 is connected to the external memory interface 203. The external memory 204 stores tags and data. The external memory interface 203 reads out or writes a tag and data from and into the external memory 204. In addition, the program storing portion 20, the firing processing portion 30 and the arithmetic processing portion 40 are also provided in this embodiment.

Figure 29:
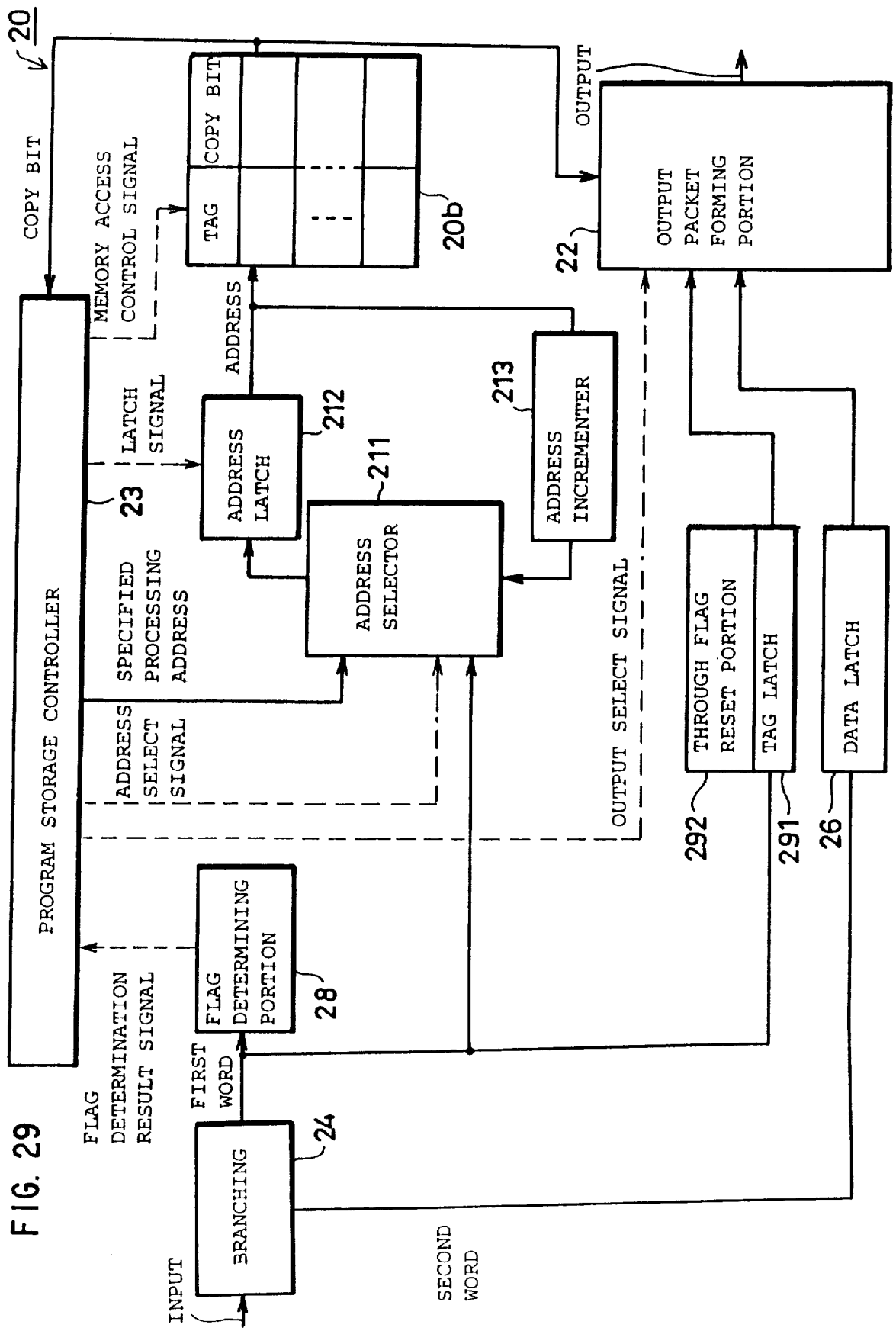
FIG. 29 is a concrete block diagram of a program storing portion shown in FIG. 28.

FIG. 29 is a concrete block diagram of the program storing portion shown in FIG. 28.

Referring to FIG. 29, a construction of the program storing portion 20 will be described. A packet supplied from the input portion 10 is branched to a tag and data by the branching device 24. The branched tag is supplied to the flag determining portion 28, the address selector 211 and the tag latch 291. The flag determining portion 28 determines a through flag included in a tag of a packet. When the flag determining portion 28 determines a through flag, it supplies a flag determination result signal to the program storage controller 23.

The address selector 211 selects a node number included in the tag, based on an address select signal supplied from the program storage controller 23. An output of the address selector 211 is latched in an address latch 212. The address latch 212 supplies the latched node number to the program memory 20b as an address signal and designates an address corresponding thereto. An output of the address latch 212 is supplied to an address increment circuit 213 and the address increment circuit 213 supplies an address increment signal for incrementing the address to the address selector 211.

The tag latch 291 latches the branched tag and supplies it to the output packet forming portion 22. The data latch 26 latches the branched data and supplies it to the output packet forming portion 22. A through flag resetting portion 292 is provided in association with the tag latch 291. The through flag resetting portion 292 resets the through flag included in the tag latched in the tag latch 291.

The program memory 20b stores tags and copy bits. When the address signal is supplied from the address latch 212 to the program memory 20b, the program memory 20b reads out a tag and a copy bit from the corresponding area. The copy bit is supplied to the program storage controller 23 and the tag is supplied to the output packet forming portion 22. The output packet forming portion 22 appropriately selects the tag read out from the program memory 20b, the tag latched in the tag latch 291 and the data latched in the data latch 2, thereby to form a new packet and to supply it to the firing processing portion 40. The program storage controller 23 supplies an address signal for specified processing to the address selector 211, or it supplies a latch signal to the address latch or supplies a memory access control signal to the program memory 20b.

Figure 30:
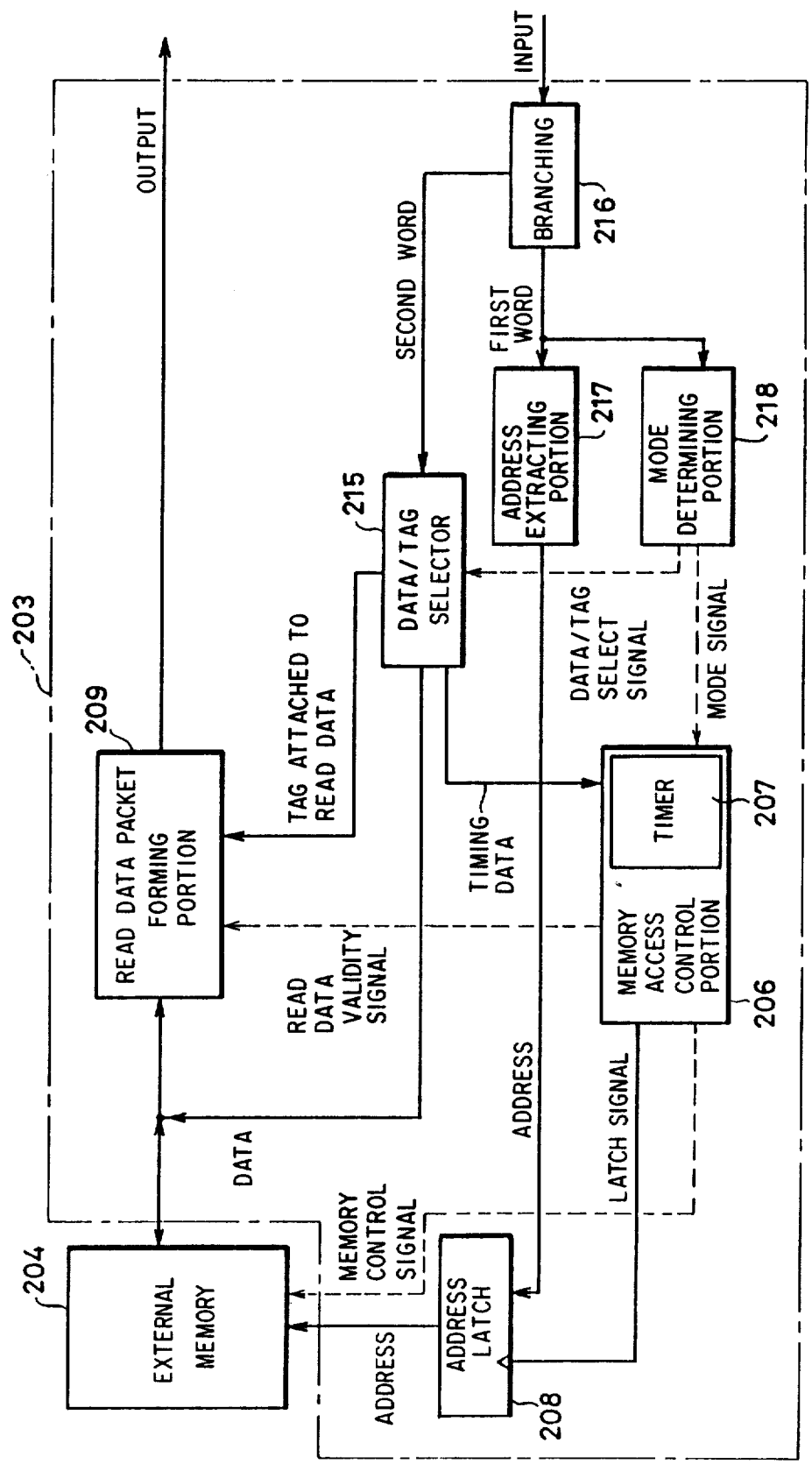
FIG. 30 is a concrete block diagram of an external memory interface shown in FIG. 28.

FIG. 30 is a concrete block diagram of the external memory interface shown in FIG. 28.

Referring to FIG. 30, a construction of the external memory interface 203 will be described. A branching device 216 of the external memory interface 203 receives a packet including a tag and data from the branching device 202 shown in FIG. 28. The branching device 216 branches the tag and the data included in the packet and supplies the branched tag to an address extracting portion 218 and a mode determining portion 218. The branched data is supplied to a data/tag selector 215. The data/tag selector 215 selects write data and a tag attached to read data for the external memory 204, based on the data supplied thereto. The data/tag selector 215 supplies timing data to the memory access control portion 206, the data to the external memory 204 and the tag attached to the read data to a read data packet forming portion 209.

A mode determining portion 218 determines an initialization mode for the external memory interface 203, a read mode from the external memory 204 and a write mode to the external memory 204. The memory access control portion 206 accesses the external memory 204. It includes a timer 207 for generating a memory access timing signal. The memory access control portion 206 supplies a memory control signal to the external memory 204 and supplies a read data validity signal to the read data packet forming portion 209. It supplies, to the address latch 208, a latch signal for latching the address signal extracted by the address extracting portion 217. The address latch 208 latches the address signal and supplies it to the external memory 204. The read data packet forming portion 209 forms a packet by the data read out and the tag attached to the read data.

Figure 31:
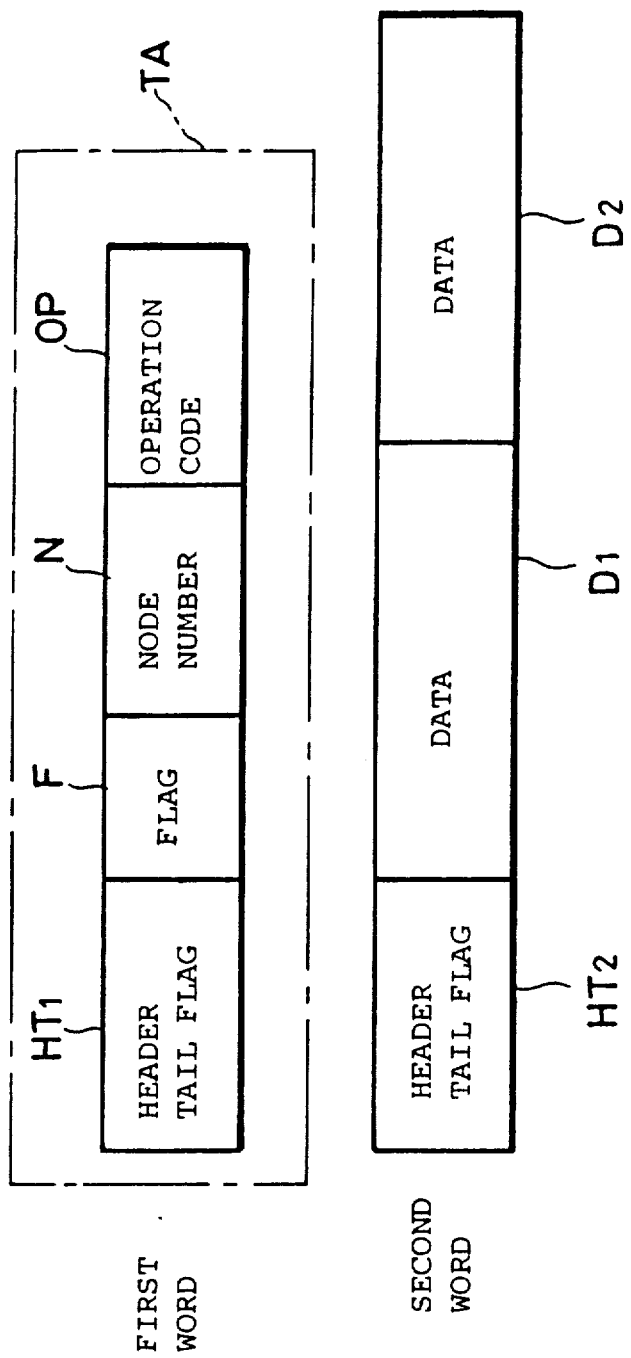
FIG. 31 is a diagram showing formations of packets used in the seventh embodiment.

FIG. 31 is an illustration showing a formation of a packet used in the seventh embodiment.

Referring to FIG. 31, a packet is formed by a first word composed of a tag TA and a second word composed of data. The tag TA includes a header tail flag HT1, a flag F, a node number N and an operation code OP. The second word includes a header tail flag HT2, first data D1 and second data D2. The second data D2 is included only in a packet supplied from the firing processing portion 20 to the arithmetic processing portion 30 shown in FIG. 28.

Figure 32:
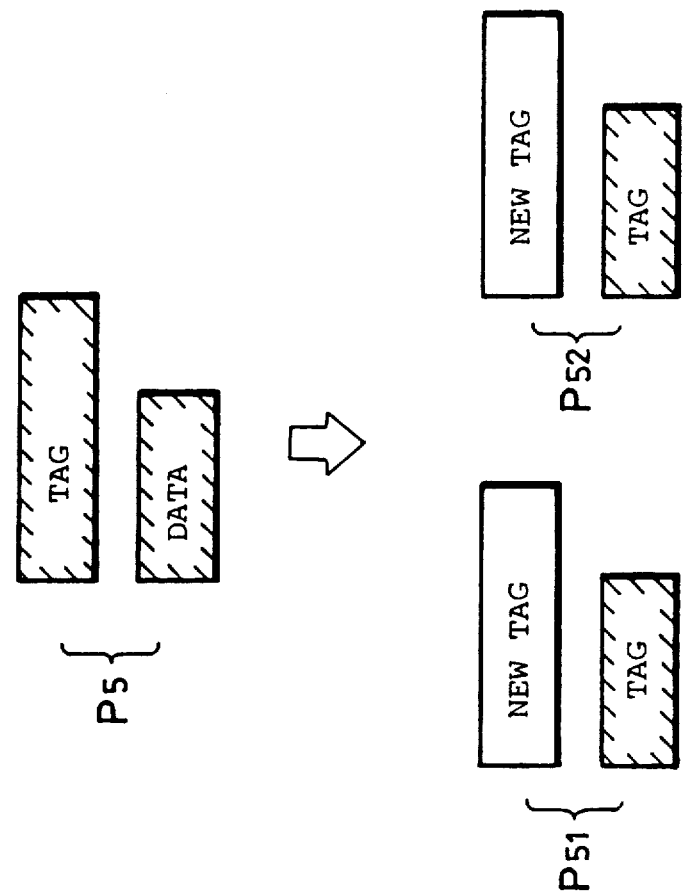
FIG. 32 is an illustration showing changes of input packets in the program storing portion shown in FIG. 29.

FIG. 32 is an illustration showing changes in an input packet in the program storing portion shown in FIG. 29.

Referring to FIG. 32, the input packet P5 includes a tag and data. When the packet P5 is supplied to the program storing portion 20, a new tag is read out from the program memory 20b. Thus, a new output packet P51 is formed by the new tag and the tag included in the input packet, and another new output packet P52 is formed by the new tag read out from the program memory 20b and the data included in the input packet P5, whereby those output packets P51 and P52 are outputted.

Figure 33:
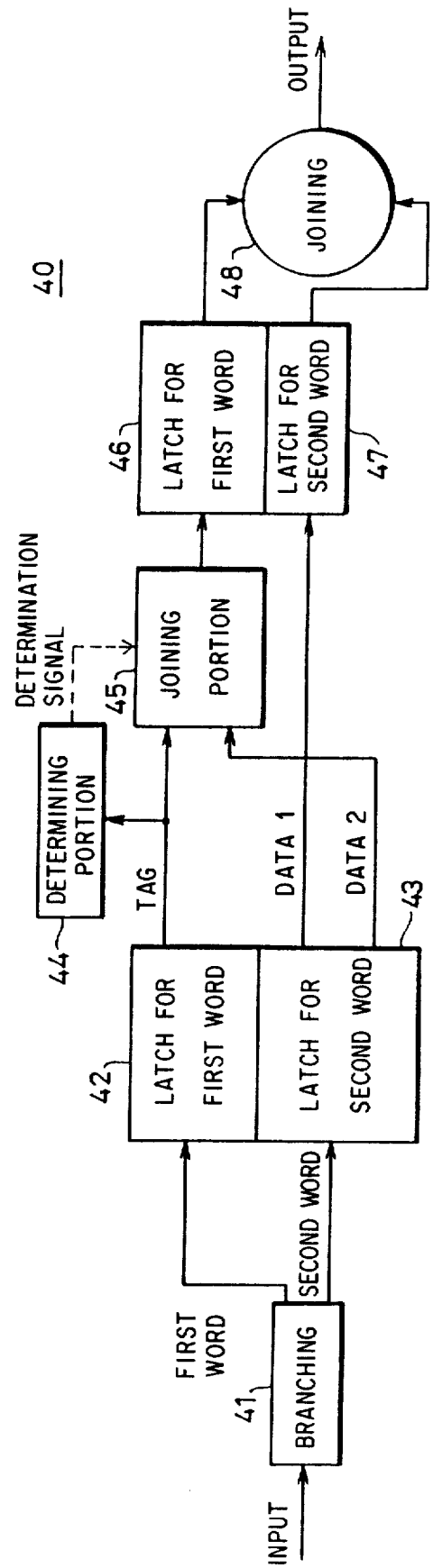
FIG. 33 is a diagram showing a construction of a packet forming portion in an arithmetic processing portion shown in FIG. 28.

FIG. 33 is a diagram showing a construction of the packet forming portion included in the arithmetic processing portion shown in FIG. 28.

Referring to FIG. 33, the input packet supplied to the arithmetic processing portion 40 is supplied to a branching device 41 so as to be branched to a first word and a second word. The branched first word is latched in a first word latch 42 and the branched second word is latched in a second word latch 43. An operation code included in the first word latched in the first word latch 42 is supplied to a determining portion 44 and a joining portion 45. The determining portion 44 determines the operation code and supplies a determination signal to the joining device 45. The second data latched in the second word latch 43 is supplied to the joining device 45. Then, the joining device 45 joins the operation code and the second data D2 and latches them in a first word latch 46. The first data D1 latched in the second word latch 43 is latched in a second word latch 47. The first word latched in the first word latch 46 and the second word latched in the second word latch 47 are joined by a joining device 48 so as to be outputted.

Figure 34A:
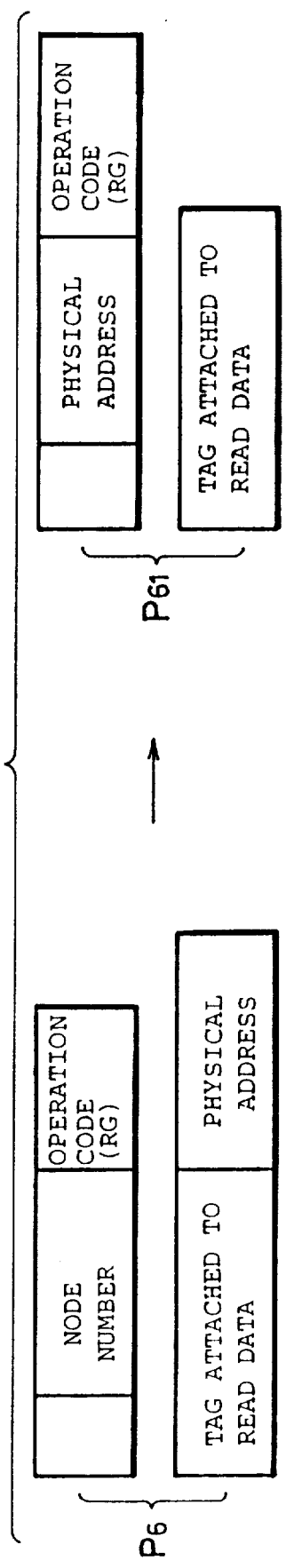
FIGS. 34A and 34B are illustrations for explaining packet forming operation in the arithmetic processing portion.
Figure 34B:
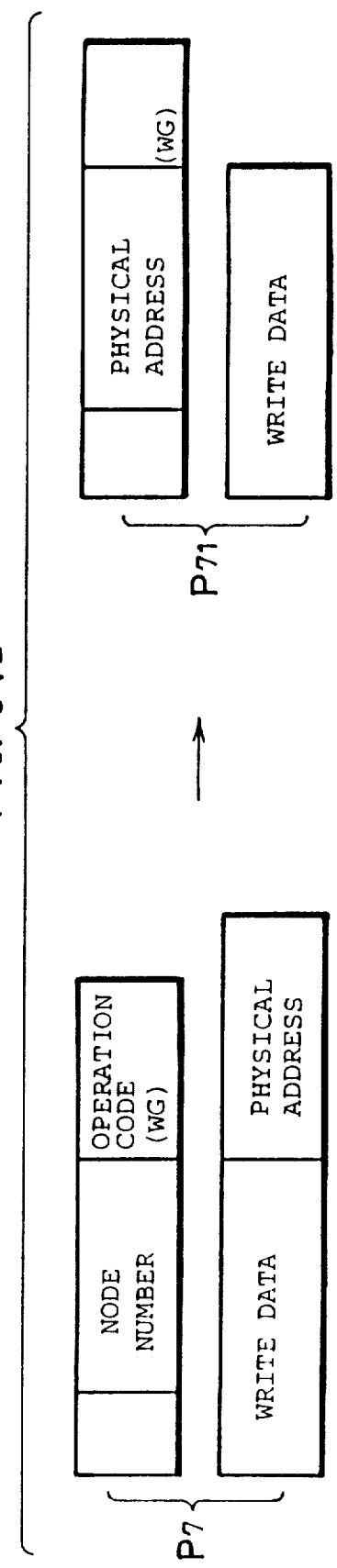

FIGS. 34A and 34B are illustrations showing packets formed by the packet forming portion included in the arithmetic processing portion shown i FIG. 33.

Referring to FIGS. 33, 34A and 34B, packet forming operation in the arithmetic processing portion will be described. First, when a packet P6 as shown in FIG. 34A is supplied to the branching device 41 of the arithmetic processing portion 40, the branching device 41 branches the packet P6 to a first word including a node number and an operation code of the packet P6 and a second word including a tag attached to read data and a physical address. The node number and the operation code are latched in the first word latch 42, while the second word including the tag attached to the read data and the physical address is latched in the second word latch 43.

The determining portion 44 determines the operation code latched in the first word latch 42 and supplies a determination signal to the joining portion 45. The joining portion 45 joins, in response to the determination signal, the operation code latched in the first word latch 42 and the physical address as the second data latched in the second word latch 43, so that they are latched as the first word in the first word latch 46. On the other hand, the second word latch 47 latches the tag attached to the read data as the first data latched in the second word latch 43. Then, the joining device 48 joins the first word including the physical address and the operation code and the second word including the tag attached to the read data, so that an external memory reading packet P61 is formed and outputted.

In the same manner, the arithmetic processing portion 40 receives an input packet P7 formed by a first word including a node number and an operation code and a second word including write data and a physical address as shown in FIG. 34B, and based on the input packet P7, it forms an external memory writing packet P71 formed by a first word including an physical address and an operation code and a second word including write data.

Figure 36A:
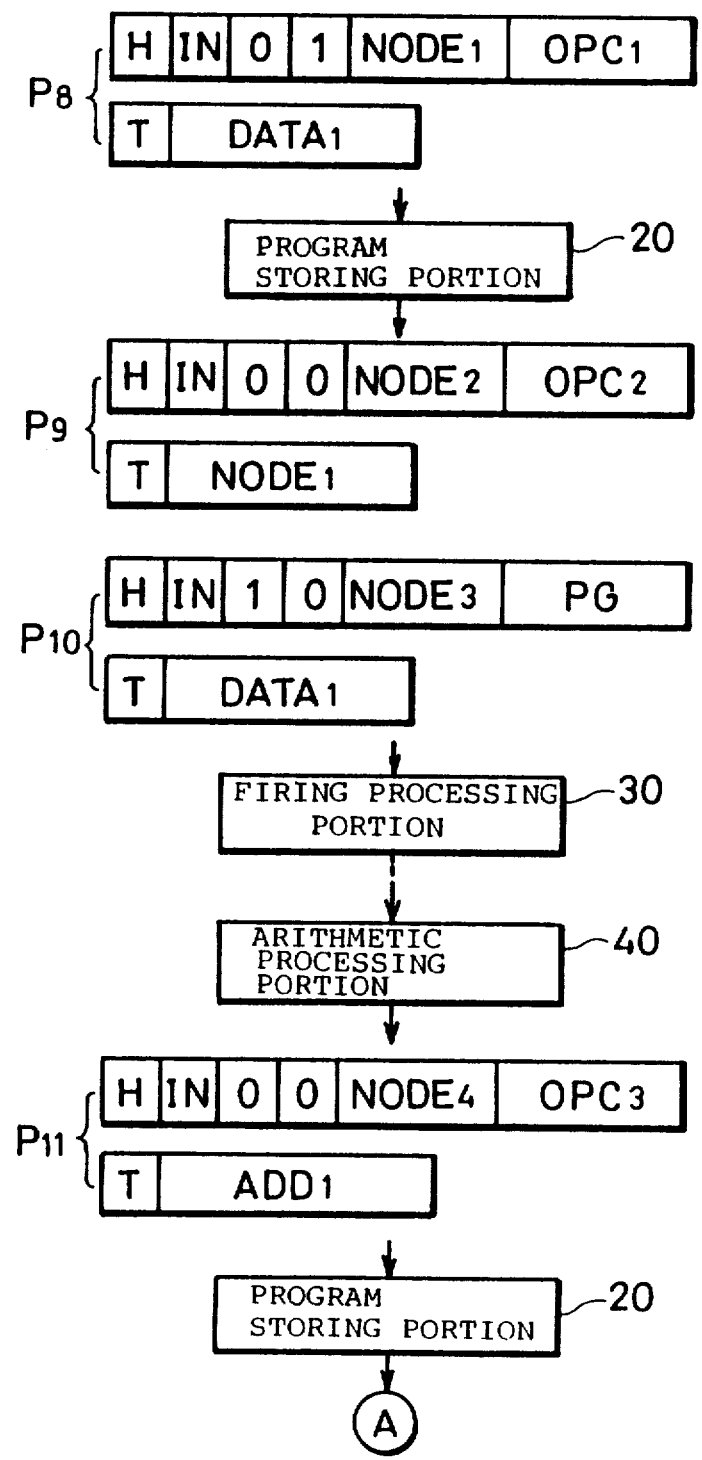
FIGS. 36A and 36B are diagrams showing changes of packets in program fetch.
Figure 36A:
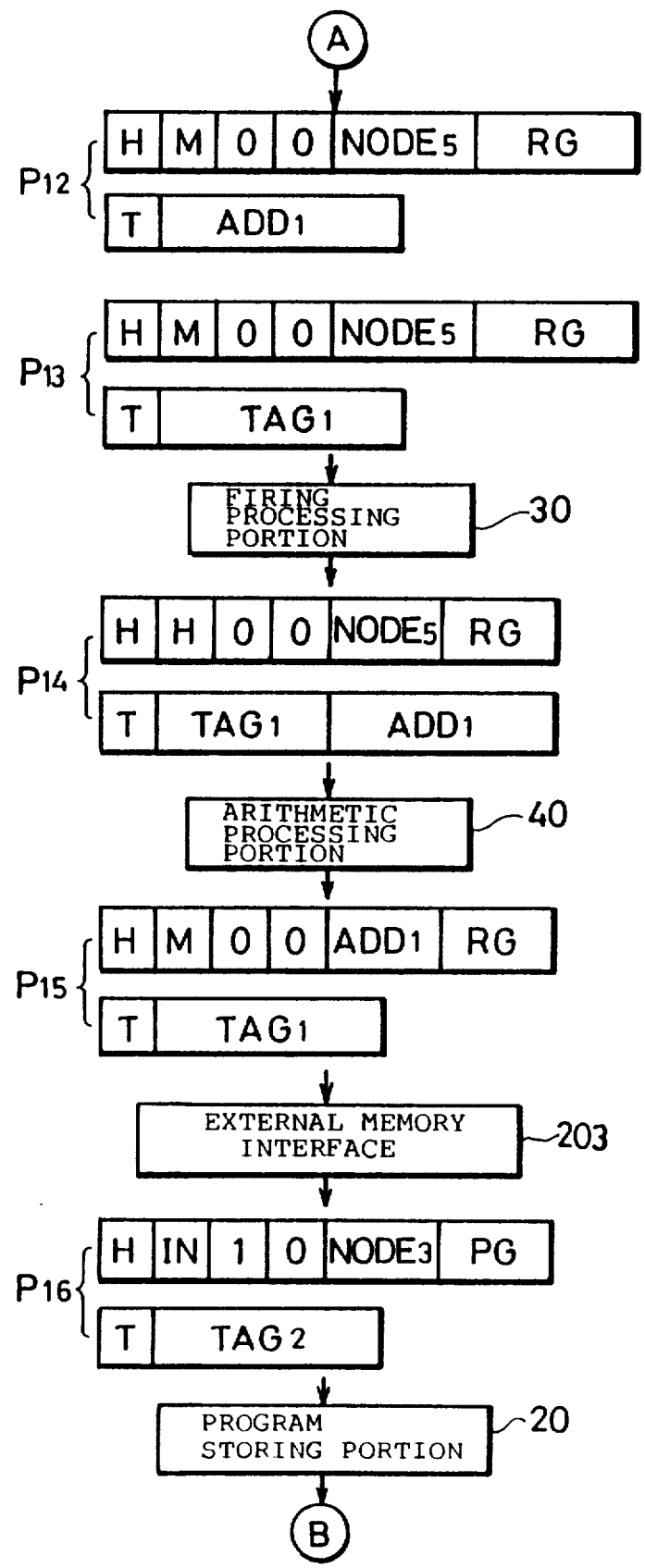
Figure 36B:
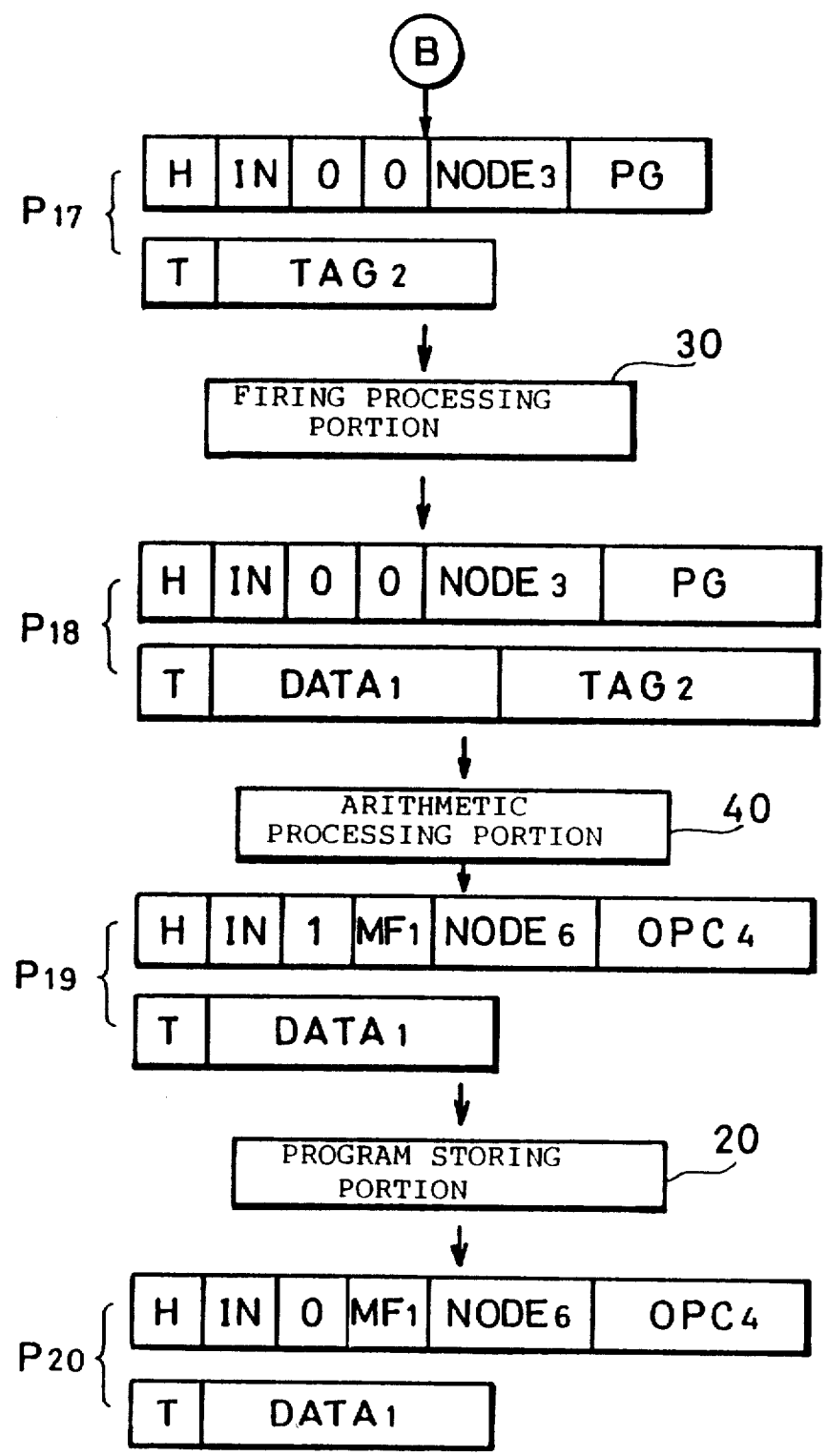
Figure 38:
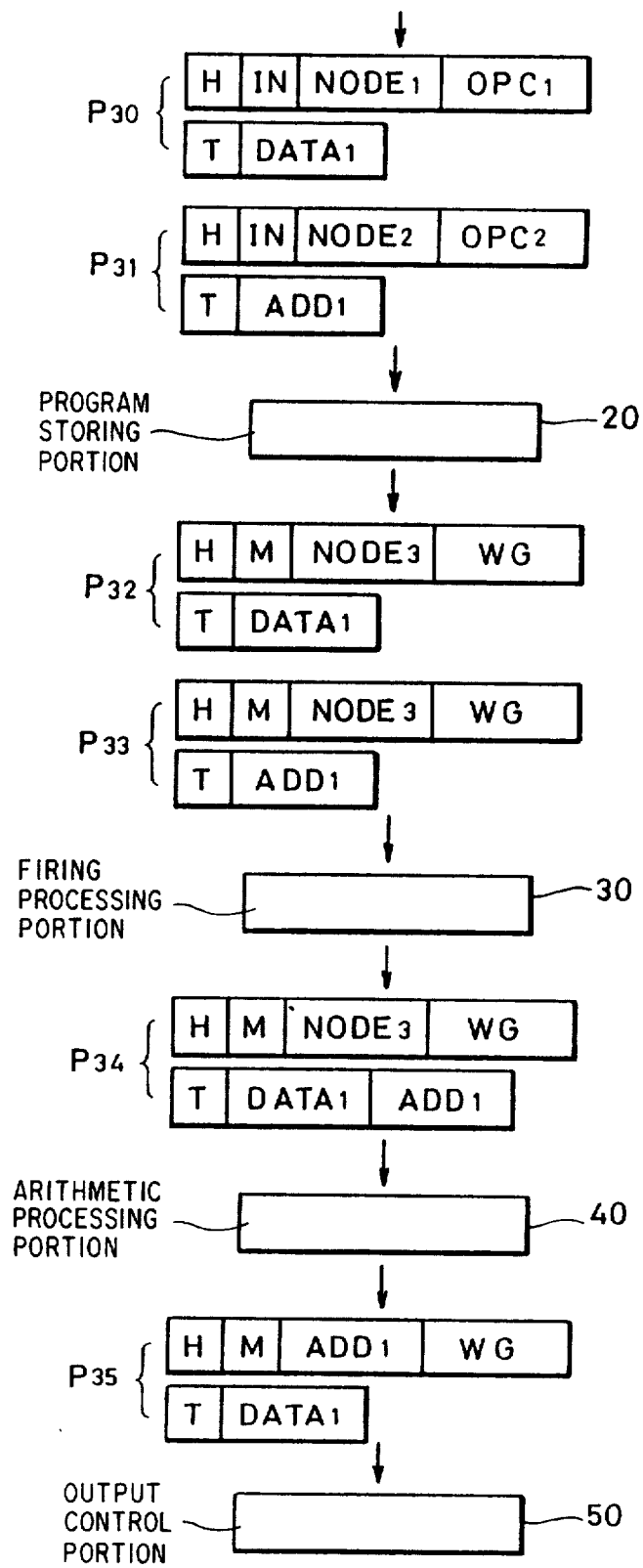
FIG. 38 is a diagram for explaining changes in packets at the time of writing data in the external memory.

FIG. 35 is an illustration showing a packet used in the seventh embodiment of the present invention. FIGS. 36A and 36B are illustrations showing changes in the packet in the case of fetching a program. FIG. 37 is an illustration for explaining operation of writing data into the external memory. FIG. 38 is an illustration for explaining changes in the packet in the case of writing data in the external memory.

Packets for program fetch comprise, as shown in FIG. 35, a packet including a header tail flag HT1, a destination flag F1, a program storage through flag F2, an external memory flag F3, a node number N and an operation code OP, and a packet including a header tail flag HT2, first data D1 and second data D2.

Referring to FIGS. 28 to 37, operation of the seventh embodiment will be described. A packet including a tag and data is inputted from the external memory interface 203 or an external portion through the joining device 201, the branching device 11 and the joining device 12 to the program storing portion 20. The program storing portion 20 reads out a new tag from the program memory 20b based on the tag of the input packet and updates the tag of the input packet to output it to the firing processing portion 30.

The firing processing portion 30 forms a new packet based on the packets to be subjected to binominal operation, for example, based on two packets having the same tag so that the new packet includes the data and the tags of those two packets, and the firing processing portion 30 outputs the new packet to the arithmetic processing portion 40. The arithmetic processing portion 40 performs arithmetic processing according to the tags of the input packet and outputs the result of the processing to the branching device 52. If the packet is to be continuously processed in the machine, it is branched by the branching device 52 and inputted to the joining device 12. If the packet is to be outputted, it is branched by the branching device 52 and supplied to the joining device 51. In addition, the packet for accessing the external memory 204 is supplied from the joining device 51 to the branching device 202 and it is branched by the branching device 202 and supplied to the external memory interface 203. The external memory interface 203 accesses the external memory 204 based on the packed and when data is read out from the external memory 204, a packet including the data is formed and outputted to the joining device 201.

Referring now to FIG. 29, operation of the program storing portion 20 will be described. The input packet is branched by the branching device 24 to a first word (as a tag portion) and a second word (as a data portion) according to the header tail flags HT1 and HT2. The first word is latched in the tag latch 291 and the second word is latched in the data latch 26. The tag includes the program storage through flag F2. The flag determining portion 28 determines the program storage through flag F2. If the flag determining portion determines that the program storage through flag F2 is set to "1", that is, if it determines that data is to pass through the program storing portion 20, it supplies the flag determination result signal to the program storage controller 23. Consequently, the program storage controller 23 controls the through flag resetting portion 292 and resets the program storage through flag latched in the tag latch 291 to "0" to provide an output select signal to the output packet forming portion 22. The output packet forming portion 22 successively outputs the tags latched in the tag latch 291 and the data latched in the data latch 26.

Description is now made of a case in which the program storage portion through flag F2 of the tag of the packet is "0". In this case, the flag determining portion 28 determines the external memory flag F3 included in the tag. Then, the following two kinds of operations are performed dependent on whether the external memory flag F3 is set or not. First, when the flag determining portion 28 determines that the external memory flag F3 is "0", the program storage controller 23 supplies the address select signal to the address selector 211 based on the flag determination result signal and selects a node number N included in the tag so that the node number N is latched in the address latch 212. The address signal latched in the address latch 212 is supplied to the program memory 20b, so that a tag and a copy bit are read out from the corresponding area. The copy bit thus read out is supplied to the program storage controller 23 and the tag is supplied to the output packet forming portion 22. When the program storage controller 23 determines that the copy bit is not set, it supplies an output select signal for outputting the tag read out from the program memory 20b as the first word of the output packet and the data of the second word of the input packet latched in the data latch 26 as the second word of the output packet.

If the program storage controller 23 determines that the copy bit is set, it outputs an output packet from the output packet forming portion 22 in the same manner as in the case in which the copy bit is not set, and it generates a new address signal obtained by adding 1 to the above mentioned node number by means of the address increment circuit 213, whereby the new address signal is latched in the address latch 212 through the address selector 211. Then based on the address signal latched in the address latch 212, the tag and the copy bit are read out from the program memory 20b. Based on the copy bit thus read out, the program storage controller 23 performs processing for one of the above stated two cases.

Referring to FIG. 32, operation with the external memory flag F3 being set will be described. When the flag determining portion 28 determines that the external memory flag F3 is set, the program storage controller 23 outputs a specified processing address signal to the address selector 211 based on the flag determination result signal and also outputs an address select signal for outputting the specified processing address signal. The address selector 211 selects the specified processing address signal based on the address select signal supplied from the program storage controller 23 and latches it in the address latch 212. Then, based on the specified processing address signal latched in the address latch 212, the tag and the copy bit are read out from the program memory 20b. When the copy bit is supplied from the program memory 20b, the program storage controller 23 supplies an output select signal to the output packet forming portion 22 to output the tag read out from the program memory 20b as the first word of an output packet and the tag of the input packet latched in the tag latch 291 as the second word of the output packet. Thus, the output packet P51 as shown in FIG. 32 is outputted from the output packet forming portion 22.

Subsequently, the program storage controller 23 adds 1 to the address signal by means of the address increment circuit 213 and latches a second specified processing address signal in the address latch 212 through the address selector 211. The program memory 20b reads out the tag and the copy bit from the corresponding area based on the second specified processing address signal latched in the address latch 212. The program storage controller 23 outputs, to the output packet forming portion 22, an output select signal for outputting the tag read out from the program memory 20b as the first word of an output packet according to the copy bit read out from the program memory 20b, and the data of the input packet latched in the data latch 26 as the second word of the output packet. Thus, an output packet P52 shown in FIG. 32 is outputted from the output packet forming portion 22.

The above described second specified processing address signal may be outputted from the program storage controller 23 independently of the first specified processing address signal.

Referring now to FIGS. 28, 30, 31, 33, 34 and 34B, description is made of operation of the external memory interface 203 and an access system of the external memory 204 by means of this external memory interface 203. First, if data is to be read out from the external memory 204, the program storing portion 20 evaluates a physical address read out from the external memory 24 and then the program storing portion updates the first word of the packet including this physical address to a tag including an "RG instruction" as an operation code. Then, the firing processing portion 30 recomposes the packets as a packet P6 as shown in FIG. 34A, which has two data, i.e., the tag attached to read data maintained as constant data and the above mentioned physical address. In response to the "RG instruction", the arithmetic processing portion 40 transfers the physical address to a field of a node number N to form a packet P61 as shown in FIG. 34A, so that the packet P61 is inputted to the external memory interface 203.

This packet is supplied to the branching device 216 of the external memory interface 203 so as to be branched to a first word and a second word according to the header tail flags HT1 and HT2. The mode determining portion 218 determines the read mode based on the "RG instruction" by the field of the operation code OP included in the branched tag and supplies a read mode signal to the memory access control portion 206. The physical address and the operation code "RG" as the tag of the input packet are supplied to the address extracting portion 217 and the address extracting portion 217 extracts the physical address and supplies the address to the address latch 208. The memory access control portion 206 supplies a latch signal to the address latch 208 to latch the address signal. At the same time, the memory access control portion 206 supplies a memory control signal to the external memory 204 with timing preset in a timer 207. Thus, the external memory 204 reads out data from an area corresponding to the address supplied from the address latch 208.

On the other hand, a data-tag select signal is supplied from the mode determining portion 218 to a data/tag selector 215 and the data/tag selector 215 supplies the tag attached to read data branched by the branching device 216 to a read data packet forming portion 209. The read data validity signal has been supplied from the memory access control portion 206 to the read data packet forming portion 209 and based on the read data validity signal, the read data packet forming portion 209 accepts the data read out from the external memory 204. Then, the read data packet forming portion 209 outputs a packet including the data read out from the external memory 204 as the second word and the tag attached to the read data as the first word.

Referring to FIGS. 37 and 38, operation for writing data in the external memory 204 will be described. FIG. 37 shows a formation of a packet for writing data in the external memory 204, the respective reference characters having the same meanings as those in FIG. 35. As for the flags F, those other than the destination flags are omitted from the illustration.

The program storing portion 20 receives packets P30 and P31 as shown in FIG. 38. The program storing portion 20 evaluates, based on a program, a physical address and write data for writing data in the external memory 204. Then, using the packet P30 having the physical address and the packet P31 having the write data as operation codes, the program storing portion 20 updates the first word to the tag having a "WG instruction" and outputs packets P32 and P33 to the firing processing portion 30.

The firing processing portion 30 recomposes the packets P32 and P33 as a packet P34 having the two data, i.e., the physical address and the write data and supplies the packet P34 to the arithmetic processing portion 40. The arithmetic processing portion 40 forms a packet P35 by transferring the physical address to a field of the node number according to the "WG instruction" included in the packet P34 and supplies the packet P35 to the external memory interface 204.

The packet P35 is supplied to the branching device 217 of the external memory interface 203. The branching device 217 branches the packet P35 to a first word and a second word according to the header tail flags. The mode determining portion 18 determines the "WG instruction" in the field of the operation code included in the branched first word and supplies a mode signal for write instruction to the memory access control portion 206. The physical address for writing in the memory included in the field of the node number of the branched first word is extracted by the address extracting portion 217 so as to be supplied to the address latch 208. The memory access control portion 206 supplies a latch signal to the address latch 208 to latch the physical address in the address latch 208.

The write data of the branched second word is supplied to the data/tag selector 210. The data/tag selector 210 supplies the write data to the external memory 204 based on a data-tag select signal supplied from the mode determining portion 205. The timer 207 included in the memory access control portion 206 outputs a timing signal with the preset timing. The memory access control portion 206 supplies a memory control signal to the external memory 204 based on the timing signal, so that the write data is written in the external memory 204.

Description is now made of operation for setting access timing in the timer 207 of the memory access control portion 206. This timing is set by supplying a packet including an "ST instruction" as an operation code and timing data as the second word to the external memory interface 203. The packet inputted to the external memory interface 203 is branched to the first word and the second word by the branching device 216. The mode determining portion 218 determines the "ST instruction" in the field of the operation code included in the branched first word and supplies a data-tag select signal to the data/tag selector 215. The data/tag selector 215 supplies timing data to the memory access control portion 206 and sets the timing data in the timer 207.

Referring now to FIGS. 36A and 36B, operation for program fetch will be described. The flag F shown in FIG. 31 is divided to a destination flag F1, a program storage through flag F2 and an external memory flag F3 in FIG. 35.

As shown in FIG. 36A, a packet P8 with the external memory flag F3 being set is inputted to the program storing portion 20 shown in FIG. 28. The packet P8 is inputted to the branching device 24 shown in FIG. 29 so as to be branched to the first word and the second word. The flag determining portion 28 determines a result of flag determination to be "true" based on the external memory flag F3 included in the branched first word and outputs the result. Consequently, the program storing portion 10 outputs packets P9 and P10 including the node number and the data of the packet P8 as the respective second words. The packet P10 is in a waiting state in the firing processing portion 30, while the packet P9 is supplied to the arithmetic processing portion 40. The arithmetic processing portion 40 processes the node number of the second word of the packet P9 according to a program. More specifically, it is processed in a path circulating in the arithmetic processing portion 40, the output portion 50, the input portion 10, the program storing portion 20 and the firing processing portion 30. Then, the arithmetic processing portion 40 outputs a packet including as the second word a physical address for reading data from the external memory 204.

Since the packet P11 has a destination flag F1 indicating "IN", it is inputted again to the program storing portion 20 through the branching device 52 and the joining device 12. The program storing portion 20 sets "M" as a destination flag of the first word to indicate that the destination is the external memory interface and updates the tag to a tag including the "RG instruction" as an operation code, whereby a packet P12 is outputted. The packet P12 is supplied to the firing processing portion 30, where it fires with a packet P13 including a tag attached to read data as the second word, so that a packet P14 is formed.

The above mentioned packet P13 is formed in the following manner. When the packet P11 is inputted to the program storing portion 20, an address signal corresponding to the node number of the packet P11 is outputted from the address selector 211 and based on the address signal, a tag and a constant flag (not shown) are read out from the program memory 20b. Then, based on this tag, the program storing portion 20 updates the tag of the packet P11 and outputs the packet P12.

On the other hand, the constant flag in this case indicates "true". In other words, the constant flag indicates that constant data is stored in the subsequent address. Accordingly, the program storage controller 23 reads out the constant data from the program memory 20b. Subsequently, the program storing portion 20 forms the packet P13 by the tag read out from the program memory 20b, and the constant data, and outputs the packet P13.

The packet P14 outputted from the firing processing portion 30 is supplied to the arithmetic processing portion 40. The arithmetic processing portion 40 transfers the physical address for reading data from the external memory 204 as the second word to the field of the node number, according to the "RG instruction" and outputs a packet P15. Since the destination flag of the packet P15 is set to "M" to output the packet P15 to the external memory interface 203, the packet P15 is outputted to the external memory interface 203 through the branching device 52, the joining device 51 and the branching device 202.

The mode determining portion 18 of the external memory interface 203 determines that the read mode of the data from the external memory 204 is set since the operation code is the "RG instruction". The memory access control portion 206 reads out the data from the external memory 204 and outputs a packet P16 including the data read out from the external memory 204 as the second word and the tag attached to the read data of the second word included in the input packet as the first word. Since the destination flag of the packet P16 is "IN" indicating the inside of the data flow machine, the packet P16 is supplied to the program storing portion 20 through the joining device 201, the branching device 11 and the joining device 12 shown in FIG. 28.

The flag determining portion 28 of the program storing portion 20 determines the storage through flag F2 included in the packet P16 and the through flag resetting portion 292 resets the storage through flag F2. More specifically, the program storing portion 20 only performs processing for resetting the through flag F2 of the packet P16 and outputs a packet P17.

Subsequently, the firing processing portion 30 recomposes the packets P10 and P17 in the waiting state to form a new packet P18 including the respective second words included in those packets. The packet P18 is supplied to the arithmetic processing portion 40 and the arithmetic processing portion 40 updates the first word of the packet P18 by the new tag (TAG 2) as the data read out from the external memory 204, included in the second word of the packet P18, based on a "PG instruction" included in the packet P18, thereby to output a packet P19. Since the destination flag of the packet P19 is "IN", the packet P19 is supplied again to the program storing portion 20. Since the program storage through flag F2 is set in the packet P19, the flag determining portion 28 determines the program storage through flag F2 and the through flag resetting portion 292 resets the program storing portion through flag F2. Then, the packet P19 is outputted from the program storing portion 20.

Although the example of storing the copy bit in the program memory 20b was described in the above described embodiment, the copy bit may be omitted. Operation of the program storing portion 20 in such a case will be described. An input packet is branched to a tag and data by the branching portion 24 of the program storing portion 20 and the tag and the data are latched in the tag latch 291 and the data latch 26, respectively. The tag is supplied to the flag determining portion 28 and operation for determining the program storage through flag F2 is performed in the same manner as in the above described embodiment. In addition, operation in the case in which the program storage through flag F2 is set is also performed in the same manner as in the above described embodiment.

If the program storage through flag F2 is not set, the external memory flag F3 is determined by the flag determining portion 28. When the flag determining portion 28 determines that the external memory flag F3 is not set, it supplies the flag determination result signal to the program storage controller 23. In response to the flag determination result signal, the program storage controller 23 controls the address selector 211 and outputs the node number included in the branched tag to the address latch 211. The address latch 212 latches the node number in response to the latch signal outputted from the program storage controller 23. The program memory 20b reads out a tag from the corresponding area based on the address signal latched in the address latch 212.

Further, an output select signal is supplied from the program storage controller 23 to the output packet forming portion 22. The output packet forming portion 22 outputs an output packet including the tag read out from the program memory 20b as the first word and the data latched in the data latch 26 as the second word.

On the other hand, when the flag determining portion 28 determines that the external memory flag F3 is set, the program storage controller 23 outputs a specified processing address signal to the address selector 211 based on the flag determination result signal and controls the address selector 211 by the address select signal so that the specified processing address signal is outputted to the address latch 212. The address latch 212 latches the specified processing address signal and supplies it to the program memory 20b. In response thereto, a tag is read out from the program memory 20b. Further, the output select signal is supplied from the program storage controller 23 to the output packet forming portion 22 and the output packet forming portion 22 forms an output packet including the tag read out from the program memory 20b as the first word and the tag latched in the tag latch 291 as the second word.

At the same time, the address signal is incremented by 1 by the address increment circuit 213 under control of the program storage controller 23. The address signal is latched in the address latch 212 through the address elector 211. The program memory 20b reads out a tag from the corresponding area based on the address signal latched in the address latch 212. The program storage controller 23 outputs the output select signal to the output packet forming portion 22 and outputs an packet including the tag read out from the program memory 20b as the first word and the data latched in the data latch 26 as the second word. Subsequently, operation is performed in the same manner as the above described embodiment.

Although a single external memory 204 is connected to a data flow machine in the above described embodiment, a so-called multiprocessor arrangement including a plurality of data flow machines interconnected may be adopted and one or more external memories 204 may be connected to enable branching to the data flow machines through a branching device by using the predetermined numbers allotted to the machines as destination flags.

If operation of a recursive function is executed in a data flow machine, colors permitted to be used are decreased according to the development in a hierarchy of recursion and if all the colors are used, it is feared that the execution of operation of the recursive function might be stopped.

Therefore, another embodiment is proposed in which, in the execution of operation of a recursion function, a color obtained in a higher level in a hierarchy is set free and a return node number is pushed to a recursion stack so as to be popped at the time of return, which makes it possible to continuously execute operation of the recursion function without using all the colors. This eighth embodiment will be described in the following.

Figure 39:
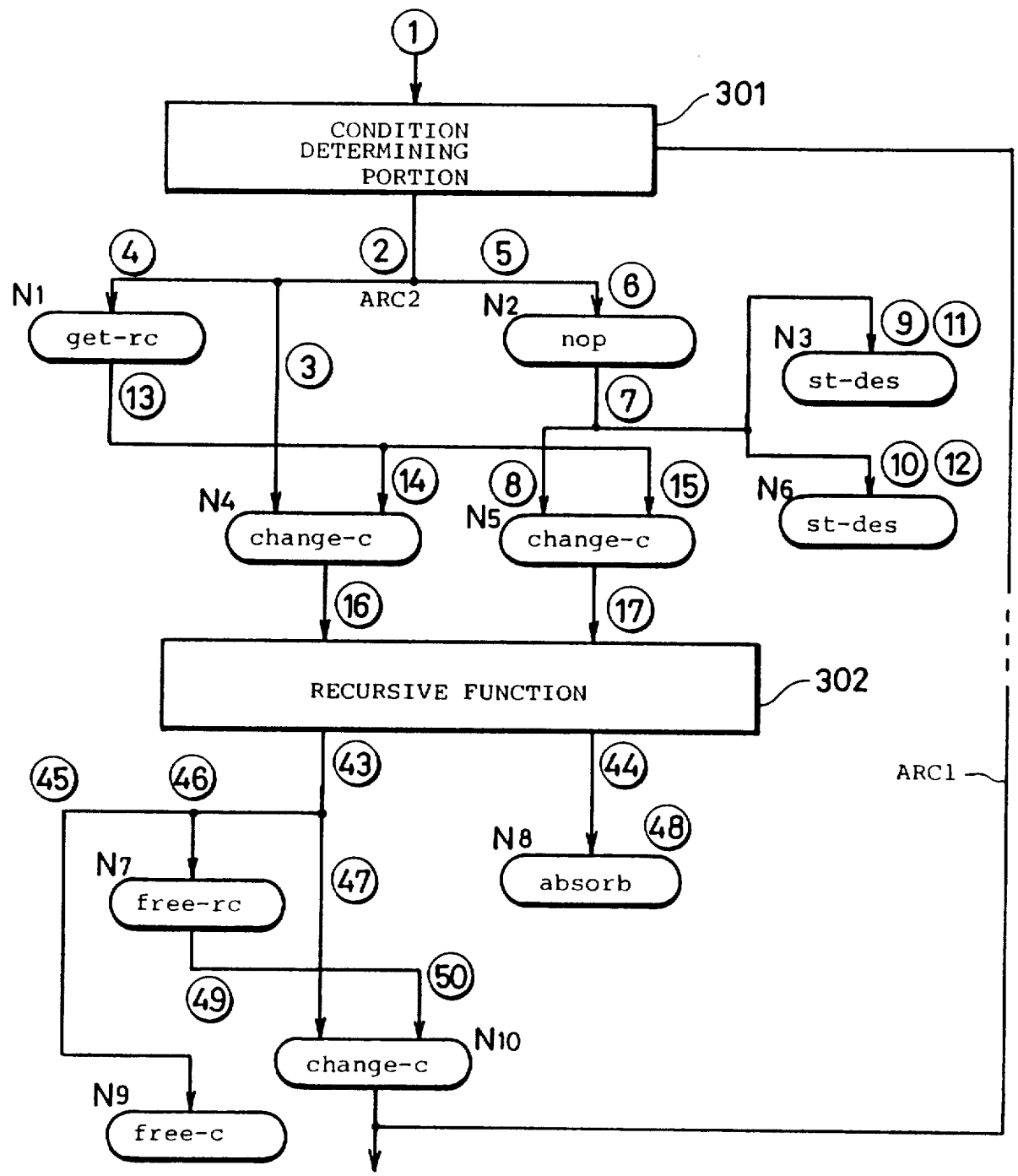
FIG. 39 is a diagram showing a data flow graph of the highest level in a hierarchy of a recursive function in an eighth embodiment of the present invention.
Figure 40:
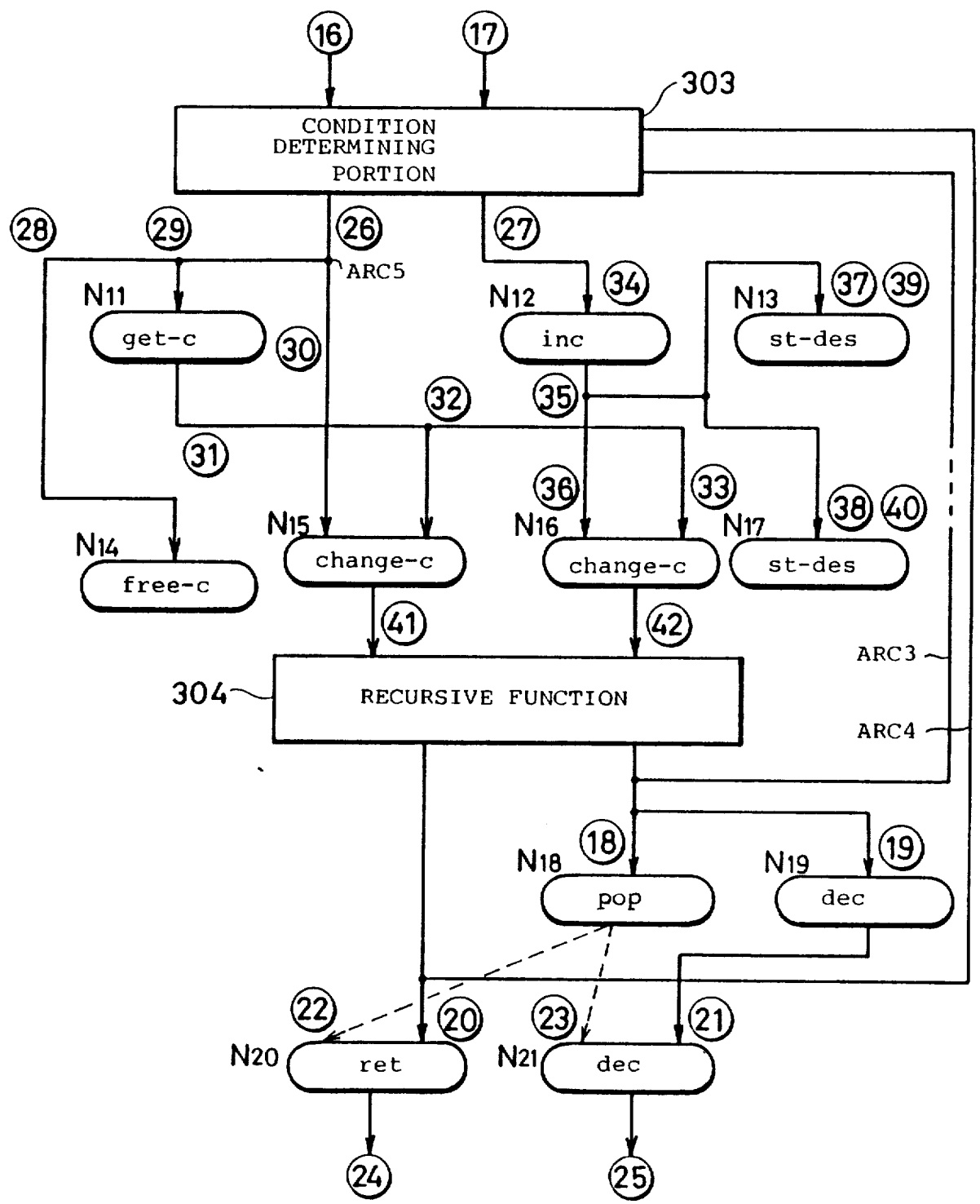
FIG. 40 is a diagram showing a data flow graph of the second and subsequent levels in the hierarchy of the recursive function.

FIG. 39 is a diagram showing a data flow graph of the highest level in a hierarchy of a recursive function in the eighth embodiment. FIG. 40 is a diagram showing a data flow graph of the second and subsequent levels in the hierarchy of the recursive function.

First, the data flow graph of the recursive function executed by the eighth embodiment will be described. Prior to the execution of operation of the recursive function, an input packet including a tag and data is copied and updated to instructions, i.e., a get-rc (get-recursive color) instruction, a change-c (change-color) instruction and an nop (no operation) instruction, so as to be executed. As to the packet having the nop instruction executed, an initial value of a recursion counter indicating a level of execution of recursion is obtained and this packet is updated to a change-c instruction and two st-des (store-destination) instructions.

According to the get-rc instruction, a color non-used is obtained from a color group and the state in which the color is being used is stored and further, a generation number or a color number of the tag included in the input packet is stored. The color obtained by the get-rc instruction is stored in the data portion of the packet and updated to two change-c instructions. The two change-c instructions instruct the color obtained by the get-rc instruction to be stored in a field region of the color number of the tag included in one of the input packets, whereby the color number is updated and outputted to the data flow graph of the second and subsequent levels of the hierarchy shown in FIG. 40. The two st-des instructions have, as constants, the node numbers of the change-c instruction and the absorb instruction which are return destinations of the recursive function and according to those two st-des instructions, the constants are stored in a data field of an input packet and the packet is stored in the recursion stack. Thus, two data are stored in the data field of the input packet.

Destination nodes of the two st-des instructions indicate two ret (return) instructions shown in FIG. 40. A recursion stack is formed for each destination node number and a packet is stored in a position indicating a value of the recursion counter stored in the data field of the packet. If a packet including the st-des instruction is to be stored in the stack, the instruction included in the tag of the packet is changed to the ret instruction. Two packets returned from the recursive function are updated to a change-c instruction and an absorb instruction. According to the absorb instruction, the input packet is absorbed and copied as a change-c color and it is updated to a free-rc (free-recursive) instruction. According to the free-rc instruction, an error/generation number stored by the get-rc instruction is stored in the data field of the packet and it is outputted as a change-c instruction. According to the free-c instruction, the color stored in the area of a color/generation number included in the tag of the input packet is set free and is in a non-use state.

According to the change-c instruction, the color/generation number obtained by the free-rc instruction is stored in the field of the color/generation number included in the tag of one of the packets and that packet is outputted, whereby all the processing is completed.

In the data flow graph of the second and subsequent levels shown in FIG. 40, a packet inputted from a higher level of the hierarchy is inputted to a condition determining portion 303 and it is determined whether the recursive function is to be executed again or to be returned. If it is determined by the condition determining portion 303 that the recursive function is to be executed again, a color non-used is obtained from a color group by the get-c (get-color) instruction and the color/generation number of the packet is updated, so that the packet is outputted to the recursive function. At this time, the color obtained at a higher level, stored in the field of the color/generation number included in the tag of the input packet is set free to be in a non-use state by the free-c (free-color) instruction.

Further, according to an inc (increment) instruction, processing is performed to add 1 to the value of the recursion counter stored in the data field of the input packet. On the other hand, if the condition determining portion 303 determines the return, the packet including the value of the recursion counter in the data portion thereof is updated to a pop instruction and a dec (decrement) instruction and the packet including a result of arithmetic operation in the data field is updated to an ret instruction. The packet updated to the dec instruction instructs a subtraction of 1 from the number of the recursion counter stored in the data field of the packet and it is updated to an ret instruction.

According to the pop instruction, processing is performed to take out, from the recursion stack, all the packets stored in the positions indicated by the values of the recursion counter included in the data field of the input packet. The destination node number included in the tag of each packet taken out has a node number of an ret instruction and the operation code thereof has an ret instruction. Accordingly, each packet taken out is updated to an ret instruction. Since the destination node number of the ret instruction is stored in the data field of the packet taken out by the pop instruction, a packet having the instruction node number including the result of the arithmetic processing updated to the destination node number stored in the data field of the packet taken out by the pop instruction is outputted and the outputted packet returns to the higher level of the hierarchy.

Figure 41:
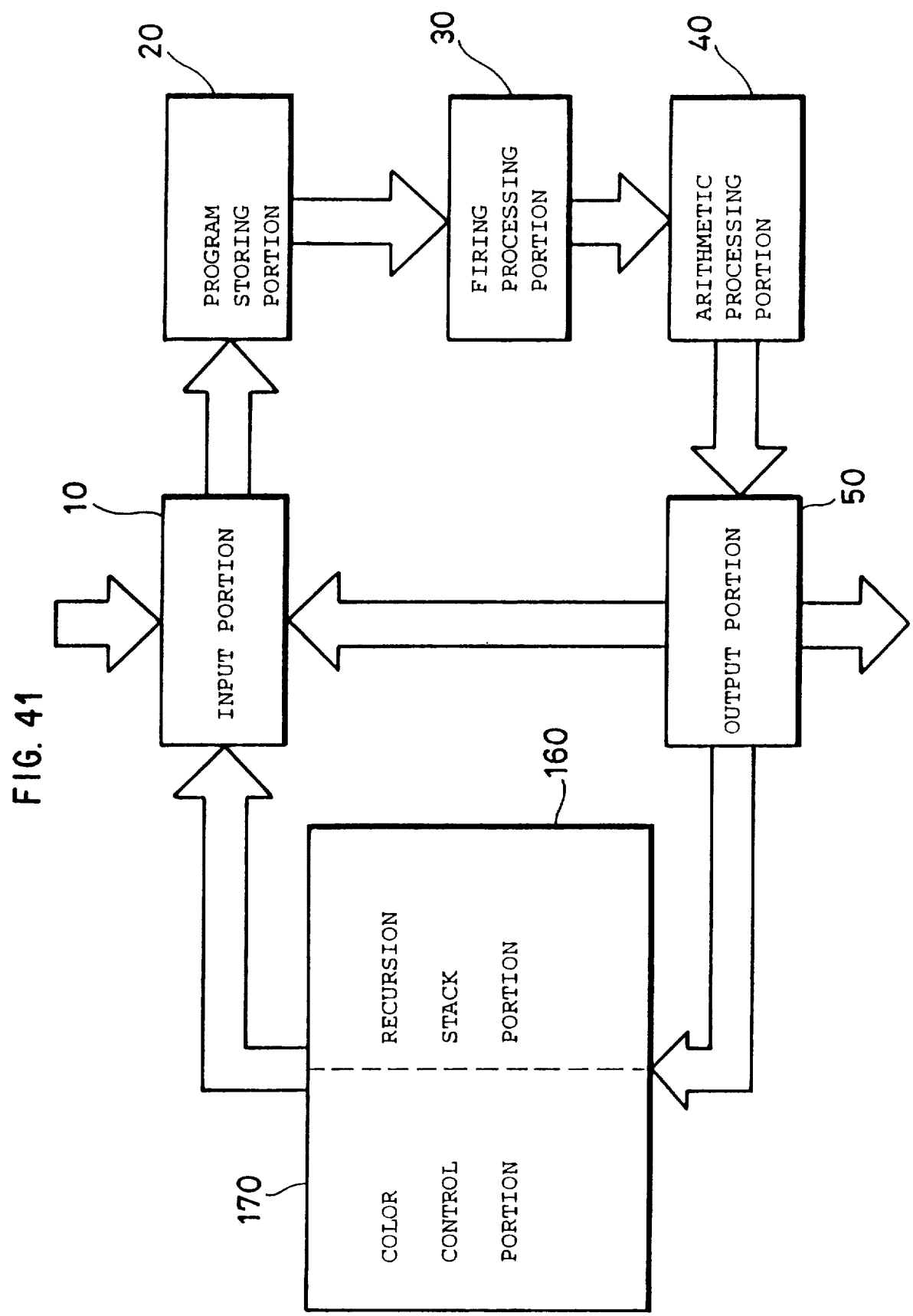
FIG. 41 is a schematic block diagram showing a configuration of the eighth embodiment of the present invention.

FIG. 41 is a schematic block diagram showing a construction of the eighth embodiment of the present invention. Referring to FIG. 41, the input portion 10, the program storing portion 20, the firing processing portion 30, the arithmetic processing portion 40 and the output portion 50 are constructed in the same manner as in the above described first embodiment. In addition, the eighth embodiment further comprises a recursion stack portion 160 and a color control portion 170 between the input portion 10 and the output portion 50. According to this eighth embodiment, the input portion 10 receives an input packet inputted from an external portion, an arithmetic result packet outputted from the output portion 50, a pop packet outputted from the recursion stack portion 160 and a color holding packet outputted from the color control portion 170.

The program storing portion 20 stores the above described data flow graphs shown in FIGS. 39 and 40 in its program memory and based on the packet outputted from the input portion 10, it updates the tag of the input packet according to the destination node number included in the tag of the packet and outputs the packet. Based on the instruction packet outputted from the program storing portion 20, the firing processing portion 30 forms an arithmetic packet by first and second packets including the same tag. The arithmetic processing portion 40 arithmetically processes data of the arithmetic packet according to the instruction included in the tag of the arithmetic packet outputted from the firing processing portion 30. The output portion 50 receives a result packet outputted from the arithmetic processing portion 40 and a packet processed by the recursion stack portion 160 or the color control portion 170 and outputs the packets to an external portion, to the input portion 10 or to the recursion stack portion 160 or the color control portion 170. The recursion stack portion 160 stacks packets. The color control portion 170 controls color groups.

Figure 42:
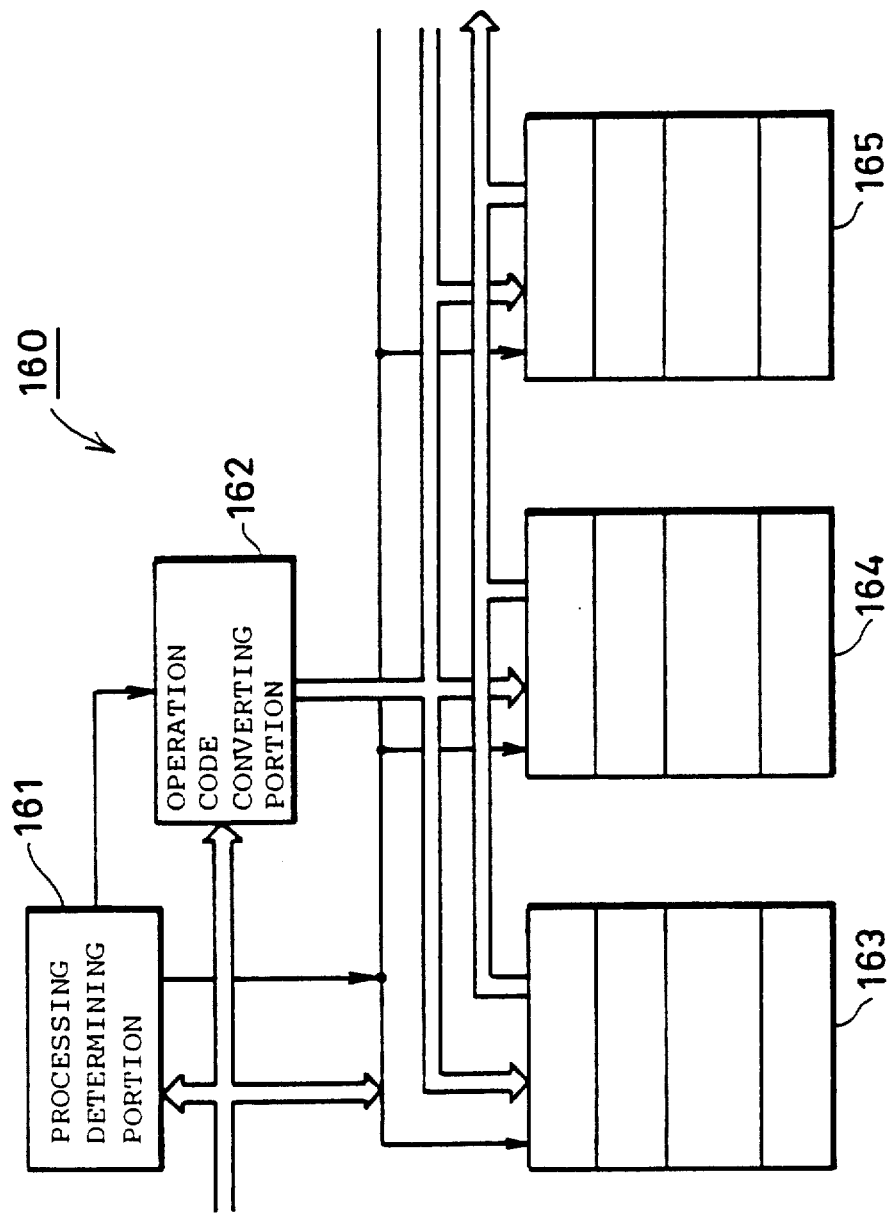
FIG. 42 is a concrete block diagram of a recursion stack portion shown in FIG. 41.

FIG. 42 is a diagram showing a concrete construction of the recursion stack portion 160 shown in FIG. 41.

The construction of the recursion stack portion 160 will be described in the following. As shown in FIG. 42, the recursion stack portion 160 comprises a processing determining portion 161, an operation code converting portion 162 and stacks 163, 164, 165 etc. The processing determining portion 161 determines whether the destination flag included in the input packet indicates the recursion stack portion 160 or not. If the destination flag indicates the recursion stack portion 160, the processing determining portion 161 supplies a conversion start signal for converting the operation code of the packet to the operation converting portion 162 and supplies a control signal for pushing the packet to the stacks 163, 164, 165 etc. The operation code converting portion 162 converts the operation code included in the tag of the packet to an ret instruction. The stacks 163, 164, 165 etc. are provided corresponding to node numbers. When a packet is inputted, a stack corresponding to the node number of the tag of the packet is selected and the packet is pushed to the position in the stack indicated by a value of the recursion counter. When a pop packet is inputted, a corresponding packet is popped from a position indicated by a value of the recursion counter from all the stacks 163, 164, 165 etc.

Figure 43:
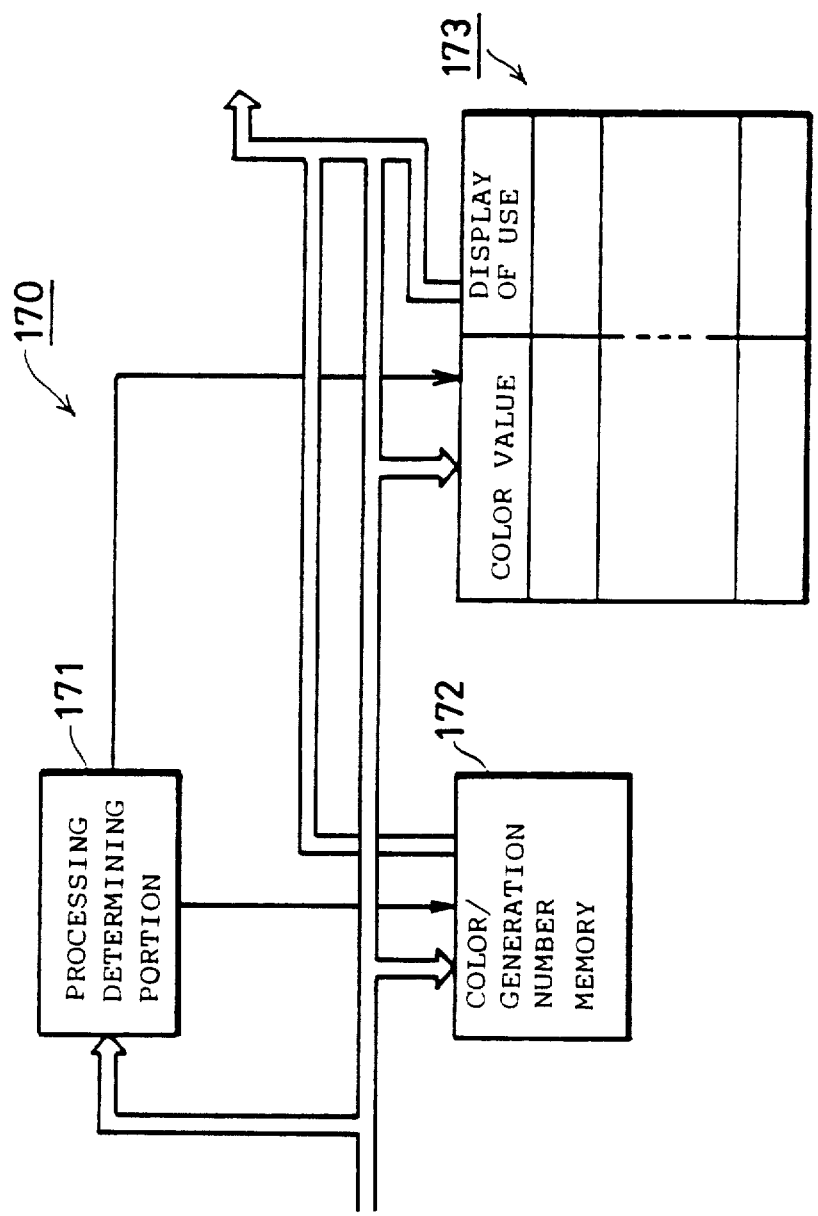
FIG. 43 is a concrete block diagram of a color control portion shown in FIG. 41.

FIG. 43 is a concrete block diagram of the color control portion 170 shown in FIG. 41. A construction of the color control portion 170 will be now described. The control portion 170 comprises a processing determining portion 171, a color/generation number memory 172 and a color control table 173. The processing determining portion 171 determines whether the instruction included in the input packet is any of the get-rc instruction, get-c instruction, free-rc instruction and free-c instruction. When the instruction is the get-rc instruction or the get-c instruction, the processing determining portion 171 supplies a write signal to the color generation number memory 172 and supplies a get signal to the color control table 173.

When it is determined that the instruction is the free-rc instruction or the free-c instruction, the processing determining portion 171 supplies a read signal to the color/generation number memory 172 and a free signal to the color control table 173. The color/generation number memory 173 is used to store the generation numbers. The color control table 173 stores color values permitted to be used and it includes areas for storing information for indicating use or non-use corresponding to the color values. Upon receipt of the get-c instruction, the color control table 173 reads out a color in the non-use state and outputs the color by making it included in the packet. Upon receipt of the free-c instruction, the color control table 173 writes information for indicating that the corresponding color value is not used.

Figure 44:
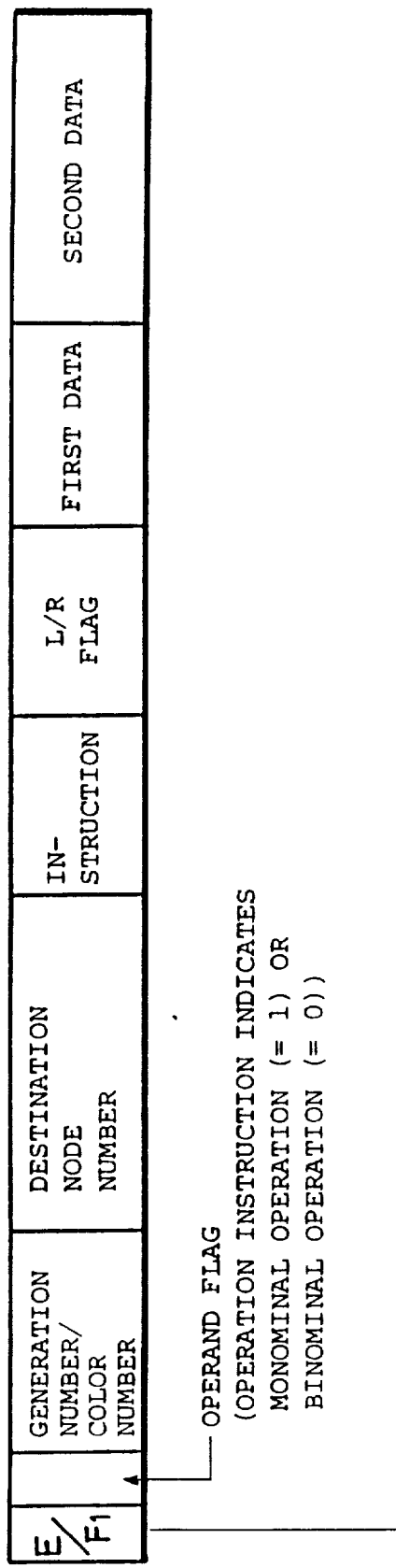
FIG. 44 is an illustration showing a formation of a packet used in the eighth embodiment.

FIG. 44 is an illustration showing a formation of a packet used in the eighth embodiment. Referring to FIG. 44, a packet includes a destination flag indicating, as a destination, the arithmetic processing portion 40, or the recursion stack portion 160 or the color control portion 170, an operand flag indicating that the instruction instructs a monominal operation or a binominal operation, a generation number/color number, an L/R flag indicating a left input or a right input in the data flow graph where a destination node number, an instruction and data are applied, and first and second data.

Referring now to FIGS. 39 to 44, operation of the eighth embodiment will be described.

In the execution of recursion, the condition determining portion 301 first determines whether the input packet 1 satisfies the condition for the execution of recursion or not. If recursion is not executed, the input packet 1 is outputted through an arc 1. If recursion is to be executed, a packet 2 outputted through an arc 2 is supplied to the program storing portion 20. The program storing portion 20 reads out a change-c instruction from the program memory based on the destination node number of the packet 2 and it updates the tag of the packet 2 according to the instruction and outputs a packet 3 for a node 4 to the firing processing portion 30. When the change-c instruction is read out, the number of copies is simultaneously read out from the program memory.

In this case, according to the number of copies, a get-rc instruction and an nop instruction subsequent to the change-c instruction are read out from the program memory and the tag of the input packet 2 is updated, whereby a packet 4 and a packet 5 are outputted to the firing processing portion 30. At the time of reading out the nop instruction, a constant flag is set and constant data stored subsequent to the nop instruction is provided, so that a packet including a tag forming a pair with the packet 5 and also including the constant data in the data field is generated and outputted to the firing processing portion 30. The constant data is set to 1 for example as the initial value of the recursion counter.

The firing processing portion 30 fires the packet 5 with the packet 6 and a packet 7 having the data of the two packets 5 and 6 is supplied to the arithmetic processing portion 40 so as to be processed according to the nop instruction. Further, it is supplied to the program storing portion 20 through the output portion 50 and the input portion 10. The data included in the packet 7 is a value of the recursion counter and the program storing portion 20 reads out a change-c instruction from the program memory based on the destination node number of the packet 7 and updates the tag of the packet 7, so as to output a packet for a node 5 to the firing processing portion 30.

At this time, two st-des instructions are successively read out according to the number of copies read out from the program memory and the tag of the input packet 7 is updated, so that packets 9 and 10 are outputted. Constant flags are set at the time of reading out the two st-des instructions and the constant data stored in the program memory subsequent to the st-des instructions are read out. Then, packets 11 and 12 including the tags forming pairs with the packets 9 and 10, respectively, and also including the constant data are reproduced and outputted to the firing processing portion 30. The constant data become a destination node number for a node 8 and a destination node number for a node 10.

The firing processing portion 30 applies firing processing to the packets 9 and 11 and to the packets 10 and 12 and outputs two packets therefrom. Those two packets are not processed in the arithmetic processing portion 40 and supplied to the recursion stack portion 160 through the output portion 50.

The processing determining portion 161 of the recursion stack portion 160 determines the destination flags included in those two packets, so that the packets are stacked in positions indicated by the values of the recursion counter included in the data portions of the respective packets, in the stacks corresponding to the node numbers included in the respective packets. At this time, the operation code converting portion 162 changes the operation codes of the packets to ret instructions.

On the other hand, the above mentioned packet 4 is inputted to the color control portion 170 through the output portion 50 without being processed in the firing processing portion 30 and the arithmetic processing portion 40. The processing determining portion 171 of the color control portion 170 determines the get-rc instruction included in the packet and supplies the get signal to the color control table 123 and it also supplies a write signal to the color/generation number memory 172. Thus, a color non-used is obtained from the color groups stored in the color control table 173 and information indicating use corresponding to the obtained color value is stored. The obtained color is stored in the data field of the packet 4 and is supplied to the program storing portion 20 through the input portion 10. The color/generation number memory 172 included in the color control portion 170 stores the color/generation number included in the packet 4 in response to the write signal from the processing determining portion 171.

The program storing portion 20 reads out a change-c instruction from the program memory based on the destination node number of the packet 13 and according to the number of copies read out at this time, the program storing portion 20 successively reads out change-c instructions and updates the tag of the input packet 13, thereby to output packets 14 and 15 to the firing processing portion 30.

The firing processing portion 30 applies firing processing to the packets 13 and 14 and to the packets 8 and 15, so that new packets are outputted to the arithmetic processing portion 40. The arithmetic processing portion 40 outputs the packet 16 and the packet 17 having the data included in the packets 13 and 8, respectively, as the data and having, as the color numbers/generation numbers of the tags, the colors included in the packets 14 and 15 as the data, respectively. Those packets 16 and 17 are supplied to the program storing portion 20 through the output portion 50 and the input portion 10.

The destination node numbers on the packets 16 and 17 indicate input to the condition determining portion 303, so that the condition determining portion 303 performs processing. Thus, it is determined whether the condition is satisfied or not. If return from the recursion is to be made, packets 18 and 19 are outputted through an arc 3 and a packet 20 is outputted through an arc 4. The packets 18 and 19 include values of the recursion counter as the data and the packet 20 includes an intermediate result of execution of the recursive function as the data. The packet 18 is inputted to the recursion stack portion 160 through the output portion 50 without being processed in the firing processing portion 30 and the arithmetic processing portion 40, so that packets 22 and 23 stacked in positions corresponding to the values of the recursion counter included as the data are all popped. The operation codes of the popped packets are changed to ret instructions by operation in the stacks and the data portions of the packets are caused to be destination node numbers.

The packet 19 is not processed by the firing processing portion 30 and the value of the recursion counter as the data is subtracted by 1 based on a dec instruction of the arithmetic processing portion, so that a packet 21 is outputted to the program storing portion 20. Thus, positions for popping in the stacks are shifted in the order from older packets to newer packets in the stacks and return of the recursion is effected in the order beginning with the oldest packet.

In the firing processing portion 30, the packets 20 and 22 and the packets 21 and 23 are fired respectively and in the arithmetic processing portion 40, the destination node numbers of the tags are updated by the destination node numbers as the data, whereby a packet 24 including an intermediate result of execution of the recursive function as the data and a packet 25 including the value of the recursion counter as the data are outputted. Destinations of the packets 24 and 25 indicate a node 20 and a node 18 (a node 19 is also applied if copy processing is performed), respectively, during the return from the recursion and at the end of the return, those destinations indicate a node 10 (nodes 7 and 9 are also applied if copy processing is performed) and a node 8, respectively.

If the processing of the condition determining portion 303 is performed and the recursion is further developed, packets 26 and 27 are outputted through arcs 5 and 6, respectively. The packets 26 and 27 have data and values of the recursion counter in the data fields. The program storing portion 20 processes the packet 26 and outputs packets 28, 29 and 30. The packet 28 is inputted to the color control portion 170. The color control portion 170 sets free the colors used by the color number/generation number included in the tag based on the free-c instruction included in the packet 28.

On the other hand, the packet 29 is inputted to the color control portion 170. The color control portion 170 obtains a color non-used from the color groups of the color control table 173 and stores it in the data field so that a packet 31 is outputted. The packet 31 is processed by the program storing portion 20 so that packets 32 and 33 are formed.

The packet 27 is processed in the program storing portion 20 to be a packet 34 and the packet 34 is supplied to the arithmetic processing portion 40. The arithmetic processing portion 40 adds 1 to the value of the recursion counter of the data field according to an inc instruction of the packet 34, so that a packet 35 is formed and outputted. Thus, the packet is stacked in a position deeper in the stack based on the value of the recursion counter. The packet 35 is processed in the program storing portion 20, so that packets 36, 37 and 38 are formed. When the packets 37 and 38 are formed, a constant flag is set at the time of reading out thereof and packets 39 and 40 having the constant data stored in the program memory as the data are successively outputted. The constant data indicates a node 18 (a node 19 is also applied by copy processing) and a node 20. The firing processing portion 30 applies firing processing to the packets 37 and 39 and to the packets 38 and 40, whereby new two packets are outputted. These two packets are pushed to the corresponding two positions of the stacks according to the values of the recursion counter of the data field by means of the recursion stack portion 160. At this time, the operation codes of the two packets are changed to ret instructions by the operation code converting portion 162.

The firing processing portion 30 applies firing processing to the packets 30 and 32, and to the packets 36 and 33. The arithmetic processing portion 40 updates the color number/generation number of the tag based on the color of the data field, so that packets 41 and 42 are formed and outputted. Destinations of the packets 41 and 42 indicate inputs to the recursive function 304. The recursive function 304 corresponds to the whole area in FIG. 40.

Destinations of the packets 24 and 25 indicate the nodes 10 and 8. At the end of the recursion, packets 43 and 44 are outputted from the recursive function 302 in FIG. 39. The packets 43 and 44 have the results of execution of the recursive function and the values of the recursive counter in the data fields thereof. The program storing portion 20 processes the packet 43 to output packets 45, 46 and 47 and it processes the packet 44 to output a packet 48. The packet 48 is absorbed by the arithmetic processing portion 40 in response to an absorb instruction. The packet 45 sets free the color using the color number/generation number of the tag by the color control portion 170 in response to a free-c instruction.

The above mentioned packet 45 is supplied to the color control portion 170 and the color using the color number/generation number of the tag is set free in response to the free-c instruction. The packet 46 is stored in the data field from which the stored color number/generation number is read out, in response to a free-rc instruction, so that a packet 49 is formed and outputted. The program storing portion 20 processes the packet 49, so that a packet 50 is formed and outputted. The firing processing portion 30 applies firing processing to the packets 47 and 50 and the arithmetic processing portion 40 causes the color number/generation number of the data field to return to the tag, so that the environment condition before the execution of the recursion is begained.

As described above, according to the eighth embodiment, the color used in a higher level of the hierarchy is set free in response to the free-c instruction and the packet is stored in the recursion stack in response to the st-des instruction, so that the packet is taken out from the recursion stack in response to the pop instruction. Consequently, it becomes possible to execute operation of a recursive function requiring colors more than the number of colors able to be represented in the generation/color area of the packet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An associative storing apparatus of a data flow machine, comprising:
   address converting means for hashing a tag of a first input packet supplied to said address converting means from an input means and including the tag and data, determining a memory address and outputting a packet input signal and an address signal,
   write register means including a first presence bit location for storing said first input packet and storing a first presence bit indicating validity or invalidity of said first input packet in said first presence bit location,
   matching storing means responsive to the address signal outputted from said address converting means, for receiving and storing the first input packet and the first presence bit stored in said write register means and reading out a second packet and a second presence bit, indicating validity or invalidity of said second packet previously stored in said matching storing means, empty determining means for determining whether said second packet is valid or not based on the second presence bit read out from said matching storing means and outputting a result of the determination as a determination signal, tag comparing means for receiving the first packet stored in said write register means and the second packet read out from said matching storing means, comparing the tags of said first and second packets and outputting said first and second packets when the tags match or outputting either of said first and second packets based on a result of the comparison of the tags of said first and second packets when the tags do not match, data pair forming means for appending data of said second packet outputted from said tag comparing means to said first packet and outputting said first packet with said data of said second packet, and control means for controlling the reading or writing of said matching storing means in response to the packet input signal outputted from said address converting means, the supplying of the second presence bit read out from said matching storing means to said empty determining means, the supplying of said second packet and said first packet stored in said write register means to said tag comparing means based on said determination signal, and for rendering invalid the first presence bit stored in said write register means when said tag comparing means outputs a signal indicating a match of the tags.

2. An associative storage apparatus of a data flow machine in accordance with claim 1, further comprising address register means for storing the address signal outputted from said address converting means and supplying said address signal to said matching storing means.

3. An associative storage apparatus of a data flow machine in accordance with claim 1, further comprising read register means for storing the second packet and the second presence bit read out from said matching storing means.

4. An associative storage apparatus of a data flow machine, comprising:

address converting means for hashing a tag of a first input packet input to said address converting means from an input means including the tag and data inputted, determining a memory address and outputting a packet input signal and an address signal, address register means for storing the address signal outputted from said address converting means, write register means including a first presence bit location for storing said first input packet and storing a first presence bit indicating whether said first input packet is valid or invalid in said first presence bit location, matching storing means for receiving and storing the first input packet and the first presence bit stored in said write register means in response to the address signal outputted from said address register means and reading out a second packet and a second presence bit indicating whether said second packet is valid or invalid previously stored in said matching storing means, read register means for storing the second packet and the second presence bit read out from said matching storing means, empty determining means for determining whether said second packet is valid or not based on the second presence bit outputted from said read register means and outputting a result of the determination as a determination signal, tag comparing means for receiving the first input packet stored in said write register means and the second packet read out from said matching storing means, comparing the tags of the first and second packets and outputting said first and second packets when the tags match or outputting either of said first and second packets based on a result of the comparison when the tags do not match, data pair forming means for appending data of the second packet outputted from said tag comparing means to said first packet and outputting said first packet with said data of said second packet, and control means for controlling the reading or writing of said matching storing means in response to the packet input signal outputted from said address register means, the supplying of the second presence bit read out from said matching storing means to said empty determining means, the supplying of said second packet and the first packet stored in said write register means to said tag comparing means based on said determination signal and for rendering invalid the first presence bit stored said write register means when the tags of said first and second packets match.

5. An associative storage apparatus of a data flow machine in accordance with claim 4, wherein said tag comparing means comprises means for comparing the tags included in said first and second packets, and outputting a first comparison signal indicating a magnitude relation of the tags and the packet having the larger tag out of said first and second packets, said data pair forming means comprises means for outputting both of or either of said first and second packets upon receipt of said first comparison signal, and said control means comprises means for rendering valid the first presence bit in said write register means upon receipt of said first comparing signal indicating that the tag of said second packet is larger than that of said first packet, storing, in a predetermined address of said matching storing means, the first packet and the first presence bit stored in said write register means, reading out the second packet in said address and writing said first packet to change contents of said matching storing means.

6. An associative storage apparatus of a data flow machine in accordance with claim 5, wherein the tag included in said first input packet includes an identification number for identifying data included in said first input packet, a node number indicating a destination of said data and a through packet flag for enabling said first input packet to pass through, said tag comparing means comprises a first comparing circuit for comparing identification numbers of the tags included in said first and second packets and outputting a second comparison signal indicating a match or a magnitude relation therebetween, a second comparing circuit for comparing node numbers included in the tags of said first and second packets and outputting a third comparison signal indicating a match or a magnitude relation therebetween, first register means for storing the first packet outputted from said write register means, second register means for storing the second packet outputted from said read register means, and a comparison output determining circuit for outputting said second comparison signal as the first comparison signal and outputting the packet having the larger identification number out of said first and second packets to said data pair forming means with the through packet flag being set to a through state when said second comparison signal does not indicate the match; outputting said third comparison signal as the first comparison signal when said second comparison signal indicates the match; outputting the first and second packets stored in said first and second register means, respectively, to said data pair forming means when said third comparison signal indicates the match; and outputting the packet having the larger node number out of said first and second packets to said data pair forming means with the through packet flag thereof being set to the through state when said third comparison signal does not indicate the match.

7. A data flow machine comprising:

input means for accepting in said machine a first packet formed by a first data and a first tag including an operation code, inputted from an external portion, program storing means for reading out a program stored in advance according to the tag of the first packet inputted from said input means, and outputting a content read out as a new tag together with said first data as an instruction packet, firing processing means for receiving the packet read out from said program storing means, detecting said data including the same tag as the first tag included in said inputted first packet and forming a pair and forming a pair by said first data and said second data to output said pair as an arithmetic packet, arithmetic processing means for performing arithmetic and logical processing according to an instruction included in said first tag upon receipt of the arithmetic packet outputted from said firing processing means and outputting an arithmetic result packet, and output means for determining a tag included in said result packet upon receipt of said result packet outputted from said arithmetic processing means and controlling the output of said packet to an external portion or to said input means, wherein said first processing means comprises address converting means for hashing the first tag included in said inputted first packet, determining a memory address and outputting a packet input signal and an address signal, address register means for storing the address signal outputted from said address converting means, write register means including a presence bit location for storing said inputted first packet and storing a first presence bit indicating whether said first packet is valid or invalid in said presence bit location, matching storing means for storing the first packet and the presence bit stored in said write register means, based on the address signal outputted from said address register means, and reading out a second packet and a second presence bit, previously stored in said matching storing means, read register means for storing the second data and the second presence bit read out from said matching storing means, empty determining means for determining whether said second packet is valid or not based on the second presence bit outputted from said read register means and outputting a result of the determination as a determination signal, tag comparing means for receiving the first packet stored in said write register means and the second packet stored in said read register means, comparing the tags of said first and second packets to output a first comparison signal, and outputting said first and second packets when said two tags match or outputting the first packet from said write register means when said two tags do not match, data pair forming means for appending data of said second packet outputted from said tag comparing means to said first packet and outputting said first packet with said data of said second packet, and control means for controlling the reading or writing of said matching storing means in response to the packet input signal outputted from said address register means, the supplying of the second presence bit stored in said read register means to said empty determining means, the supplying of said second packet and the first packet stored in said write register means to said tag comparing means based on the determination signal, and rendering invalid the first presence bit stored in said write register means when said first comparison signal indicates a match of the tags.

8. A data flow machine in accordance with claim 7, wherein said tag comparing means comprises means for comparing the tags of the first and second packets outputted from said write register means and said read register means, respectively, outputting the first comparison signal indicating a magnitude relation of the tags as a result of the comparison, and outputting said first and second packets when said two tags match or outputting the packet having the larger tag out of said first and second packets when said two tags do not match, said data pair forming means comprises means for outputting both of or either of said first and second packets based on said first comparison signal, and said control means comprising changing means for rendering valid the first presence bit stored in said write register means when said first comparison signal indicates that the tag of said second packet is larger than the tag of said first packet, storing, in an area indicated by a content of said address register means in said matching storing means, the first packet and the first presence bit stored in said write register means, and reading out the second packet from said area, thereby to change the content of said matching storing means.

9. A data flow machine in accordance with claim 8, further comprising
   branching means for receiving the packet outputted from said firing processing means, determining a through packet flag of a tag included in said packet, and branching said packet when said through packet flag indicates a through state,
   joining means for joining the packet outputted from said joining means, and
   a path provided between said branching means and said joining means, through which the packet flows with said through packet flag being set to the through state.

10. A data flow machine in accordance with claim 9, further comprising
   buffer means provided in said path between said branching means and said joining means, for temporarily storing said packet.

11. A data flow machine comprising:
   input means for accepting in said machine a packet inputted from an external portion and formed by data and a tag including an identification number for identifying said data and a node number indicating a destination of said data, said identification number being set to a value increasing from a higher level to a lower level in a data dependency relation,
   program storing means for reading out a program stored in advance based on the node number included in the packet inputted from said input means and outputting the content read out as a new tag together with the data included in said inputted packet,
   firing processing means for detecting a packet to form a pair with the packet outputted from said program storing means and outputting a new packet including data of the two packets of said pair,
   arithmetic processing means for performing arithmetic processing based on an operation code of a tag included in the packet outputted from said firing processing means, and
   output means for determining a flag included in a packet as a result of the arithmetic processing performed by said arithmetic processing means and outputting said packet to an external portion or to said program storing means dependent on a result of the determination, wherein
   said firing processing means comprises
      matching storing means for performing hash processing based on a tag included in the packet supplied from said program storing means and storing a packet to form a pair to be accessed according to a result of the hash processing, and
      control means for outputting one of packets having caused a hash collision, with information indicating the hash collision being added to said packet, and storing, in said matching storing means, the other packet with information indicating the hash collision being added to said packet, when the hash collision occurs in said matching storing means, and said data flow machine further comprises
   hash collision processing means for queuing one of the packets outputted from said matching storing means when said hash collision occurs, and popping and outputting said queued packet to said input means to apply firing processing again to said packet.

12. A data flow machine in accordance with claim 11, wherein
   said arithmetic processing means comprises means for outputting the packet to which the information indicating the hash collision is added, to said output means without performing arithmetic processing based on said packet when it is determined that said packet is supplied from said firing processing means, and
   said output means comprises means for supplying the packet to which the information indicating the hash collision is added, to said hash collision processing means, when said packet is supplied from said arithmetic processing means.

13. A data flow machine in accordance with claim 11, wherein
   said firing processing means comprises means for outputting the packet having the larger identification number and storing the packet having the smaller identification number in said matching storing means when said hash collision occurs.

14. A data flow machine in accordance with claim 13, wherein
   said firing processing means comprises means for clearing the information indicating the hash collision added to the packet forming the pair with said popped packet read out from said matching storing means when said popped packet is supplied from said hash collision processing means through said input means, and adding to said packet a through flag for enabling said packet to pass through said program storing means.

15. A data flow machine in accordance with claim 14, wherein
   said program storing means comprises means for supplying the input packet to said firing processing means without processing said packet in said program storing means when it is determined that the through flag is added to said input packet.

16. A data flow machine in accordance with claim 11, wherein
   said hash collision processing means comprises
      determination means for determining whether information indicating a hash collision is added to the input packet, and
      queue storing means for storing said packet when said determination means determines that the information indicating the hash collision is added thereto.

17. A data flow machine in accordance with claim 16, wherein
   said queue storing means includes areas for storing a plurality of packets corresponding to areas in said matching storing means where packets having caused the hash collision have been stored, and
   said hash collision processing means comprises means for identifying an identification number of a packet each time said determination means determines that the information indicating the hash collision is added thereto, and storing the packets in corresponding areas of said storing means in ascending order of identification numbers of the packets beginning with the smallest number.

18. A data flow machine in accordance with claim 17, wherein
   said firing processing means comprises means for outputting a pop packet for reading a queued packet from said queue storing means when the packet to which the information indicating the hash collision is added is supplied and hash processing is performed again based on said packet, and said hash collision processing means comprises means for reading out a packet corresponding to said pop packet from said queue storing means when said pop packet is supplied, clearing the information indicating the hash collision added to the packet read out and adding to said packet a through flag for enabling said packet to pass through said program storing means, thereby to output said packet with said through flag.

19. A data flow machine in accordance with claim 18, wherein said program storing means comprises means for clearing said through flag when the packet with said through flag is inputted and outputting said packet without processing the same to said firing processing means.

20. A data flow machine in accordance with claim 18, wherein said hash collision processing means comprises
determination means for determining that two packets as a pair are stored in said queue storing means, and
means responsive to said pop packet supplied thereto for outputting one packet of said pair together with the other packet of said pair when said determination means determines the existence of said one packet of said pair based on the packet corresponding to said pop packet.

21. A data flow machine in accordance with claim 20, wherein said hash collision processing means comprises means for adding a queue remaining flag to either one of the packets of said pair and outputting said packet with said queue remaining flag, when the packets to be said pair are read out from said queue storing means, in response to determination that a packet remains in the area of said packet read out.

22. A data flow machine in accordance with claim 21, wherein said firing processing means comprises means for performing hash processing based on the packet to which said queue remaining flag is added, when said packet is inputted thereto and adding a flag indicating that said remaining packet exists, to the packet subjected to said hash processing and stored in said matching storing means.

23. An associative storage apparatus of a data flow machine for processing a packet including a tag and data, comprising:

program storing means for storing a tag, constant data, and a constant flag set when said constant data is stored, address control means responsive to input of said packet for outputting an address signal to said program storing means according to information of the tag included in said packet, output packet forming means for forming and outputting a new packet by using the tag or the constant data outputted from said program storing means and the tag or the data of said inputted packet, based on the address signal outputted from said address control means, and program control means for determining a content of the constant flag read out from said program storing means, controlling said output packet forming means according to said content, and supplying, to said address control means and said storing means, a control signal for reading out the constant data stored in said storing means when said constant flag indicates that said constant data is stored.

24. An associative storage apparatus of a data flow machine in accordance with claim 23, further comprising branching means for branching the tag and the data included in said inputted packet, supplying the branched tag to said address control means and supplying the branched data to said output packet forming means, and read means responsive to the address signal based on said branched tag for supplying a new tag read out from said program storing means to said output packet forming means, said output packet forming means including means for forming and outputting a new packet based on the data supplied from said branching means and the tag supplied from said read means.

25. An associative storage apparatus of a data flow machine in accordance with claim 23, further comprising means responsive to the address signal based on said branched tag, for supplying the constant flag read out from said program storing means to said control means, said program control means including means for supplying information indicating existence of the constant data in a subsequent packet to said output packet forming means upon receipt of said constant flag, and said output packet forming means including means for adding, to said tag, information indicating existence of the constant data in said subsequent packet and outputting, as a first packet, said information added to said tag and the data supplied from said branching means.

26. An associative storage apparatus of a data flow machine in accordance with claim 25, wherein said program control means includes means for supplying a control signal for reading out the constant data from said program storing means to said program storing means upon receipt of said constant flag, and said output packet forming means includes means for outputting as a second packet the constant data read out from said program storing means.

27. An associative storage apparatus of a data flow machine in accordance with claim 24, wherein said program storing means includes a storage area for storing a copy flag indicating a copy of the constant data, said program control means includes means for generating, from said address control means, an address signal for reading out a tag from a subsequent address area of said program storing means when the copy flag is read out from said program storing means, and said output packet forming means includes means for adding data supplied from said branching means to each of at least two tags read out from said program storing means and outputting said data with said tags as a new packet.

28. A data flow machine, comprising input means for accepting in said computer a packet formed by a tag including an operation code and data, inputted from an external portion, program storing means for storing the tag, constant data and a constant flag set when said constant data is stored, address control means for outputting an address signal to said program storing means according to information of the tag included in the packet when said packet is inputted to said input means, output packet forming means for forming and outputting a new packet by using the tag or the constant data read out from said program storing means and the tag or the data of said inputted packet, based on said address signal, program control means for determining a content of the constant flag read out from said program storing means, controlling said output packet forming means according to the content, and supplying, to said address control means and said program storing means, a control signal for reading out the constant data stored in said program storing means when said constant flag indicates that said constant data is stored in said program storing means, firing processing means for detecting a packet to form a pair with the packet outputted from said output packet forming means and outputting a new packet including the data of the two packets of said pair, arithmetic processing means for performing arithmetic processing according to an operation code included in the tag of the packet when said packet is outputted from said firing processing means, and outputting a packet as a result of the arithmetic processing, and output control means for determining a tag of the packet outputted from said arithmetic processing means and controlling output of said packet to an external portion or to said input means.

29. A data flow machine in accordance with claim 28, further comprising branching means for branching the tag and the data included in said inputted packet, supplying the branched tag to said address control means and supplying the branched data to said output packet forming means, and read means responsive to the address signal based on said branched tag for supplying a new tag read out from said program storing means to said output forming means, said output packet forming means including means for forming and outputting a new packet based on the data supplied from said branching means and the tag supplied from said read means.

30. A data flow machine in accordance with claim 29, further comprising means responsive to the address signal based on said branched tag for supplying the constant flag read out from said program storing means to said program control means, said control means including means for supplying, to said output packet forming means, information indicating existence of constant data in a subsequent packet, upon receipt of said constant flag, and said output packet forming means including means for outputting as a first packet said information indicating the existence of the constant data in the subsequent packet added to said tag, together with the data supplied from said branching means.

31. A data flow machine in accordance with claim 30, wherein said program control means includes means for supplying a control signal for reading out the constant data from said program storing means to said address control means upon receipt of said constant flag, and said output packet forming means includes means for outputting as a second packet the constant data read out from said program storing means.

32. A data flow machine in accordance with claim 29, wherein said program storing means includes a storage area for storing a copy flag indicating a copy of the constant data, said program control means includes means for generating, from said address control means, an address for reading out a tag from a subsequent address area of said program storing means when the copy flag is read out from said program storing means, and said output packet forming means includes means for adding data supplied from said branching means to each of at least two tags read out from said program storing means and outputting said data added to said tags as a new packet.

33. An input/output apparatus of a data flow machine for inputting and outputting packets to and from a plurality of external apparatuses, comprising:

first branching means responsive to input of either an initialization packet including a tag and an initialization parameter for initializing said data flow machine or an output packet including a tag and output data, for branching said packets to different paths, second branching means for branching the tag and the data included in the output packet branched by said first branching means, output control means for performing handshake control with any of said plurality of external apparatuses, designated by the tag branched by said second branching means and outputting the data branched by said second branching means to said corresponding external apparatus, input control means for performing handshake control with any of said plurality of external apparatuses and inputting a tag and data supplied from said external apparatus, tag forming means for forming a tag for packet processing based on the tag outputted from said input control means, initialization means for initializing said tag forming means based on the initialization packet branched by said first branching means, and packet forming means for forming a new packet based on the tag formed by said tag forming means and the data outputted from said input control means.

34. An input/output apparatus of a data flow machine in accordance with claim 33, wherein said output control means comprises first latch means for latching the tag and the data branched by said second branching means, and first handshake control means for performing handshake control with said external apparatus and outputting to said external apparatus the tag and the data latched in said first latch means.

35. An input/output apparatus of a data flow machine in accordance with claim 33, wherein
said input control means comprises
second handshake control means for performing handshake control with any of said plurality of external apparatuses, and
second latch means for latching the tag and the data supplied from said corresponding external apparatus after the handshake control by said second handshake control means.

36. A data flow machine in accordance with claim 33, wherein
said tag includes a channel number for identifying any one of said plurality of external apparatuses, a generation number representing a generation of data provided for each said channel number, and a node number indicating an entry on a program,
said tag forming means includes
counting means for counting the number of inputs of the generation number for each said channel number supplied from said input control means,
converting means for storing a correspondence relation between said channel number and said node number and outputting the node number corresponding to the channel number included in a tag supplied from said input control means, and
latch means for latching the generation number counted by said counting means and the node number outputted from said converting means.

37. A data flow machine for inputting and outputting packets to and from a plurality of external apparatuses, comprising:
input means for accepting in said machine a packet formed by a tag including a node number indicating an entry on a program and an operation code, and by data, inputted from any of said external apparatuses,
program storing means for reading out a program stored in advance according to the node number included in the packet inputted from said input means, and outputting a packet including the content read out as a new tag and the data included in said inputted packet as data,
firing processing means for detecting a packet to form a pair with the packet outputted from said program storing means and outputting a new packet including data of the two packets of said pair,
arithmetic processing means for performing arithmetic processing based on an operation code of the tag included in the packet outputted from said firing processing means, and
output means for determining a flag included in a packet as a result of the arithmetic processing by said arithmetic processing means and outputting said packet to any of said plurality of external apparatuses or to said program storing means,
said output means comprising
first branching means for branching, to different paths, an initialization packet including a tag and an initialization parameter for initializing an internal circuit, and an output packet including a tag and output data when either said initialization packet or said output packet is inputted, second branching means for branching the tag and the data included in said output packet branched by said branching means, and
output control means for performing handshake control with any of said plurality of external apparatuses, designated by the tag branched by said second branching means and outputting the data branched by said second branching means to said corresponding external apparatus, and
said input means comprising
input control means for performing handshake control with any of said plurality of external apparatuses and inputting a tag and data supplied from said external apparatus
tag forming means for forming a tag for packet processing based on the tag outputted from said input control means,
initialization means for initializing said tag forming means based on the initialization packet branched by said first branching means, and
packet forming means for forming a packet based on the tag formed by said tag forming means and the data outputted from said input control means.

38. A data flow machine in accordance with claim 37, wherein
said input control means comprises
first handshake control means for performing handshake control with any of said plurality of external apparatuses, and
first latch means for latching a tag and data supplied from the corresponding external apparatus after the handshake control by said first handshake control means.

39. A data flow machine in accordance with claim 37, wherein
said output control means comprises
second latch means for latching the tag and the data branched by said second branching means, and
second handshake control means for performing handshake control with said external apparatus and outputting the tag and the data latched in said latch means to said external apparatus.

40. A data flow machine in accordance with claim 37, wherein
said tag includes a channel number for identifying said plurality of external apparatuses, a generation number representing a generation of data provided for each said channel number, and a node number indicating an entry on a program, and
said tag forming means comprises
counting means for counting the number of inputs of the generation number for each said channel number supplied from said input control means,
converting means for storing a correspondence relation between said channel number and said node number and outputting a node number corresponding to the channel number included in the tag supplied from said input control means, and
third latch means for latching the generation number counted by said counting means and the node number outputted from said converting means.

41. A data flow machine, to which an external storing apparatus is connected, comprising:

input means for accepting in said computer a packet including a tag and data, inputted from an external portion, program storing means including a program memory for storing a program, for reading out the program from said program memory based on the tag included in the packet outputted from said input means to update the tag included in said packet, reading out a new tag from said program memory when the flag included in the content read out indicates a true condition, and forming and outputting a new packet based on the read out tag and the data included in said packet, firing processing means for detecting a packet to form a pair with the packet outputted from said program storing means and outputting a new packet including the data of the two packets of said pair, arithmetic processing means for performing arithmetic processing based on an operation code of the tag included in the packet outputted from said firing processing means, and updating the tag included in said packet based on the data of either of the data included in the two packets subjected to said firing processing, thereby to output the updated tag, output means for determining the tag included in the packet outputted from said arithmetic processing means and controlling output of said packet to an external packet or to said input means, and external storage control means for reading out or writing data from or into said external storage apparatus based on the content of the packet supplied from said output means.

42. A data flow machine in accordance with claim 41, wherein the tag included in the packet inputted from the external portion includes a node number indicating an entry on a program, the tag included in the packet inputted to said input means includes a first flag indicating that a program is stored in said external storage apparatus, said program storing means includes means for outputting a first packet formed by a first tag read out from said program memory as the tag and the node number included in said inputted packet, based on the tag included in said inputted packet, and outputting a second packet formed by a second tag read out from said program memory and the data of said inputted packet, said firing processing means includes means for causing the second packet outputted from said program storing means to be in a waiting state and outputting said first packet to said arithmetic processing means, said arithmetic processing means includes means for arithmetically processing an address for reading out the program from said external storage apparatus based on the node number included in said first packet supplied from said firing processing means and outputting a third packet including a result of the arithmetic processing as data, and said external storage control means includes means for outputting said third packet from said arithmetic processing means through said output means to said program storing means.

43. A data flow machine in accordance with claim 42, wherein said program storing means includes means for updating the tag included in the third packet supplied from said external storage control means and outputting a fourth packet including information indicating the external storage apparatus as a destination and a read instruction as an operation code, said firing processing means includes means for adding, to the data included in the fourth packet outputted from said program storing means, a tag attached to read data as a tag for reading out the data from said external storage apparatus, and outputting a fifth packet with said added tag, said arithmetic processing means includes means for transferring a physical address as the data included in the fifth packet to a field of the node number of the tag according to the operation code included in said fifth packet outputted from said firing processing means and outputting a sixth packet including information indicating said external storage apparatus as destination information, information indicating the physical address as the node number, information indicating a read instruction as an operation code, and said tag attached to the read data as the data, and said external storage control means includes means for reading out program data from said external storage apparatus based on the information indicating the operation code and the physical address included in said sixth packet outputted from said arithmetic processing means, and outputting a seventh packet including the tag attached to the read data of said sixth packet as the tag and said read-out data as the data.

44. A data flow machine in accordance with claim 43, wherein said firing processing means includes means for firing an eighth packet having passed through said program storing means and having a reset through flag included in the tag portion, with said second packet in the waiting state in said firing processing means, and outputting a ninth packet having the data included in said second and eighth packets as the data, said arithmetic processing means includes means for making conversion to employ as the tag the data read out from the external storage apparatus included in the data of said ninth packet according to the operation code included in the eighth packet supplied from said firing processing means, and outputting a tenth packet including a tag including an information indicating an internal portion as the destination and the data of said second packet as the data, and said external storage control means includes means for supplying said tenth packet to said program storing means.

45. A data flow machine in accordance with claim 44, wherein said program storing means includes means for outputting an eleventh packet having a reset through flag of the tag included in the tenth packet supplied from said external storage control means.

46. A data flow machine in accordance with claim 41, wherein said program storing means comprises determination means for determining a content of a flag included in the tag of said inputted packet, address signal generating means for generating a specified address signal when said determination means determines that said flag indicates a true condition, and output packet forming means for forming and outputting a packet including a new tag read out from said program memory and data, based on the specified address signal generated from said address signal generating means.

47. A data flow machine in accordance with claim 46, wherein said output packet forming means includes means for outputting a first packet including a first tag read out from said program memory based on the specified address signal generated from said address signal generating means and the data included in said inputted packet, and a second packet including a second tag read out from said program memory based on the specified address signal generated from said address signal generating means and the data included in said inputted packet.

48. A data flow machine in accordance with claim 41, wherein said program storing means comprises
branching means for branching the tag and the data of said inputted packet,
flag determination means for determining a flag included in said branched tag and outputting a determination result signal,
a program memory for storing program data,
address signal generating means for generating a read address signal of said program memory based on said branched tag,
latch means for latching the tag and the data of said branched input packet,
flag reset means for resetting a through flag included in the tag latched in said latch means,
output packet forming means for forming an output packet based on the tag and the data latched in said latch means and the tag read out from said program memory, and
program storage control means for controlling said program memory, said address signal generating means, said flag reset means and said output packet forming means, based on the determination result signal outputted from said flag determination means, said program storage control means comprises means for resetting the through flag of the tag latched in said latch means by said flag reset means when said flag determination means determines that the through flag of said branched tag indicates a through state, and outputting the packet including the tag from said output packet forming means, generating a first specified address signal from said address signal generating means and reading out a first tag from said program memory when said flag determination means determines that the through flag of said branched tag does not indicate the through state and that a flag indicating an external program is included in said branched tag, and generating a second specified address signal from said address signal generating means, reading out a second tag from said program memory, and outputting from said output packet forming means an output packet including said second tag as the tag and the data of the input packet as the data.

49. A data flow machine in accordance with claim 48, wherein said address signal generating means includes means for arithmetically processing said first specified address and generating said second specified address signal.

50. A data flow machine in accordance with claim 48, wherein said address signal generating means includes means for generating said second specified address separately from said first specified address.

51. A data flow machine in accordance with claim 41, wherein said arithmetic processing means comprises
branching means for branching said inputted packet to a tag and data including first data and second data,
latch means for latching the tag and the first and second data branched by said branching means,
operation mode determination means for determining an operation mode based on an operation code included in said tag, and
output means for forming and outputting a packet including the tag and the first data latched in said latch means as the tag and the second data latched in said latch means as the data, when said operation mode determination means determines that said operation code indicates an access to the external storage apparatus.

52. A data flow machine in accordance with claim 41, wherein said external storage control means comprises
branching means for branching the tag and the data of said inputted packet,
operation mode determination means for determining an operation mode based on information included in said tag,
address extracting means for extracting a physical address included in said tag for accessing said external storage apparatus, and outputting an address signal,
selection means for selecting and outputting, based on a result of the determination by said operation mode determination means, a tag attached to read data included in said branched data, data to be written in said external storage apparatus, and timing information for accessing said external storage apparatus,
access control means for controlling access to said external storage apparatus, based on the result of the determination by said operation mode determination means, and
read data packet forming means for forming an output packet by data read out from said external storage apparatus and the tag attached to the read data selected by said selection means.

53. A data flow machine in accordance with claim 52, wherein said external storage control means comprises means for setting the timing information outputted from said selection means to said access control means when said operation mode determination means determines a timing information setting mode, controlling writing in said external storage apparatus by using the output extracted by said address extracting means as an address signal and the data outputted from said selection means as write data when said mode determination means determines a write mode for writing data in the external storage apparatus, reading out information from said external storage apparatus by using the output of said address extracting means as the address by control of said access control means when said mode determination means determines a read mode from the external storage apparatus, and outputting a packet including the tag attached to the read data selected by said selection means as the tag and the information read out from said external storage apparatus as the data.

54. A data flow machine for arithmetically processing a recursive function, comprising:

input means for inputting a packet formed by a first tag including a destination number indicating a destination of a program, an identification number of the program, a destination node number indicating an entry on the program, and by data, program storing means including a program memory for storing the program, for reading out a second tag from said program memory based on the node number included in the packet outputted from said input means, updating and outputting the first tag of said inputted packet, based on said second tag read out, reading out a third tag from said program memory successively when a copy number is set in said read-out second tag, updating and outputting the first tag of said inputted packet based on said third tag, reading out constant data from said program memory when a constant flag indicating the constant data is set in said second tag, and forming and outputting a new packet including said second tag and said constant data, firing processing means including a matching memory for storing a plurality of different packets, for receiving the packet outputted from said program storing means, determining the tag of said packet, outputting the packet when an instruction indicates a monominal operation, searching for a packet including an identification number and a destination node number matching with those of said packet, storing said packet in said matching memory when it is determined that no packet indicating the match is stored, and outputting a fourth packet including data of the packets indicating the match as first and second data, arithmetic processing means for receiving the packet outputted from said firing processing means, outputting the packet without processing the same when it is determined that the destination node number included in said packet indicates a first destination, executing for the data an instruction of the tag included in the packet when it is determined that the destination node number included in said packet indicates a second destination, and outputting a result of the execution as the data, output means including first and second output ports, for receiving the packet outputted from said arithmetic processing means, determining the destination node number of said packet, outputting said packet to said input means through said first output port when the destination is said first destination, and outputting said packet through said second output port when the destination is a third destination, color control means including a color control table for controlling a color group as an environment identifier, for acquiring or setting free a color non-used from said color control table based on an instruction include in the packet outputted to said second output port of said output means, and recursion stack means including a recursion stack provided for each said destination node number, for updating and storing the packet outputted to said second output port of said output means, in a position indicated by the second data of said packet in the recursion stack indicated by the first data included in said packet, in response to the instruction included in said packet.

55. A data flow machine in accordance with claim 54, wherein the packet supplied to said color control means includes a get-rc instruction, a free-rc instruction, a free-c instruction or a get-c instruction, said color control means includes an identification number memory for storing said identification number, said color control table includes areas for storing a plurality of colors, and areas for storing information indicating whether the colors are used or not, and said data flow machine further comprises means for acquiring a color non-used from said color control table when the instruction included in said packet is the get-rc instruction, outputting the acquired color included in the data of said packet to said input means, storing the identification number of said packet in said identification number memory, storing, in said color control table, information indicating that the acquired color is being used, reading out the identification number stored in said identification number memory based on said get-rc instruction when it is determined that said instruction is the free-rc instruction, outputting said identification number included in the data of said packet to said input means, acquiring a color non-used from said color control table when it is determined that said instruction is the get-c instruction, adding the acquired color to the data of said packet and outputting the data with said acquired color to said input means, storing, in said color control table, information indicating that the acquired color is being used, and clearing said information stored in said color control table corresponding to the color included in said packet when it is determined that said instruction is the free-c instruction.

56. A data flow machine in accordance with claim 54, wherein the packet supplied to said recursion stack means includes an st-des instruction for stacking the instruction, and a pop instruction for returning the stacked instruction, said recursion stack means includes means for updating and storing the instruction of said packet in a position of the recursion stack indicated by the second data included in said packet in the recursion stack indicated by the first data included in said packet out of said recursion stacks when it is determined that the instruction included in said packet is the st-des instruction, and taking out and outputting to said input means the packet stored in the position of the recursion stack indicated by the first data included in said packet from all of the recursion stacks when it is determined that the instruction included in said packet is the pop instruction.

* * * * *